United States Patent
Nagasaka et al.

(10) Patent No.: US 6,725,300 B1
(45) Date of Patent: Apr. 20, 2004

(54) CONTROL DEVICE FOR CONTROLLING THE TRANSMISSION AND RECEIPT OF DATA AND A METHOD OF DETERMINING THE TRANSMITTER AND THE RECEIVER OF THE DATA

(75) Inventors: Fumio Nagasaka, Nagano-ken (JP); Yutaka Hisamatsu, Nagano-ken (JP); Toshiharu Katada, Nagano-ken (JP); Takashi Miyasaka, Nagano-ken (JP); Kotaro Yamauchi, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/343,531

(22) Filed: Jun. 30, 1999

(30) Foreign Application Priority Data

Jun. 30, 1998 (JP) .............................. 10-201267
Nov. 25, 1998 (JP) .............................. 10-352120

(51) Int. Cl.⁷ ......................... G06F 13/12; G06F 13/38
(52) U.S. Cl. ...................... 710/62; 709/228; 709/232
(58) Field of Search ............................. 709/220–222, 709/227–229, 230, 232; 710/8–11, 62–63

(56) References Cited

U.S. PATENT DOCUMENTS

| | | | |
|---|---|---|---|
| 5,768,516 A | | 6/1998 | Sugishima |
| 5,796,951 A | * | 8/1998 | Hamner et al. ............. 709/223 |
| 5,819,042 A | * | 10/1998 | Hansen ....................... 709/222 |
| 6,011,553 A | | 1/2000 | Komiyama |
| 6,032,202 A | * | 2/2000 | Lea et al. ....................... 710/8 |
| 6,295,556 B1 | * | 9/2001 | Falcon et al. ............... 709/220 |
| 6,437,805 B1 | * | 8/2002 | Sojoodi et al. ............. 345/763 |
| 6,556,875 B1 | * | 4/2003 | Nagasaka et al. ............. 700/19 |

FOREIGN PATENT DOCUMENTS

| | | |
|---|---|---|
| EP | 0 473 414 A2 | 3/1992 |
| EP | 0 679 014 A2 | 10/1995 |
| JP | 7-044477 | 2/1995 |
| JP | 7-121332 | 5/1995 |
| JP | 7-239929 | 9/1995 |
| JP | 7-284164 | 10/1995 |
| JP | 8-102807 | 4/1996 |
| JP | 9-198211 | 7/1997 |
| JP | 9-218780 | 8/1997 |
| JP | 9-223097 | 8/1997 |
| JP | 09223097 A | 8/1997 |
| JP | 9-231061 | 9/1997 |
| JP | 09305337 A | 11/1997 |
| JP | 9-319555 | 12/1997 |
| JP | 10-143347 | 5/1998 |
| JP | 10-240666 | 9/1998 |
| JP | 10285580 A | 10/1998 |
| JP | 11334180 A | 12/1999 |
| WO | WO 94/29787 | 12/1994 |

* cited by examiner

Primary Examiner—David Wiley
Assistant Examiner—George C Neurauter
(74) Attorney, Agent, or Firm—Oliff & Berridge, PLC

(57) ABSTRACT

A correlation element 134 correlates a source device with a destination device according to an instruction given by the user. A decision element 122 determines whether or not a certain combination of device classes is operable as a composite device. In the case of the affirmative answer, a determination element 136 identifies the type of the composite device and specifies a user interface for operating the composite device. A data output element 132 then displays the specified user interface in a window on a monitor 170 at a specific timing. This arrangement effectively improves the operatability of the device control.

42 Claims, 34 Drawing Sheets

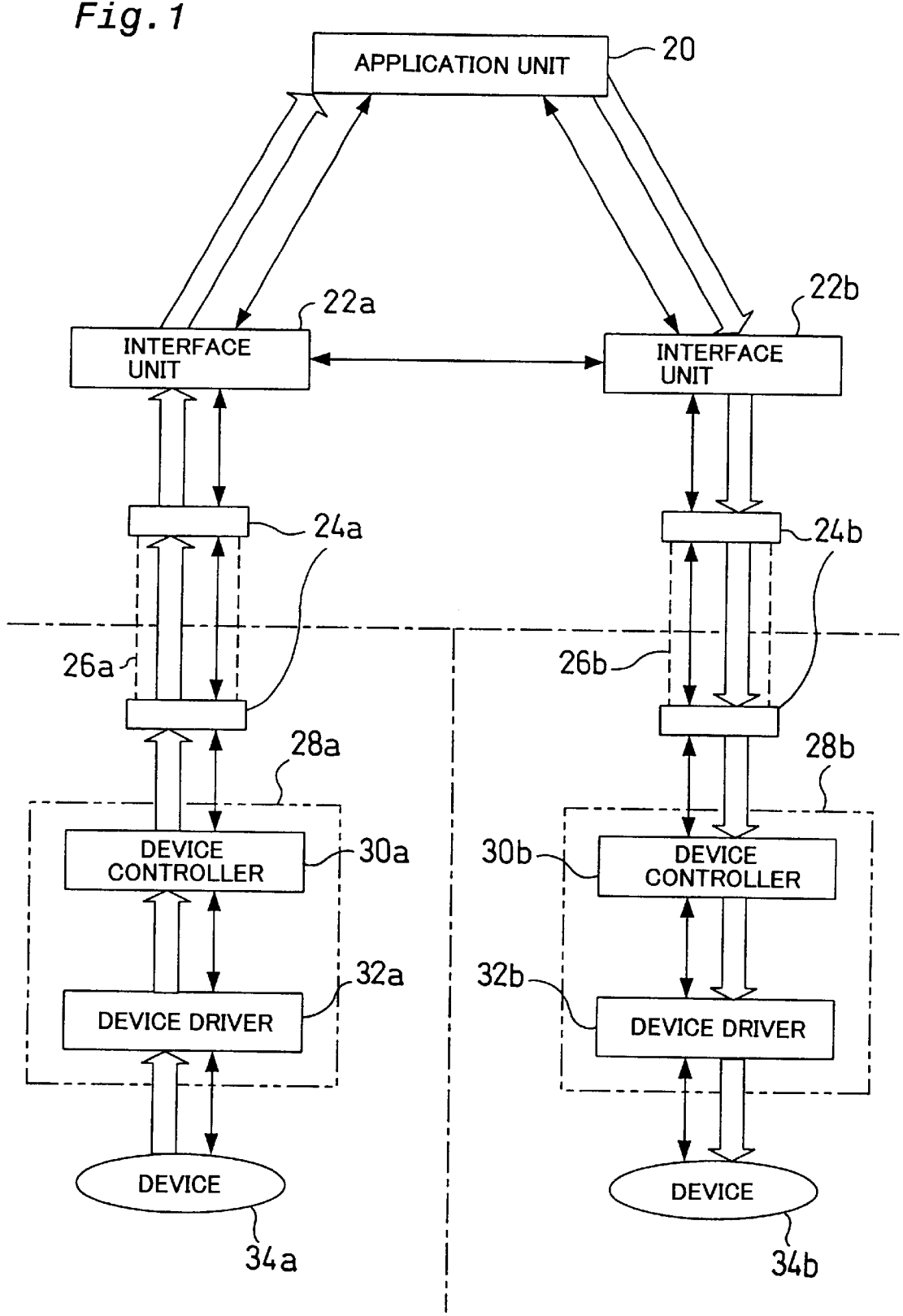

400

400

| Source Devices | Destination Devices | Date and Time of Correlation |
|---|---|---|
| Scanner C | Printer A | 98/5/5 5:55 |
| Digital Camera E | Printer B | 98/5/4 13:25 |
| Scanner F | Facsimile D | 98/4/29 16:53 |
| Scanner A | Printer E | 99/4/20 2:35 |
| Digital Camera A | Printer A | 99/4/19 21:41 |
| ⋮ | ⋮ | ⋮ |

CONTROL DEVICE FOR CONTROLLING THE TRANSMISSION AND RECEIPT OF DATA AND A METHOD OF DETERMINING THE TRANSMITTER AND THE RECEIVER OF THE DATA

BACKGROUND OF THE INVENTION

1. Field of the Invention

The present invention relates to a technique for controlling devices.

2. Description of the Related Art

In a prior art technique, for example, in a state that a computer is connected to a scanner and a printer, a specific applications program is run on the computer to read image data with the scanner and print the input image data with the printer, so as to enable functions like a copying machine.

With regard to the combination of predetermined devices (the scanner and the printer in the above example), the prior art technique enables one device to receive and process the data transmitted from the other device under the specific applications program. With regard to the combination of arbitrary devices, on the other hand, there is no guarantee that one device can receive and process the data transmitted from the other device. In some cases, effective data transfer is accordingly not allowable between these arbitrary devices.

The prior art technique causes different user interfaces for the respective devices to be displayed separately in the process of performing the data transfer between these devices. This configuration forces the user to separately specify instructions on the different user interfaces, thereby undesirably worsening the operatability.

In one exemplified configuration, it is assumed that a certain device is connected to one computer and another device is connected to another computer, among a plurality of computers connecting with one another via a network. In this configuration, the prior art technique makes it rather difficult to transfer data between the certain device and the another device according to an applications program, which is activated by still another computer, since these computers are connected to one another via the network.

SUMMARY OF THE INVENTION

The object of the present invention is thus to provide a device control system that enables effective data transfer between arbitrary devices and provides a user with optimized operatability with respect to any combination of devices.

At least part of the above and the other related objects is attained by a device control apparatus that enables control of a source device, which is a transmitter of data, and a destination device, which is a receiver of data. The device control apparatus includes: a device specification unit that specifies a source device and a destination device; and a decision unit that determines whether or not the specified destination device can receive and process data transmitted from the specified source device, based on attribute information of the specified source device and the specified destination device.

The present invention is also directed to a device control system including a source device, which is a transmitter of data, a destination device, which is a receiver of data, and a device control apparatus that enables control of the source device and the destination device. The device control apparatus includes: a device specification unit that specifies a source device and a destination device; and a decision unit that determines whether or not the specified destination device can receive and process data transmitted from the specified source device, based on attribute information of the specified source device and the specified destination device.

The present invention is further directed to a method of determining a combination of a source device, which is a transmitter of data, with a destination device, which is a receiver of data. The method includes the steps of: (a) specifying a source device and a destination device; and (b) determining whether or not the specified destination device can receive and process data transmitted from the specified source device, based on attribute information of the specified source device and the specified destination device.

As described above, in the device control apparatus, the device control system, and the method of determining a combination of devices according to the present invention, the process first specifies the source device and the destination device and subsequently determines whether or not the specified destination device can receive and process the data transmitted from the specified source device, based on the attribute information of the specified source device and the specified destination device.

In the specification hereof, the devices include not only physical devices but part of the functions of the physical devices, those having the equivalent functions to the physical devices by the software, and those handled equivalently to the physical devices. The physical devices include a scanner, a printer, a digital camera, a facsimile, a copying machine, and a variety of other computer peripheral equipment. The part of the functions of the physical devices include, for example, an external presentation of only the facsimile function of a multi-functional color copying machine. Those having the equivalent functions to the physical devices and those handled equivalently to the physical devices include, for example, electronic mail, image processing, a processing server, and an applications server. The applications server means that, for example, when an applications program automatically retrieves an image file included in a cache directory of Web browser, the applications program itself functions as a stationary image input device, such as a digital camera. In this case, the device does not have any physical entity.

In this specification, a device that enables at least transmission of data is defined as the source device, and a device that enables at least receipt of data is defined as the destination device. If a device for the intermediate processing enables at least transmission of data, the device can be regarded as the source device. If the device for the intermediate processing enables at least receipt of data, the same device can be regarded as the destination device. Namely any of such devices can be regarded as either the source device or the destination device.

In the description hereof, the specification of the source device and the destination device may be implemented by first specifying a certain group including a plurality of devices as possible candidates of at least either of the source device and the destination device and subsequently specifying at least either of a source device and a destination device in the certain group. Another possible procedure sequentially specifies at least either of source devices and destination devices in a certain group including a plurality of devices as possible candidates.

The device specification unit may specify the source device and the destination device according to an instruction given by a user or another apparatus, or automatically specify the source device and the destination device by a preset method.

The technique of the present invention carries out the determination for the combination of arbitrary devices and, in response to the affirmative result of the determination, guarantees that the destination device can receive and process the data transmitted from the source device. This accordingly ensures the effective data transfer between these arbitrary devices.

In accordance with one preferable application of the present invention, the device control apparatus further includes a user interface specification unit that, when the decision unit determines that the specified destination device can receive and process data transmitted from the specified source device, specifies a user interface for operating a composite device, which has both at least part of functions of the specified source device and at least part of functions of the specified destination device, as a user interface for operating both the specified source device and the specified destination device; and a display control unit that causes the user interface specified by the user interface specification unit to be displayed on a display unit.

In a similar manner, in accordance with one preferable application of the present invention, the method further includes the steps of: (c) when it is determined in the step (b) that the specified destination device can receive and process data transmitted from the specified source device, specifying a user interface for operating a composite device, which has both at least part of functions of the specified source device and at least part of functions of the specified destination device, as a user interface for operating both the specified source device and the specified destination device; and (d) causing the user interface specified in the step (c) to be displayed.

In this specification, the term 'operating the device' implies not only operations of the device in a narrow sense but settings, controls, and other processes of the device.

In the arrangement discussed above, for example, in the case of data transfer from the source device to the destination device, a user interface for operating a composite device having both at least parts of the respective functions of the source device and the destination device is displayed as the user interface for operating both the source device and the destination device. This arrangement does not require the user to manipulate different user interfaces for the source device and the destination device, but enables the user to specify settings simultaneously in a united user interface. This accordingly provides the user with the optimized operatability with respect to any combination of devices. The user can regard the separate devices (that is, the source device and the destination device) as one composite device and integrally operates these separate devices. This point also provides the user with the optimized operatability.

In accordance with another preferable application of the present invention, the device control apparatus further includes a data transfer execution unit that, when the decision unit determines that the specified destination device can receive and process data transmitted from the specified source device, controls the specified source device and the specified destination device, in order to enable data to be transferred from the specified source device to the specified destination device via the device control apparatus.

In a similar manner, in accordance with another preferable application of the present invention, the method further includes the step of: (c) when it is determined in the step (b) that the specified destination device can receive and process data transmitted from the specified source device, controlling the specified source device and the specified destination device, in order to enable data to be transferred from the specified source device to the specified destination device via a device control apparatus that enables control of the source device and the destination device.

This arrangement enables the effective data transfer to be actually performed from the specified source device to the specified destination device.

In accordance with still another preferable application of the present invention, the device control apparatus further includes a data transfer execution unit that, when the decision unit determines that the specified destination device can receive and process data transmitted from the specified source device, controls the specified source device and the specified destination device, in order to enable data to be transferred from the specified source device to the specified destination device not via the device control apparatus.

In a similar manner, in accordance with still another preferable application of the present invention, the method further includes the step of: (c) when it is determined in the step (b) that the specified destination device can receive and process data transmitted from the specified source device, controlling the specified source device and the specified destination device, in order to enable data to be transferred from the specified source device to the specified destination device not via a device control apparatus that enables control of the source device and the destination device.

The transmission of data from the specified source device to the specified destination device not via the device control apparatus attains the higher-speed data transfer.

In accordance with another preferable application of the device control apparatus, the device specification unit specifies the source device and the destination device, when a predetermined operation is performed with respect to both a symbol corresponding to the source device and a symbol corresponding to the destination device while both the symbols are displayed on a display unit.

In a similar manner, in accordance with another preferable application of the method, the step (a) includes the steps of: (a-1) causing a symbol corresponding to the source device and a symbol corresponding to the destination device to be displayed; and (a-2) when a predetermined operation is performed with respect to both the symbols, specifying the source device and the destination device.

The predetermined operation performed with respect to both the symbols shows that the user desires to specify the devices corresponding to these symbols. The source device and the destination device are accordingly specified in response to the user's requirement. The predetermined operation of the symbols may lay one symbol upon the other or select both the symbols and give a specific command.

The present invention is also directed to a computer program product for determining a combination of a source device, which is a transmitter of data, with a destination device, which is a receiver of data. The computer program product includes: a computer readable recording medium; a first program code that causes a computer to specify a source device and a destination device; and a second program code that causes the computer to determine whether or not the specified destination device can receive and process data transmitted from the specified source device, based on attribute information of the specified source device and the specified destination device, wherein the respective program codes are recorded in the computer readable recording medium.

The present invention is further directed to a data signal that is embodied in a carrier and represents a computer program for determining a combination of a source device, which is a transmitter of data, with a destination device, which is a receiver of data. The data signal includes: a first program code that causes a computer to specify a source device and a destination device; and a second program code that causes the computer to determine whether or not the specified destination device can receive and process data transmitted from the specified source device, based on attribute information of the specified source device and the specified destination device.

The computer executes the computer program to generate the device specification unit and the decision unit included in the device control apparatus, thereby exerting the same effects as those of the device control apparatus discussed above.

The principle of the present invention can be realized by a variety of applications, for example, a device control apparatus, a device control system, a method of determining a combination of devices, a computer program for constructing the device control system, a recording medium in which the computer program is recorded, and a data signal that includes the computer program and is embodied in a carrier.

These and other objects, features, aspects, and advantages of the present invention will become more apparent from the following detailed description of the preferred embodiment with the accompanying drawings.

BRIEF DESCRIPTION OF THE DRAWINGS

FIG. 1 is a block diagram illustrating the structure of a device control system embodying the present invention;

DESCRIPTION OF THE PREFERRED EMBODIMENTS

Figure 2A:
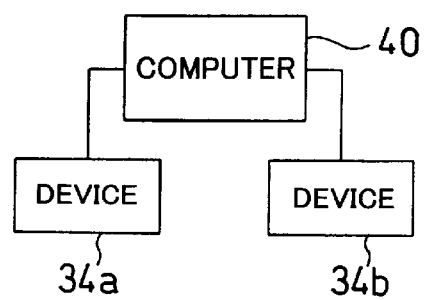
FIGS. 2A through 2C are block diagrams showing typical states of connection in the device control system of FIG. 1.

FIG. 1 is a block diagram illustrating the structure of a device control system embodying the present invention.

In the illustrated embodiment of FIG. 1, a variety of devices 34a and 34b are objects to be controlled and may be, for example, a scanner and a printer. An application unit 20 is constructed by preset applications programs and controls the variety of terminal devices 34a and 34b via several lower constituents including interface units 22a and 22b, which will be discussed later.

As shown in FIG. 1, the device control system of this embodiment mainly includes the interface units 22a and 22b, communications path abstraction units 24a and 24b, and device abstraction units 28a and 28b. These constituents are generated corresponding to the respective devices 34a and 34b by computer programs.

The device abstraction units 28a and 28b transmit information including various pieces of control information and data to and from the corresponding devices 34a and 34b and carry out abstraction of the devices, that is, abstraction of the hardware, with respect to the upper constituents, such as the interface units 22a and 22b and the application unit 20.

The device abstraction units 28a and 28b include device controllers 30a and 30b and device drivers 32a and 32b, respectively. The device drivers 32a and 32b apparently remove a difference in control procedure between the corresponding devices 34a and 34b, which is ascribed to the specific characteristics of the corresponding devices 34a and 34b, and carry out abstraction for the upper constituents, respectively. There are, however, still a difference in control procedure that is ascribed to a device class or device type.

By way of example, when both a printer A manufactured by a company A and a printer B manufactured by another company B, which are provided as the devices in this embodiment, belong to the same device class, that is, the printer class, the device driver apparently removes a difference in control procedure between the printers A and B and causes both the printers A and B to be recognized as the similar devices included in the common device class (printer class) by the upper constituents, such as the device controllers 30a and 30b.

A general printer driver for Windows (trademark by Microsoft Corporation) is designed to show the Windows GDI (graphics device interface) function outside the printer driver. When a general instruction, such as 'Print a specific letter at a certain position', is input, the printer driver converts the instruction into a series of commands peculiar to the corresponding printer and outputs the series of commands to the corresponding printer for the purpose of controlling the printer. Application of such printer drivers to the device drivers of this embodiment enables substantially complete removal of a difference in control procedure between the printers, which is ascribed to the specific characteristics of the respective printers.

The device controllers 30a and 30b, on the other hand, apparently remove a difference in control procedure, which is ascribed to the device class, with respect to the corresponding devices 34a and 34b and carry out complete abstraction of the respective devices 34a and 34b for the upper constituents, such as the interface units 22a and 22b.

As described above, the device drivers 32a and 32b apparently remove the difference in control procedure between the devices that belong to the same device class, but there is still a difference in control procedure between the device belonging to the printer class and the device belonging to the scanner class. The device controllers 30a and 30b then apparently remove a difference in control procedure, which is ascribed to the different device classes. This arrangement enables the upper constituents to recognize the different devices, which belong to the different device classes, as identical devices with respect to the control procedure.

The respective device controllers 30a and 30b provide the upper constituents, such as the interface units 22a and 22b, with identical interfaces and carry out complete abstraction of the devices.

In one simple example, the following functions may be attained by the common interfaces or general-purpose interfaces:

outputting data (data stream, data type)
inputting data (data stream, data type)
obtaining device state (state ID, state value)
setting device state (state ID, state value)
obtaining device attribute (attribute ID, attribute value)
setting device attribute (attribute ID, attribute value)

Examples of parameters are given in the parentheses.

Standardizing the interface to the upper constituents by each device controller naturally causes some device classes to be under meaningless controls (functions). The upper constituents, however, can specify the adequate controls for each device by examining the properties of each device in advance.

The device drivers 32a and 32b are provided respectively corresponding to the devices 34a and 34b as mentioned above. It is, however, not necessary to provide the device controllers corresponding to the respective devices, but is sufficient to provide the device controllers corresponding to specific device classes.

The interface units 22a and 22b transmit information including various pieces of control information and data to and from the application unit 20 and the corresponding device abstraction units 28a and 28b, while providing the upper application unit 20 with identical interfaces. The various pieces of control information and other information are also transmitted between the interface units 22a and 22b. The interface units 22a and 22b also have the function of displaying icons, which represent the corresponding devices 34a and 34b in an abstract manner, in a window on display means (not shown).

In the device control system of this embodiment, there are boundaries, as shown by the one-dot chain lines in FIG. 1, between the interface unit 22a and the device abstraction unit 28a, between the interface unit 22b and the device abstraction unit 28b, and between the device abstraction units 28a and 28b. In general, process boundaries are present in one identical computer, whereas network boundaries are present between different computers. Each of the boundaries shown by the one-dot chain line represents either the process boundary or the network boundary.

FIGS. 2 and 3 are block diagrams illustrating typical examples of connection in the device control system of FIG. 1.

In the example of FIG. 2A, the two devices 34a and 34b shown in FIG. 1 are directly connected to one computer 40. In this configuration, the constituents other than the devices 34a and 34b, that is, the application unit 20, the interface units 22a and 22b, the communications path abstraction units 24a and 24b, and the device abstraction units 28a and 28b shown in FIG. 1 are all present in the same computer 40. All the boundaries shown by the one-dot chain lines in FIG. 1 accordingly represent the process boundaries.

Figure 2B:
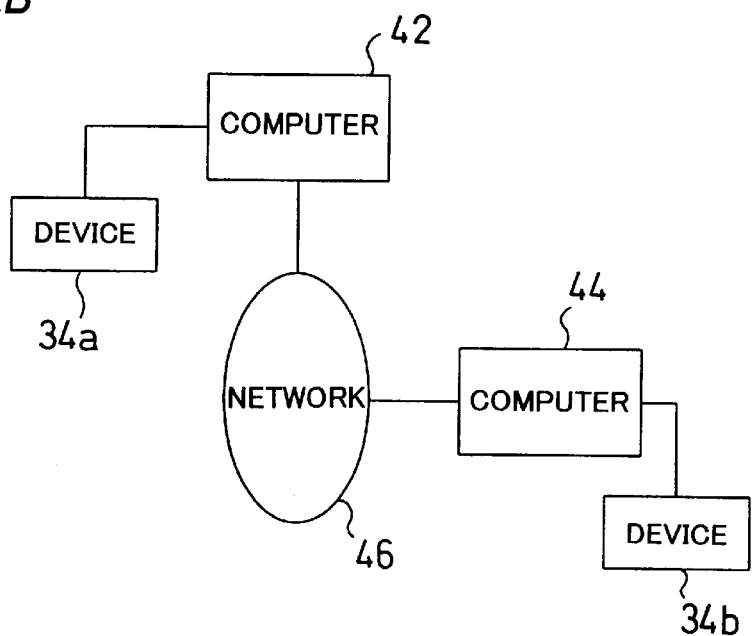

In the example of FIG. 2B, two computers 42 and 44 are connected to each other via a network 46, and the two devices 34a and 34b are respectively connected to these two computers 42 and 44. In this configuration, among the main constituents other than the devices 34a and 34b, the application unit 20, the interface units 22a and 22b, and the device abstraction unit 28a are present in one computer 42, and the device abstraction unit 28b is present in the other computer 44. Namely the application unit 20, the interface units 22a and 22b, and the device abstraction unit 28a are present in the identical computer 42, whereas the device abstraction unit 28b is present in the different computer 44. The boundary shown by the one-dot chain line between the interface unit 22a and the device abstraction unit 28a accordingly represents the process boundary. The boundaries shown by the one-dot chain lines between the interface unit 22b and the device abstraction unit 28b and between the device abstraction units 28a and 28b, on the other hand, represent the network boundaries.

A variety of networks, such as the Internet, an Intranet, a local area network (LAN), and a wide area network (WAN), may be applicable to the network 46.

Figure 2C:
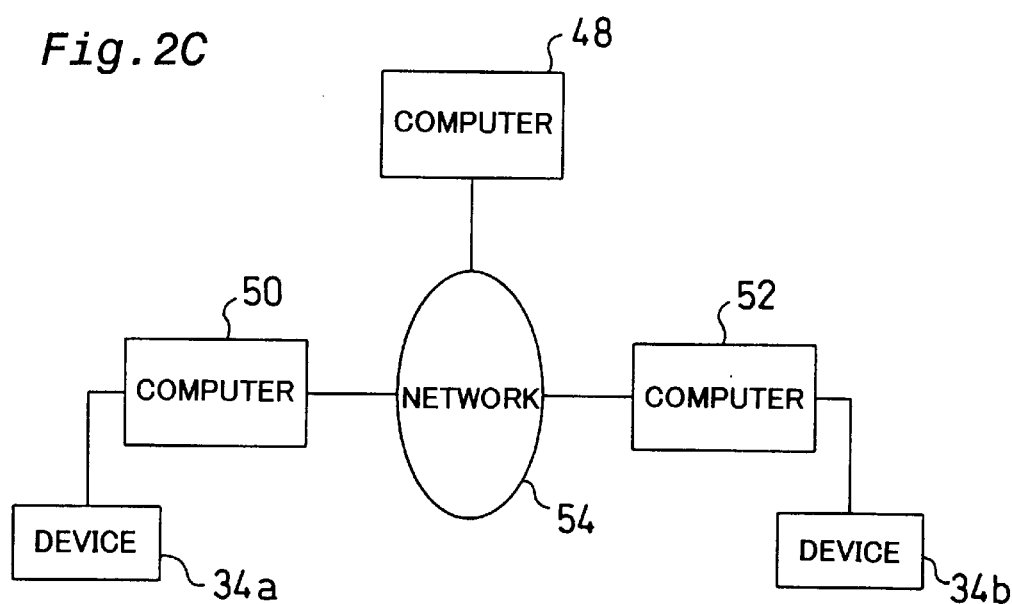

In the example of FIG. 2C, three computers 48, 50, and 52 are connected to each other via a network 54, and the two devices 34a and 34b are respectively connected to two of these computers 50 and 52. In this configuration, among the main constituents other than the devices 34a and 34b, the application unit 20 and the interface units 22a and 22b are present in the first computer 48, the device abstraction unit 28a is present in the second computer 50, and the device abstraction unit 28b is present in the third computer 52. Namely the device abstraction units 28a and 28b are present in the different computers, which are further different from the computer in which the application unit 20 and the interface units 22a and 22b are present. All the boundaries shown by the one-dot chain lines in FIG. 1 accordingly represent the network boundaries.

In the examples of FIG. 2, a variety of computers, such as a personal computer, a mobile computer, an information processing terminal, and a work station, as well as peripheral equipment substantially having the computer functions, such as a copying machine and a printer, set top boxes substantially having the computer functions, such as a receiver terminal of Web TV and other information terminals, and game machines may be applicable for each of the computers. Although the devices are externally connected to the computers in the examples of FIG. 2, the devices and the computers may be integrally constructed as shown in FIG. 3.

Figure 3A:
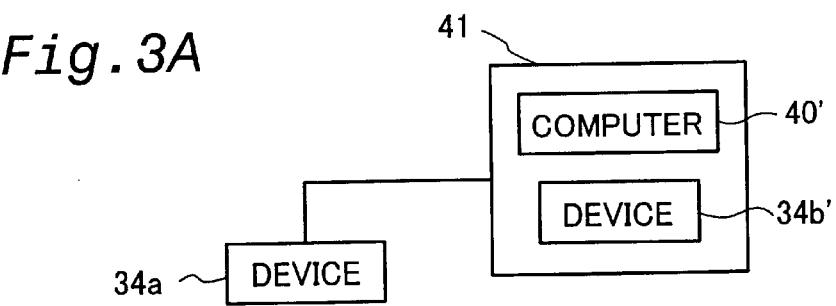
FIGS. 3A through 3C are block diagrams showing other available states of connection in the device control system of FIG. 1.
Figure 3B:
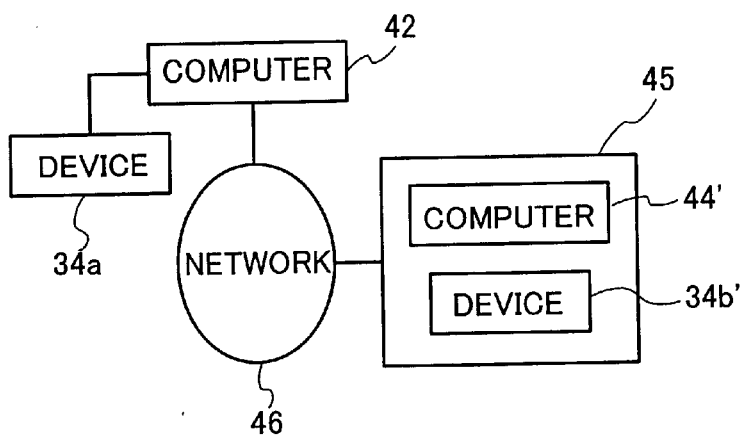
Figure 3C:
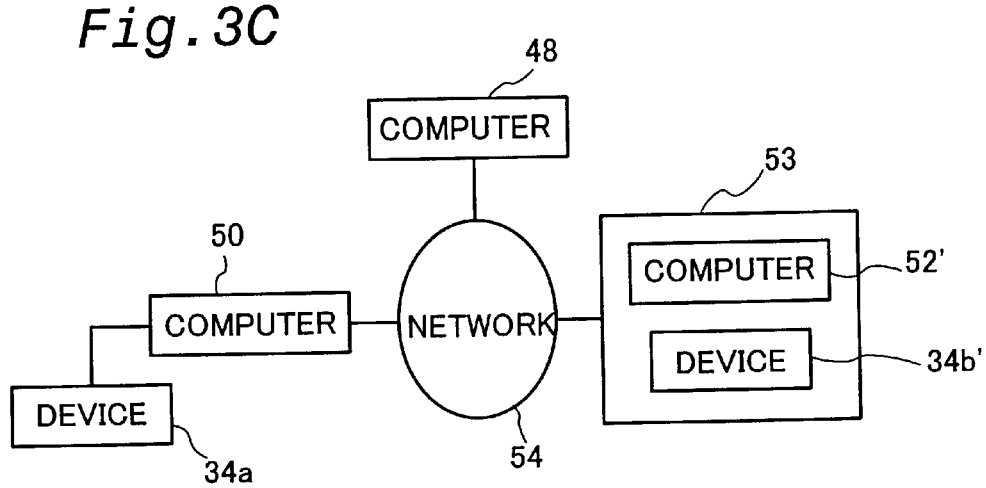

In the example of FIG. 3A, a machine 41 includes a device unit 34b' and a computer unit 40'. Namely the device and the computer are integrated with each other. In a similar manner, in the example of FIG. 3B, a machine 45 includes a device unit 34b' and a computer unit 44'. In the example of FIG. 3C, a machine 53 includes a device unit 34b' and a computer unit 52'. In any of these examples, the device and the computer are integrated with each other.

Referring back to FIG. 1, as described previously, the process boundaries or the network boundaries shown by the one-dot chain lines are present between the interface unit 22a and the device abstraction unit 28a, between the interface unit 22b and the device abstraction unit 28b, and between the device abstraction units 28a and 28b. Communications paths 26a and 26b are present between the interface unit 22a and the device abstraction unit 28a and between the interface unit 22b and the device abstraction unit 28b to connect the interface unit 22a with the device abstraction unit 28a and the interface unit 22b with the device abstraction unit 28b across these boundaries, respectively. These communications paths 26a and 26b may have different types, such as internal buses, communications interfaces, and network communication means, according to whether each of the boundaries is the process boundary or the network boundary.

The communications path abstraction units 24a and 24b are provided on both ends of the communications paths 26a and 26b between the interface unit 22a and the device abstraction unit 28a and between the interface unit 22b and the device abstraction unit 28b, respectively. The communications path abstraction units 24a and 24b carry out abstraction of the communications paths 26a and 26b interposed between the interface unit 22a and the device abstraction unit 28a and between the interface unit 22b and the device abstraction unit 28b, while the interface units 22a and 22b respectively transmit various pieces of control information and data to and from the device abstraction units 28a and 28b via the communications paths 26a and 26b across the process boundary or the network boundary. Namely the communications path abstraction units 24a and 24b apparently remove a difference in control procedure, which is ascribed to the different types of the interposed communications paths 26a and 26b, and enable the interface units 22a and 22b and the device abstraction units 28a and 28b to transmit the control information and data between each other without taking into account whether the boundary is the process boundary or the network boundary.

The constructions of the communications path abstraction units 24a and 24b will be described later in detail.

As mentioned above, the interface units 22a and 22b, the communications path abstraction units 24a and 24b, and the device abstraction units 28a and 28b are implemented by the computer programs. In accordance with a concrete procedure, a CPU in each computer, where the respective constituents are present, reads and executes desired computer programs stored in an internal memory, and thereby functions as the constituents included in the computer.

The computer programs stored in the internal memory may be provided in a form recorded in a recording medium, such as a CD-ROM, in a computer readable manner as described later. The computer programs recorded in the recording medium are read by a reading device, such as a CD-ROM drive, and are transferred to and stored into an external storage device, such as a hard disk. On the activation of the computer, for example, these computer programs are transferred to the internal memory according to the requirements. Alternatively the computer programs read by the reading device may be transferred to the internal memory not via the external storage device but directly.

Although the CD-ROM is utilized as the 'recording medium' in which the computer programs are recorded in the computer readable manner in this embodiment, a variety of other computer readable media may be used alternatively, for example, flexible disks, magneto-optic discs, IC cards, ROM cartridges, punched cards, prints with barcodes or other codes printed thereon, and internal storage devices (memories like a RAM and a ROM) and external storage devices of the computer.

Another possible procedure has access to a program server (not shown), which supplies computer programs, via a network and takes the computer programs out of the program server into each computer.

Part of the computer programs may be constructed as an operating system program.

The processing operations of the device control system shown in FIG. 1 are briefly described. When a user of the computer, in which the application unit 20 and the interface units 22a and 22b are present, inputs an instruction for setting the device 34a into the application unit 20 via input means (not shown), such as a keyboard and a mouse, the application unit 20 transmits the instruction to the interface unit 22a. The interface unit 22a further transmits the instruction to the device abstraction unit 28a via the communications path 26a. The device abstraction unit 28a sets the device 34a according to the instruction.

When the user inputs an instruction for transferring data from the device 34a to the device 34b into the application unit 20, the application unit 20 transmits the instruction to the interface units 22a and 22b. The interface units 22a and 22b have communication with each other according to the instruction and determine whether or not effective data transfer is available between the devices 34a and 34b, that is, whether or not the device 34b can receive and process the data transmitted from the device 34a.

When it is determined that the effective data transfer is available, that is, it is determined that the device 34b can receive and process the data transmitted from the device 34a, the interface unit 22a transmits the instruction of data transfer to the device abstraction unit 28a via the communications path 26a. The device abstraction unit 28a then inputs data from the device 34a and transmits the data to the interface unit 22a via the communications path 26a. The interface unit 22a further transmits the data to the application unit 20, which causes the data to be subjected to predetermined processing, calls the interface unit 22b, and transmits the processed data to the interface unit 22b. The interface unit 22b calls the device abstraction unit 28b via the communications path 26b and transmits the data to the device abstraction unit 28b. The device abstraction unit 28b outputs the transmitted data to the device 34b. The device 34b causes the input data to be subjected to predetermined processing.

In FIG. 1, black arrows represent transmission of information including various pieces of control information, while open arrows represent the flow of data transferred.

Figure 4:
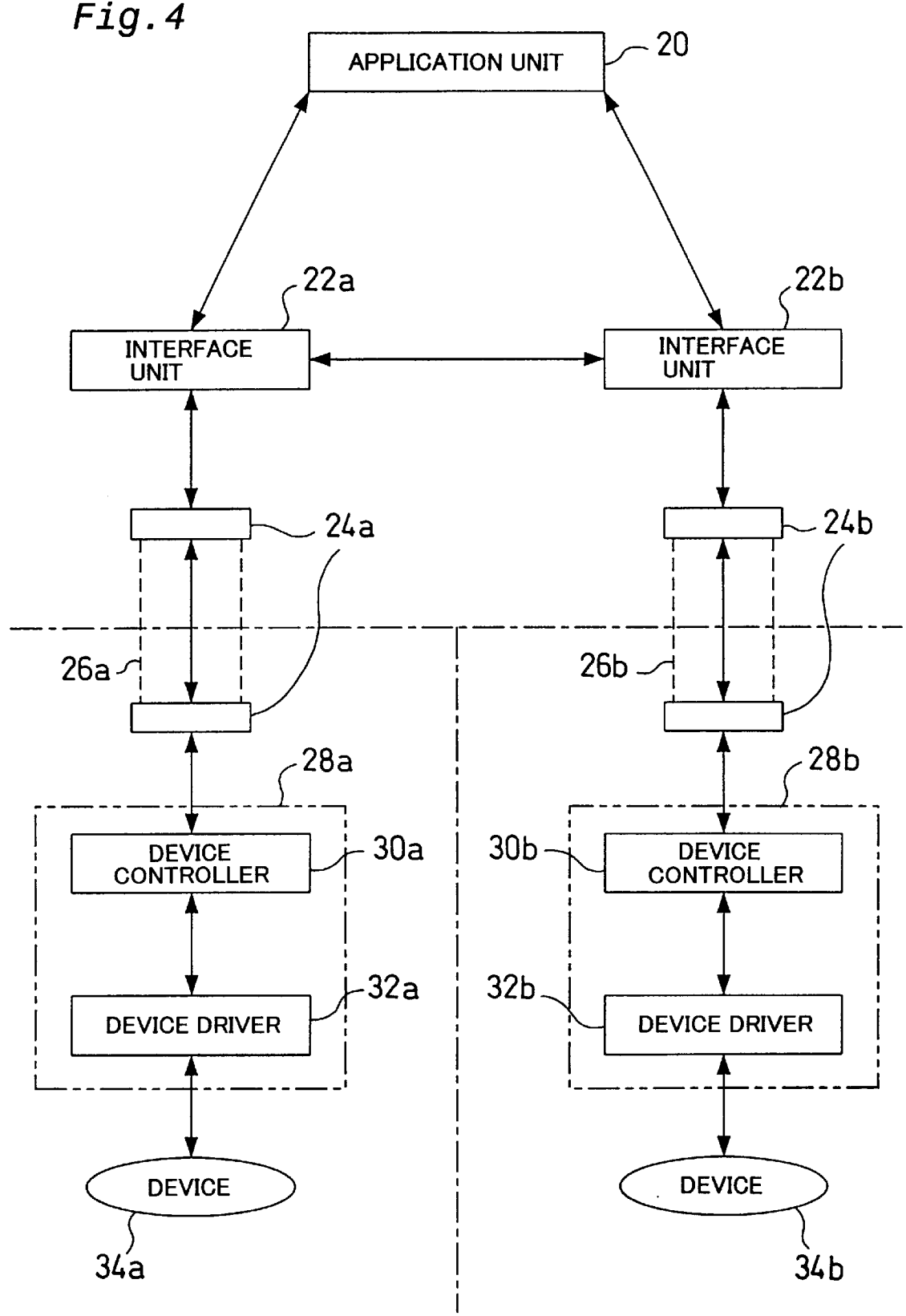
FIG. 4 is a block diagram showing a different data transfer technique applicable to the device control system of FIG. 1.
Figure 5:
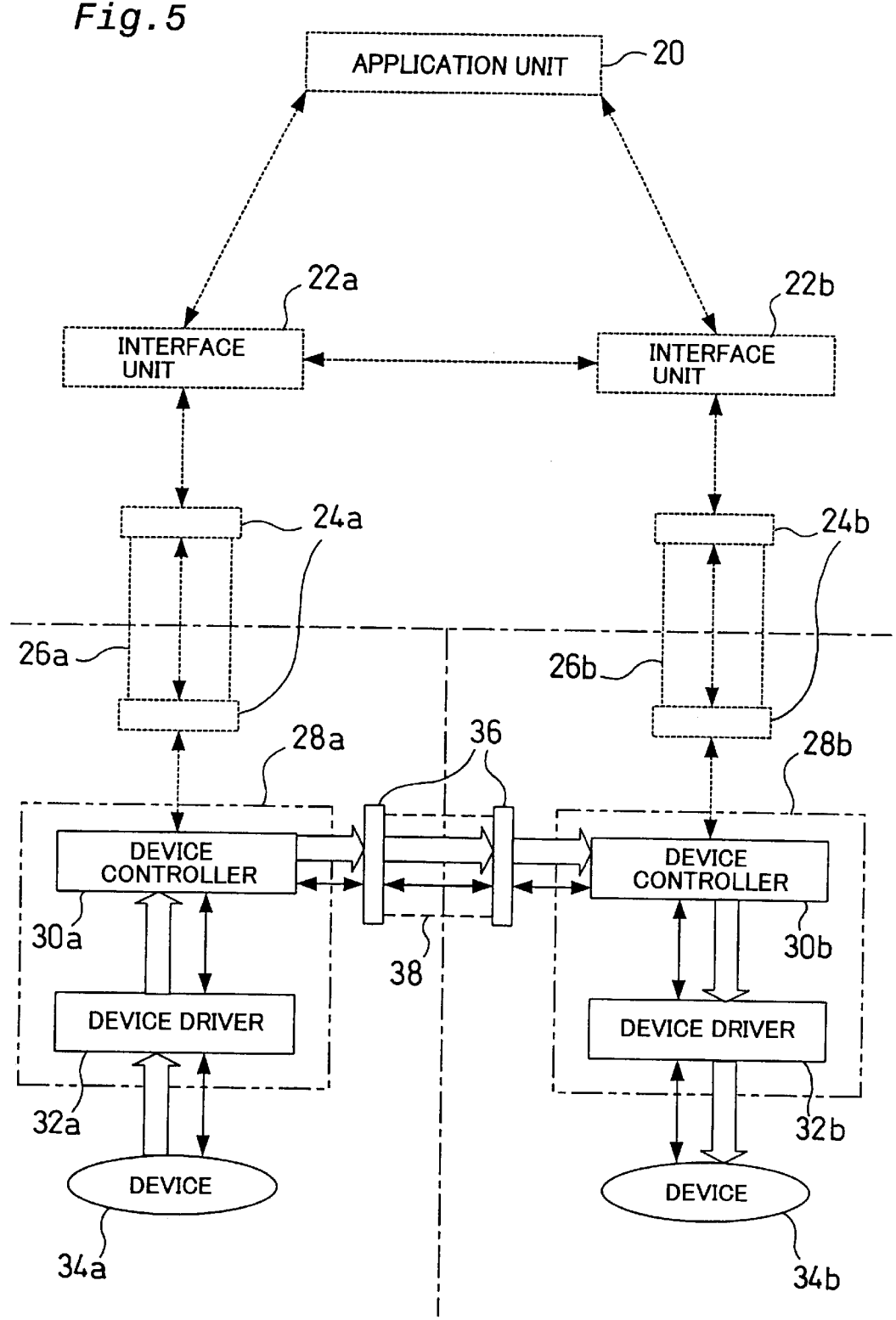
FIG. 5 is a block diagram showing the different data transfer technique applicable to the device control system of FIG. 1.

A different technique may be applied for the data transfer. FIGS. 4 and 5 are block diagrams illustrating another data transfer technique applicable to the device control system of FIG. 1. Referring to FIG. 4, when the user inputs an instruction for transferring data from the device 34a to the device 34b into the application unit 20, the application unit 20 transmits the instruction to the interface units 22a and 22b. The interface units 22a and 22b have communication with each other according to the instruction and determine whether or not effective data transfer is available between the devices 34a and 34b, that is, whether or not the device 34b can receive and process the data transmitted from the device 34a.

When it is determined that the effective data transfer is available, that is, it is determined that the device 34b can receive and process the data transmitted from the device 34a, the interface units 22a and 22b transmit the instruction of data transfer to the device abstraction units 28a and 28b via the communications paths 26a and 26b. As shown in FIG. 5, this cuts of the connections between the interface unit 22a and the device abstraction unit 28a and between the interface unit 22b and the device abstraction unit 28b, and newly establishes a connection between the device controller 30a of the device abstraction unit 28a and the device controller 30b of the device abstraction unit 28b via a communications path 38. A pair of communications path abstraction units 36 are newly generated to carry out abstraction of the communications path 38 interposed between the device abstraction units 28a and 28b, while the device abstraction units 28a and 28b transmit the various pieces of control information and data with each other via the communications path 38 across the process boundary or the network boundary. The communications path abstraction units 36 thus apparently remove a difference in control procedure, which is ascribed to the type of the interposed communications path 38, and enable the device abstraction units 28a and 28b to transmit the control information and data between each other without taking into account whether the boundary is the process boundary or the network boundary.

After the connection is established between the device abstraction units 28a and 28b, the device abstraction unit 28a inputs data from the device 34a, calls the device abstraction unit 28b via the communications path 38, and transmits the input data to the data abstraction unit 28b. The device abstraction unit 28b outputs the transmitted data to the device 34b. The device 34b causes the input data to be subjected to predetermined processing.

After completion of the data transfer, the procedure cuts off the connection between the device abstraction units 28a and 28b and reestablishes the connections between the interface unit 22a and the device abstraction unit 28a and between the interface unit 22b and the device abstraction unit 28b.

In the data transfer technique described above, the communications path 38 bypasses the data transfer passage. When the computer system applied has, for example, the configuration shown in FIG. 2C or the configuration shown in FIG. 3C, the network boundary interposed between the device abstraction units 28a and 28b is accordingly optimized, and the computer 48, in which the application unit 20 and the interface units 22a and 22b are present, is not at all involved in the data transfer. This arrangement ensures the high-speed data transfer.

As mentioned above, when the user inputs an instruction for transferring data from the device 34a to the device 34b, the interface units 22a and 22b have communication with each other according to the instruction and determine whether or not effective data transfer is available between the devices 34a and 34b, that is, whether or not the device 34b can receive and process the data transmitted from the device 34a.

In accordance with one concrete procedure, the interface units 22a and 22b refer to re information of devices of interest, that is, the devices 34a and 34b, and carry out the determination discussed above. The attribute information referred to by the interface units 22a and 22b includes the type of the device, a piece of information for specifying either a source device or a destination device, a piece of information for specifying either a push type or a pull type (that is, either the source side or the destination side is mainly responsible for the data transfer), the processible data formats, the state of the device (for example, operable or not), the performance of the device (for example, the processing speed), the location of the device (for example, the section and the floor), the processing cost (for example, the communication cost and the printing cost) of the device, and the presence or non-presence of a support for a special data transfer method.

Other than for the purpose of determination, the attribute information is also used to obtain an evaluation value that represents a degree of effectiveness with respect to each combination of devices of interest as discussed later.

The attribute information may be stored in the computer where the application unit 20 and the interface units 22a and 22b are present, or alternatively be stored in the computer where the device controller and the device driver are present. In the latter case, the interface units 22a and 22b establish connections with the corresponding device controllers 30a and 30b, have communications with the device controllers 30a and 30b according to the requirements, refer to the attribute information, and carry out the determination regarding the effective data transfer. The attribute information may alternatively be stored in another computer (for example, a server) on the network, which is different from the computer where the application unit 20 and the interface units 22a and 22b are present. In this case, the interface units 22a and 22b establish connections with the server, refer to the attribute information stored in the server, and carry out the determination regarding the effective data transfer.

In the event that data can be transmitted from one device and received and processed by the other device, even if these devices are connected to each other via a network, the user may occasionally regard these devices as one device. Such a device is referred to as the composite device in this specification. The composite device represents a virtual device having at least part of the functions of one device that transmits data and at least part of the functions of the other device that receives data, out of a plurality of devices of interest. When the data are transmitted from the device 34a and received and processed by the device 34b like the above example, the devices of interest are the devices 34a and 34b. The virtual device having at least part of the functions of the device 34a and at least part of the functions of the device 34b is accordingly regarded as the composite device.

In some combinations of arbitrary devices, while one device transmits data, the other device may not be able to receive and process the data. In such cases, the virtual composite device is inoperable in the actual state.

One of the available techniques thus determines whether or not a combination of arbitrary devices is operable as the composite device as discussed later, so as to determine whether or not one arbitrary device can receive and process the data transmitted from the other arbitrary device The following describes a concrete example where a COM (Component Object Model) technique is applied to realize the device control system shown in FIG. 1.

The COM is an infrastructure that has been proposed and promoted by Microsoft Corporation to aggregate objects. The COM defines a method of building dynamically exchangeable components and represents a specification of standard component architecture.

In the COM technique, services provided by the software are implemented as COM objects. Each COM object supports at least one interface and is identified by a class ID. In this concrete example, among the constituents shown in FIG. 1, the interface units 22a and 22b and the device controllers 30a and 30b are constructed as COM objects.

The interface supported by the COM object generally includes a plurality of methods that have some relation to one another. Each interface is identified by an interface ID. The method is a function call for executing a specific function. A pointer to a specific interface is required to call a method included in the specific interface. The pointer to the specific interface is obtained by specifying the interface ID, which identifies the specific interface, and the class ID, which identifies the COM object that supports the specific interface, and calling a service of a COM library.

Figure 6:
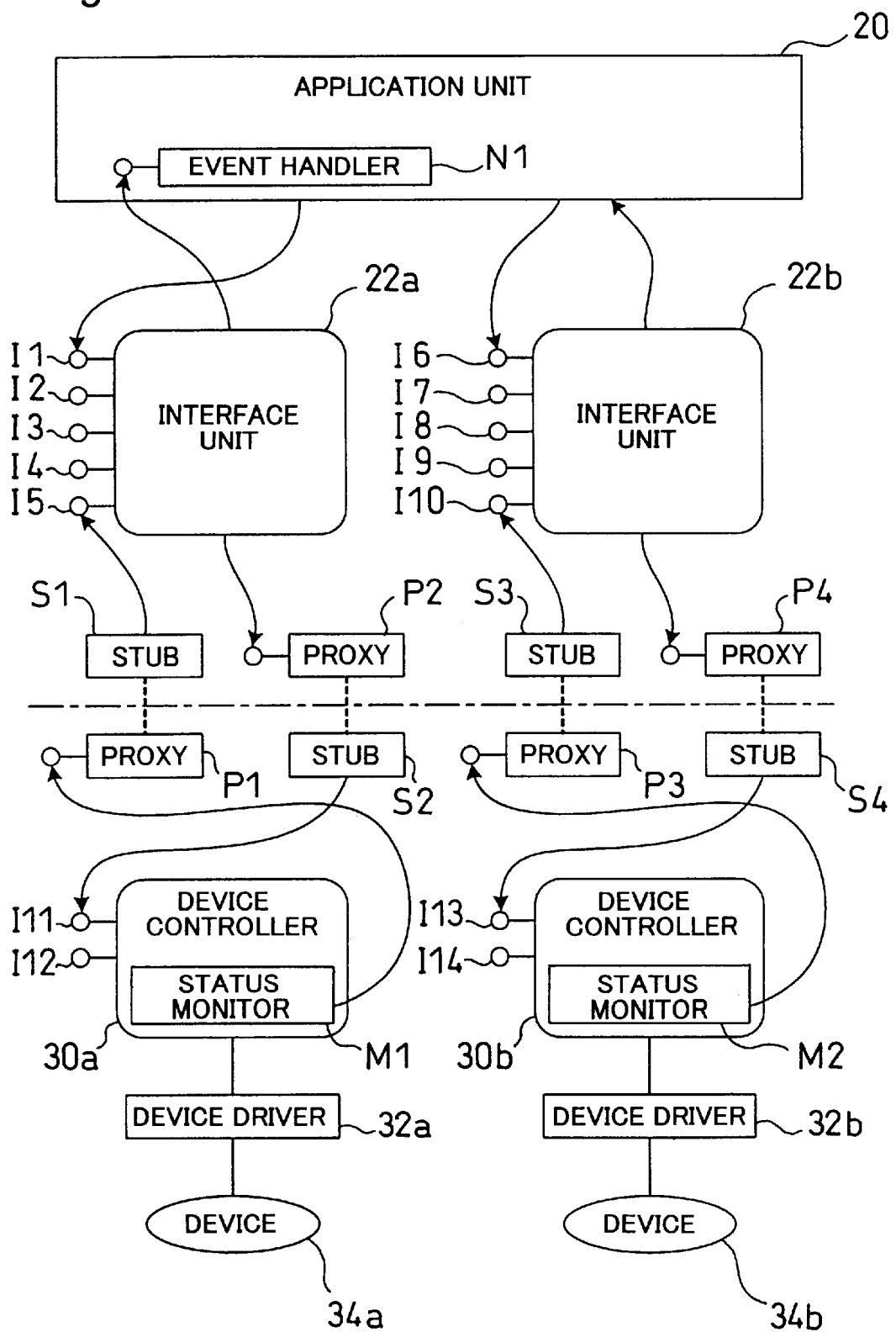
FIG. 6 is a block diagram illustrating a concrete example where the COM technology is applied to realize the device control system shown in FIG. 1.

FIG. 6 is a block diagram illustrating a concrete example where the COM technology is applied to realize the device control system shown in FIG. 1.

Referring to FIG. 6, the application unit 20 functions according to the applications programs as discussed previously and has an event handler N1 incorporated therein.

The interface units 22a and 22b are constructed as the COM objects as mentioned above and support a plurality of interfaces I1 through I10. In FIG. 6, the interfaces are shown by open circles. Among these interfaces, I1 and I6 are ICyberPlugs, I2 and I7 are IContextMenus, I3 and I8 are IDropSources, I4 and I9 are IDropTargets, and I5 and I10 are ICyberEvents. The IContextMenus I2 and I7, the IDropSources I3 and I8, and the IDropTargets I4 and I9 are general interfaces, whereas the ICyberPlugs I1 and I6 and the ICyberEvents I5 and I10 are original interfaces in this concrete example.

As described previously, the interface units 22a and 22b provide the upper application unit 20 with identical interfaces or general-purpose interfaces. The ICyberPlugs I1 and I6 correspond to the general-purpose interfaces.

The interface units 22a and 22b support other interfaces, such as IDataObjects, as well as the above interfaces.

The device controllers 30a and 30b are also constructed as the COM objects as mentioned above and support a plurality of interfaces I11 through I14. Among these interfaces, I11 and I13 are ICyberProtocols, and I12 and I14 are ICyberEvents. These interfaces I11 through I14 are all original interfaces in this concrete example. The device controllers 30a and 30b respectively include status monitors M1 and M2 as modules.

As described previously, the device controllers 30a and 30b provide the upper constituents including the interface units 22a and 22b with identical interfaces or general-purpose interfaces, in order to attain the complete abstraction of devices. The ICyberProtocols I11 and I13 correspond to the general-purpose interfaces.

The device drivers 32a and 32b and the devices 34a and 34b in the example of FIG. 6 are identical with those in FIG. 1.

In the example of FIG. 6, proxies P1 and P2 and stubs S1 and S2 constitute the communications path abstraction unit 24a shown in FIG. 1. Proxies P3 and P4 and stubs S3 and S4 constitute the communications path abstraction unit 24b. Such proxies and stubs are generated by the mechanism of COM/DCOM (distributed COM). The COM/DCOM is the mechanism normally supported by Windows platforms.

The following describes the mechanism of implementing the abstraction of the communications paths by the functions of the proxies and stubs constituting the communications path abstraction units 24a and 24b.

In the COM technique, in the process of calling a method included in an interface (hereinafter referred to as the interface call), a calling side is referred to as a client and a called side is referred to as a server. The server may work (a) in an identical process (identical address space) on the same computer as the client, (b) in a different process (different address space) on the same computer as the client, or (c) in a process (address space) on a different computer from the client.

In the case where the boundaries (shown by the one-dot chain lines in FIG. 1) interposed between the interface unit 22a and the device controller 30a and between the interface unit 22b and the device controller 30b are the process boundaries, the interface units 22a and 22b and the device controllers 30a and 30b hold the server-client relationship of (b). In the case where these boundaries are the network boundaries, on the other hand, the interface units 22a and 22b and the device controllers 30a and 30b hold the server-client relationship of (c).

In the cases of (b) and (c), the server works in a different address space or process from that of the client. It is accordingly impossible to apply a simple call, such as a function call, to the interface call. In this concrete example, in order to call an interface realized by the server, the client first generates a proxy, which supports the identical interface with that of the server, in the same process or address space as that of the client, and calls the interface via the proxy. The proxy converts the interface call by the client into a remote procedure call (RPC) or a lightweight remote procedure call (LRPC), and calls a stub generated in the same process or address space as that of the server. The stub restores the remote procedure call or the lightweight remote procedure call into the original interface call and calls the target interface included in the server. The subsequent return of the interface call follows the reverse of the above procedure.

The remote procedure calls is a mechanism for calling a function over a network boundary and converts the function call into data transmission on the network. The remote procedure call is accordingly applied in the case of (c). The lightweight remote procedure calls is a mechanism for calling a function over a process boundary on the same computer and implements the function call through the inter-process communication. The lightweight remote procedure call is accordingly applied in the case of (b).

The method of converting the interface call into the remote procedure call or the lightweight remote procedure call and allowing the transmission between the proxy and the stub apparently removes a difference in control procedure, which is scribed to the different types of the communications paths, and implements the interface call without taking into account whether the boundary is the process boundary or the network boundary, thereby enabling the abstraction of the communications paths.

Figure 7A:
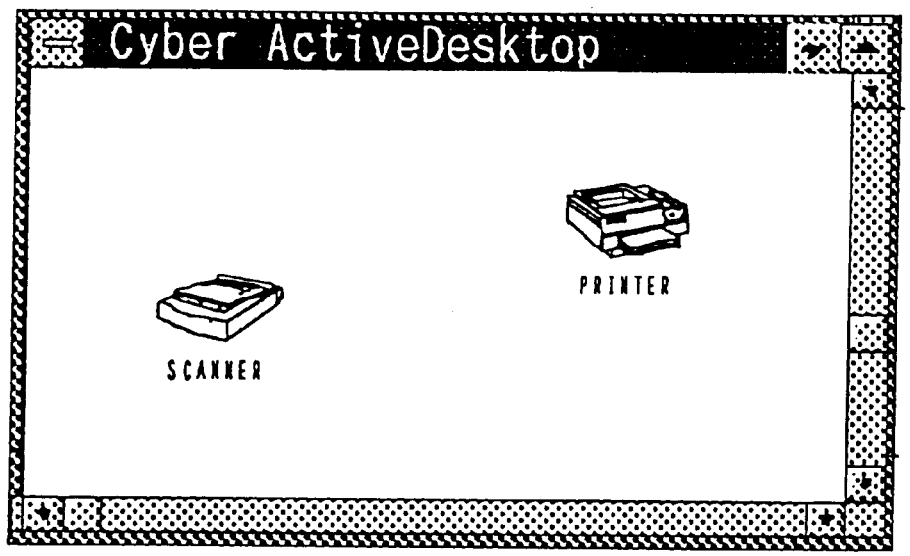
FIGS. 7A and 7B show an operation of a scanner icon and a printer icon displayed in a window.

The operation of this concrete procedure is described below with the drawings of FIGS. 6, 7A, and 7B. In the following description, the device 34a is a scanner and the device 34b is a printer.

A scanner as the device 34a and a printer as the device 34b are mounted in advance as objects to be controlled in a display area of an application by the application unit 20. A scanner icon and a printer icon are displayed in the window on display means (not shown), such as a CRT, by the interface units 22a and 22b as shown in FIG. 7A. This arrangement enables the user of the computer where the application unit 20 is present to carry out a variety of required operations with respect to the scanner and the printer.

It is assumed that the user operates an icon displayed in a window with manipulation means (not shown), such as a keyboard or a mouse. In the event that the operation of the icon by the user specifies settings of the scanner, for example, by clicking a right button of the mouse on the scanner icon, the application unit 20 calls the IContextMenu I2 from the interface unit 22a corresponding to the scanner or the device 34a. The IContextMenu I2 displays a pop-up menu for the scanner context in the vicinity of the scanner icon and has communication with the device controller 30a to specify the settings of the scanner as the device 34a in response to an option selected among the pop-up menu by the user.

In the event that the operation of the icon by the user is a drag and drop operation of the icon, the following procedure is carried out.

Figure 7B:
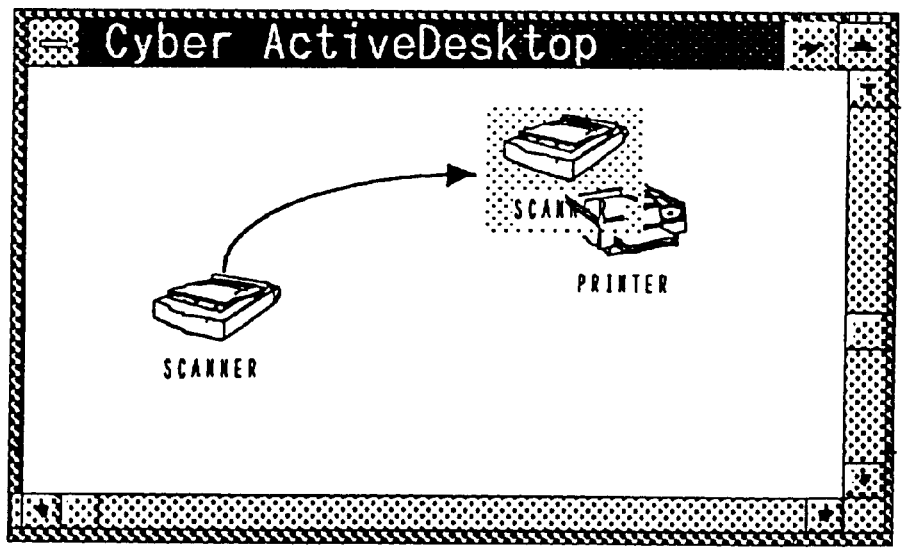

When the user drags the scanner icon onto the printer icon displayed in the window with a mouse cursor as shown in FIG. 7B, the interface unit 22b causes the IDropSource I3 supported by the interface unit 22a to be transmitted to the IDropTarget I9 supported by the interface unit 22b. In accordance with a concrete procedure, one of the methods included in the IDropTarget I9 is called by using the pointer of the IDropSource I3 as a parameter.

In the interface unit 22b, the IDropTarget I9 takes a pointer of the ICyberPlug I1 supported by the interface unit 22a out of the transmitted IDropSource I3 and asks the ICyberPlug I6 supported by the interface unit 22b whether the data transfer between the ICyberPlugs I6 and I1 is available.

At this moment, the interface units 22a and 22b respectively establish the connections with the corresponding device controllers 30a and 30b, have communications with the device controllers 30a and 30b according to the requirements, and determine whether or not the data transfer is available.

In the event that the data transfer is available, the interface units 22a and 22b set the mouse cursor, which is displayed in the window and is being dragged, in a first shape representing the permission of the drag and drop operation. In the event that the data transfer is not available, on the other hand, the interface units 22a and 22b set the mouse cursor in a second shape representing the prohibition of the drag and drop operation.

In the state that the data transfer is available, when the user operates the mouse and drops the dragged scanner icon upon the printer icon, in the interface unit 22b, the IDropTarget I9 transmits the ICyberPlug I1 supported by the interface unit 22a to a method of starting data transfer included in the ICyberPlug I6 and entrusts the actual processing to the ICyberPlug I6.

The actual data transfer is implemented in the following manner. When the data transfer is carried out via the interface unit 22a, the application unit 20, and the interface unit 22b as shown in FIG. 1, the actual data transfer follows a procedure shown in FIGS. 8 through 12. When the data transfer is carried out directly between the device controllers 30a and 30b as shown in FIG. 5, on the other hand, the actual data transfer follows a procedure shown in FIGS. 13 through 17.

FIGS. 8 through 12 show a process of data transfer in time series in the device control system of FIG. 6. In these drawings, the parts that are mainly involved in a currently executed step are shown by the solid lines, whereas the parts that are hardly involved in the currently executed step are shown by the broken lines.

Figure 8:
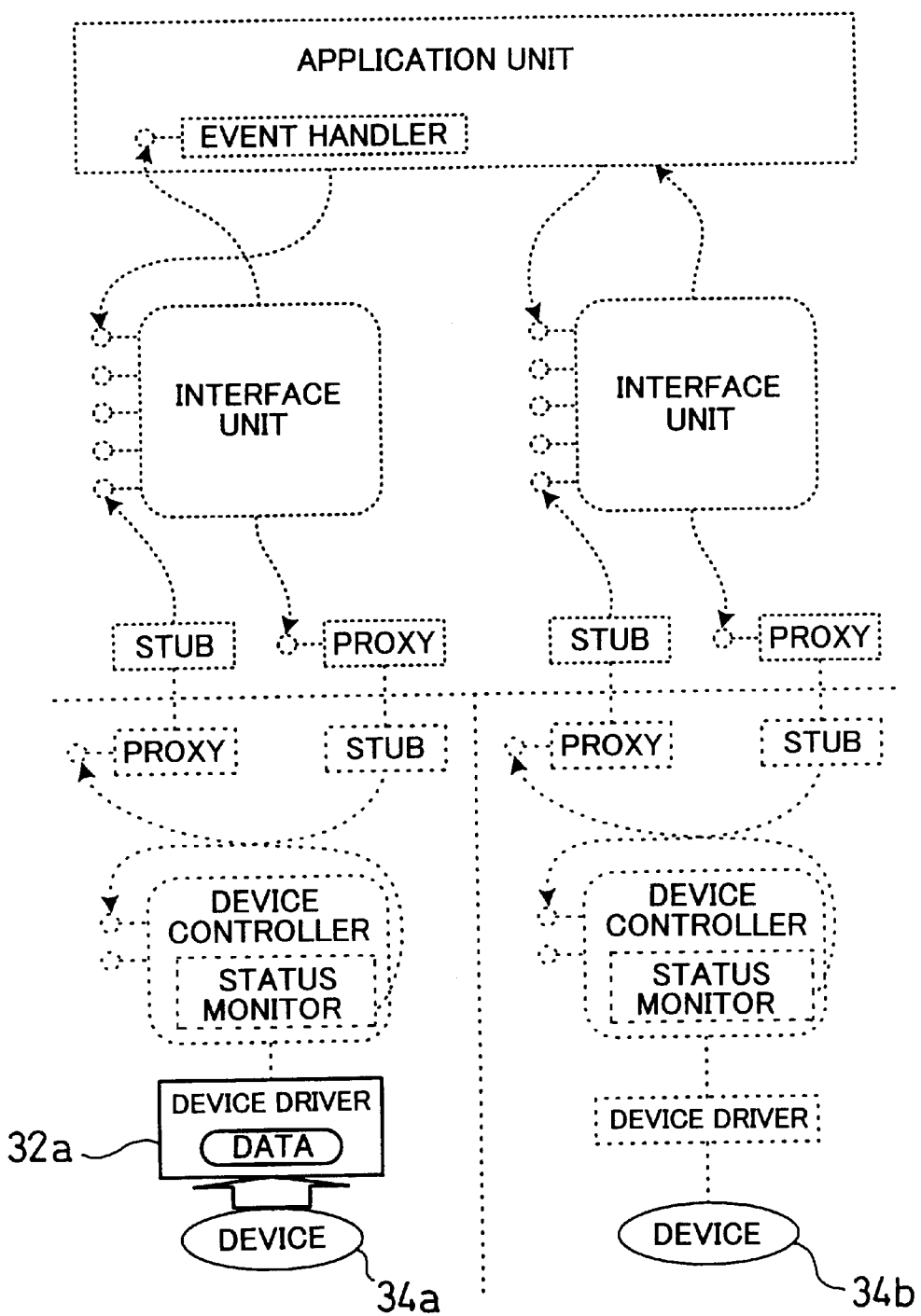
FIG. 8 shows a process of data transfer carried out in the device control system of FIG. 6.
Figure 9:
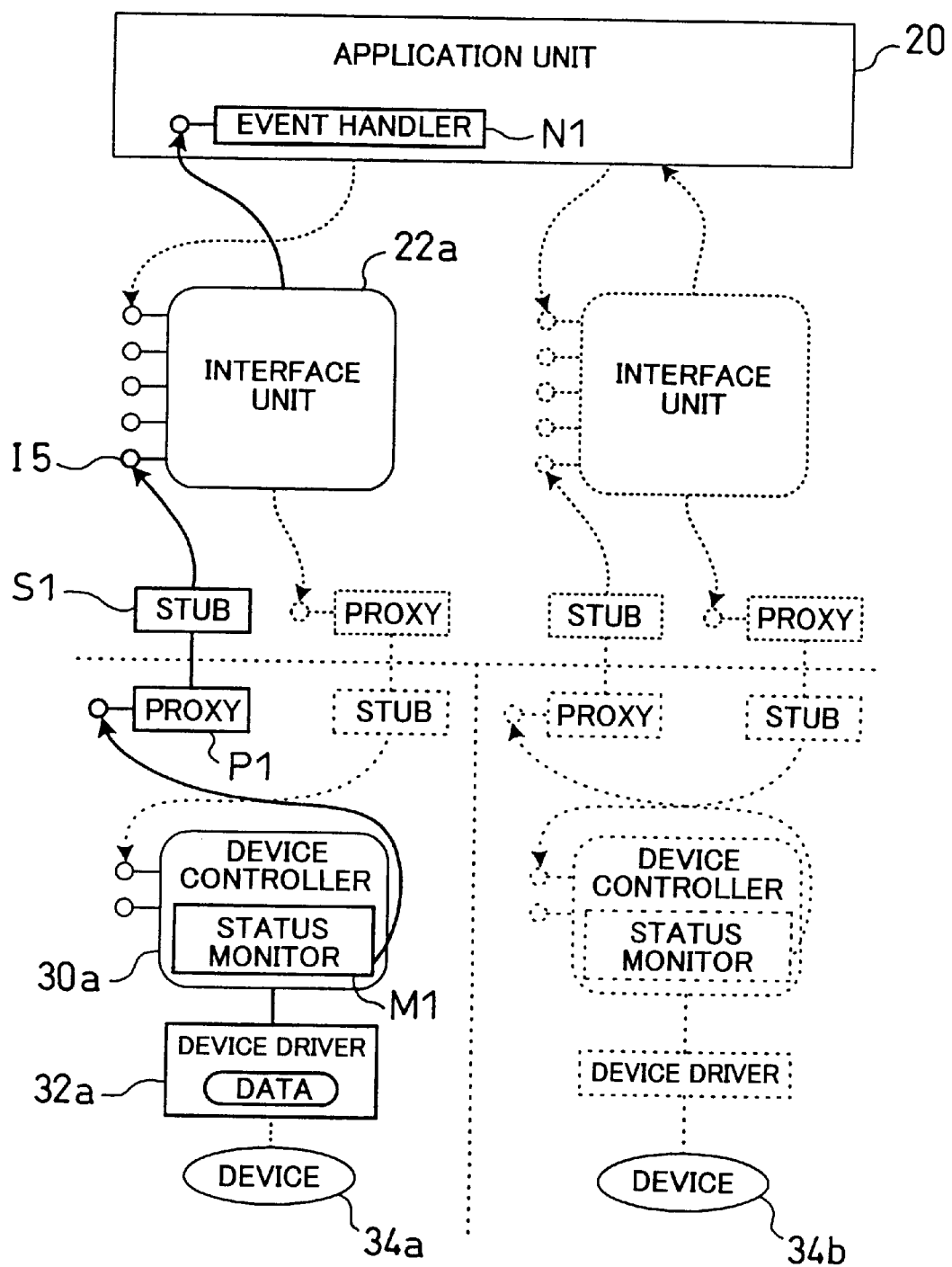
FIG. 9 shows the process of data transfer carried out in the device control system of FIG. 6.

When the data transfer process starts, the data obtained from the device 34a (scanner) are input into the device driver 32a and stored into a buffer in the device driver 32a as shown in FIG. 8. Referring to FIG. 9, the status monitor M1 in the device controller 30a detects the data input and informs the event handler N1 in the application unit 20 of the detected data input as an event via the proxy P1, the stub S1, and the ICyberEvent I5 of the interface unit 22a. The application unit 20 may ignore the informed event or alternatively perform the data input immediately in response to the informed event.

Figure 10:
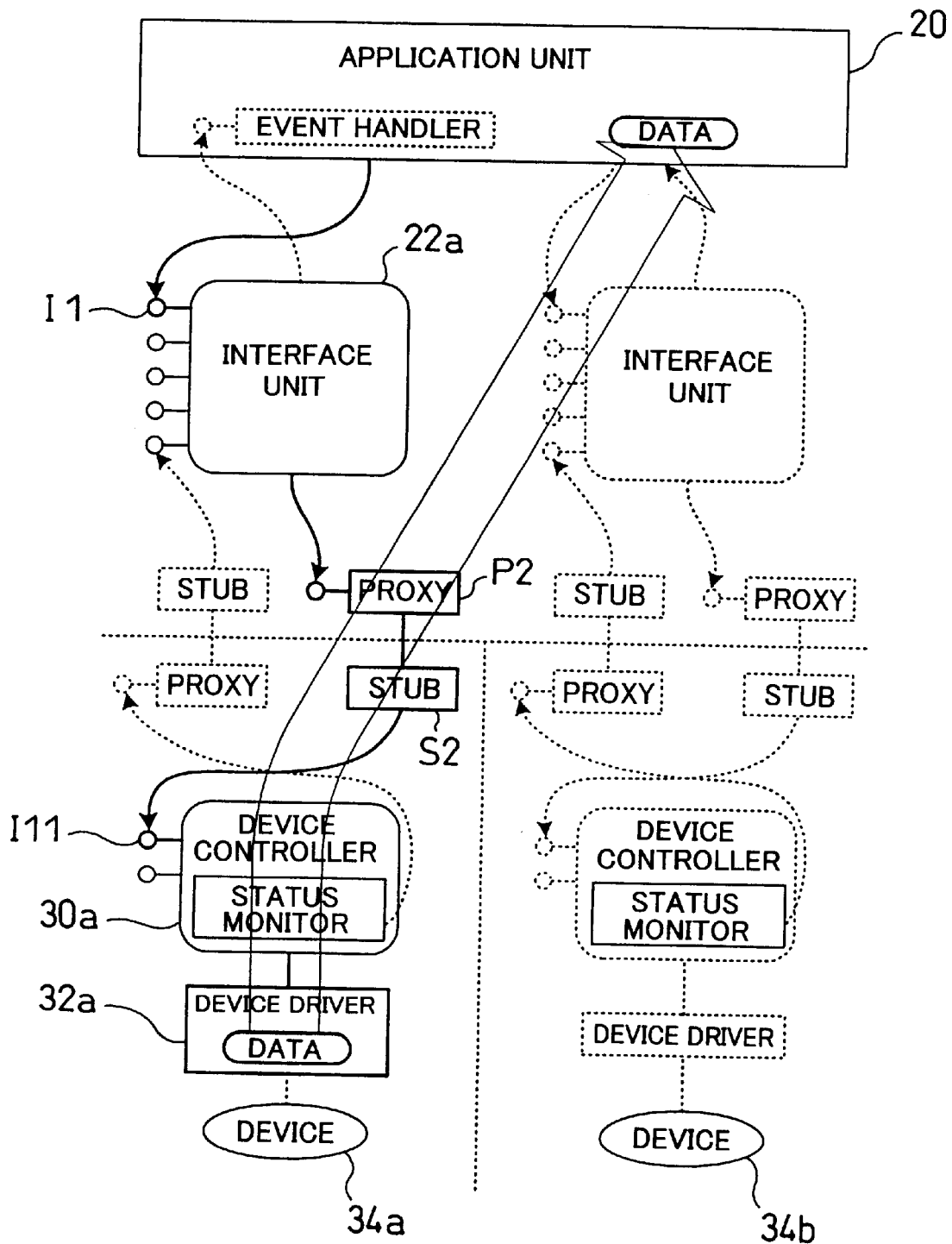
FIG. 10 shows the process of data transfer carried out in the device control system of FIG. 6.

Referring to FIG. 10, in order to implement the data transfer, the application unit first provides a data storage area therein and calls the interface unit 22a to obtain data (see the solid arrow). This transfers the execution of the processing to the interface unit 22a. The interface unit 22a then calls the device controller 30a to obtain data (see the solid arrows) and generates the proxy P2 and the stub S2. The stub S2 provides therein a temporary data storage area, which corresponds to the data storage area provided in the application unit 20, for the device controller 30a and transmits the temporary data storage area as a parameter to the device controller 30a. This transfers the execution of the processing to the device controller 30a. The device controller 30a subsequently calls the device driver 32a to obtain data. This transfers the execution of the processing to the device driver 32a.

The device driver 32a copies the data stored in the buffer into the data storage area provided in the stub S2. The return of the function call shifts the execution of the processing from the device driver 32a to the interface unit 22a via the device controller 30a. The interface unit 22a then copies the data in the data storage area provided in the stub S2 into the original data storage area provided in the application unit 20. The return of the function call further shifts the execution of the processing from the interface unit 22a to the application unit 20.

Figure 11:
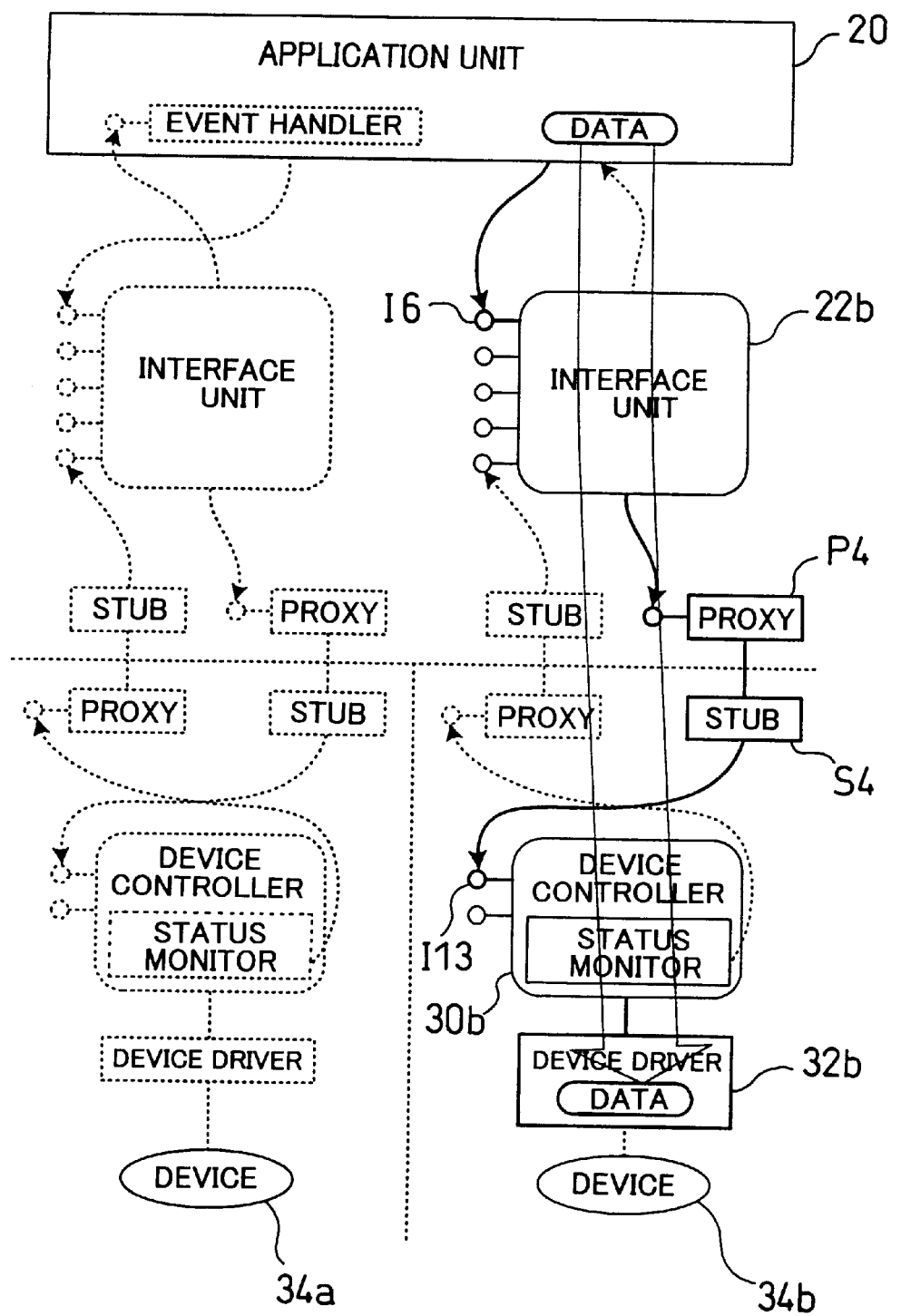
FIG. 11 shows the process of data transfer carried out in the device control system of FIG. 6.

The application unit 20 then reads data from the data storage area provided in the application unit 20 and causes the input data to be subjected to a specific operation according to the requirements. As shown in FIG. 11, the application unit 20 then calls the interface unit 22b to transmit the data (see the solid arrow). This transfers the execution of the processing to the interface unit 22b. The interface unit 22b then calls the device controller 30b to transmit the data (see the solid arrows) and generates the proxy P4 and the stub S4. The stub S4 provides therein a temporary data storage area, which corresponds to the data storage area provided in the application unit 20, for the device controller 30b. The data output from the application unit 20 are duplicated in the temporary data storage area and transferred as a parameter to the device controller 30b. This transfers the execution of the processing to the device controller 30b. The device controller 30b subsequently calls the device driver 32b to transmit the data. This transfers the execution of the processing to the device driver 32b.

The device driver 32b copies the data stored in the data storage area provided in the stub S2 into the buffer of the device driver 32b. The return of the function call shifts the execution of the processing from the device driver 32b to the application unit 20 via the device controller 30b and the interface unit 22b.

Figure 12:
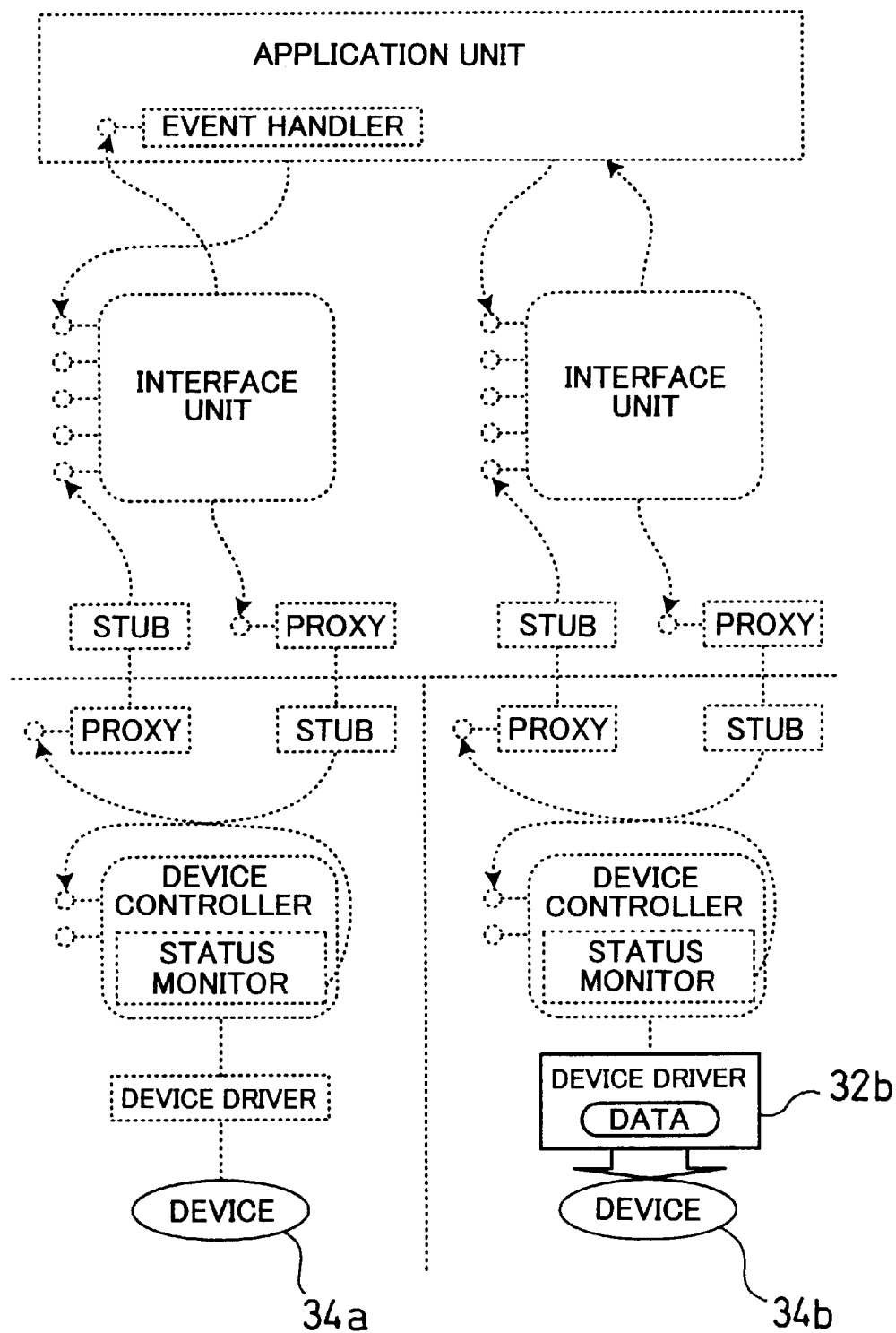
FIG. 12 shows the process of data transfer carried out in the device control system of FIG. 6.

Referring to FIG. 12, the device driver 32b outputs the data stored in the buffer to the device 34b (printer).

In the case of synchronous output, the execution of the processing is not transferred to the upper layer until the data output to the device 34b is completed. In the case of non-synchronous output, however, the execution of the processing is transferred to the upper layer before the data output to the device 34b is completed.

Figure 13:
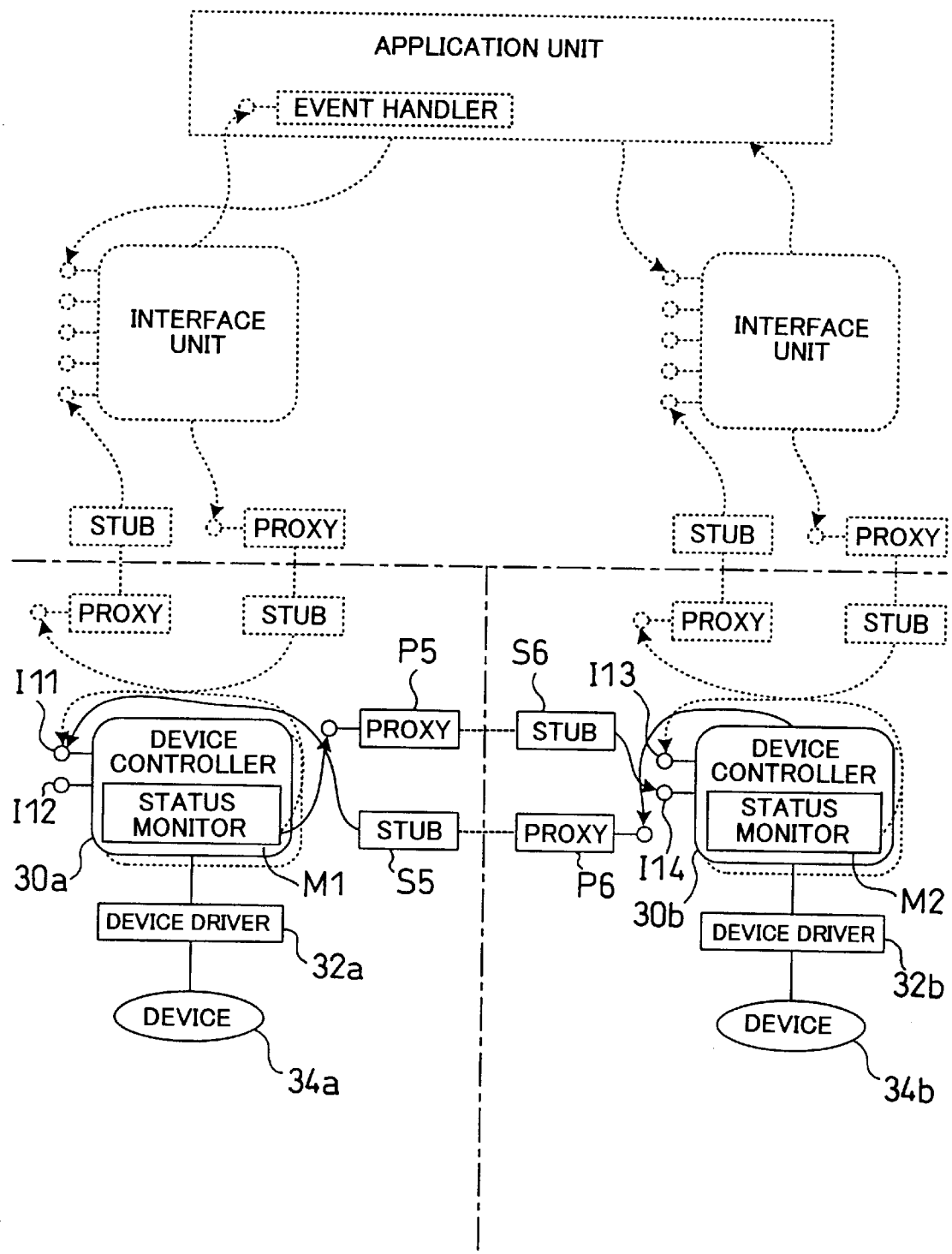
FIG. 13 is a block diagram illustrating a concrete example where the COM technology is applied to realize the data transfer technique shown in FIG. 5.
Figure 14:
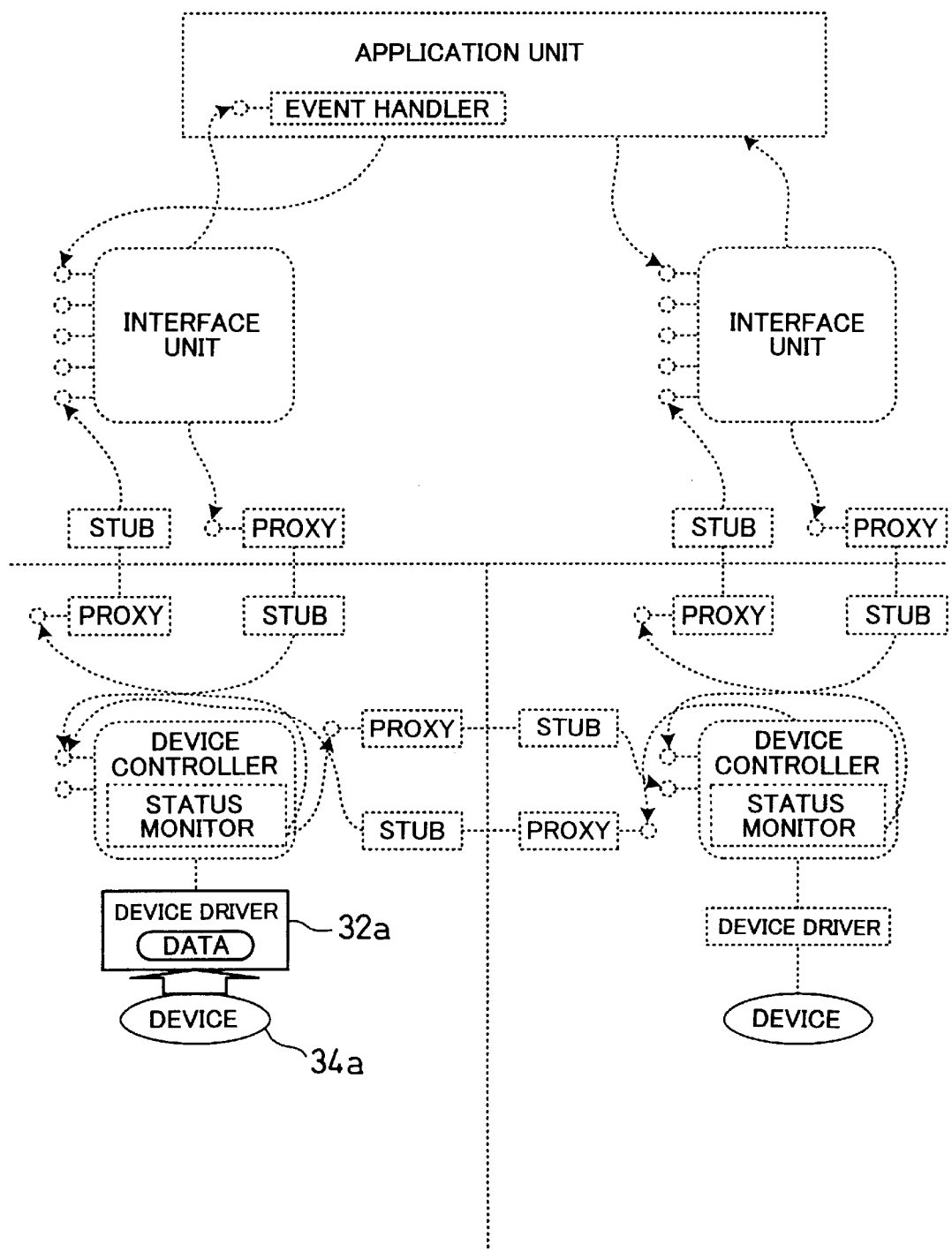
FIG. 14 shows a process of direct data transfer between the device controllers 30a and 30b shown in FIG. 13.
Figure 15:
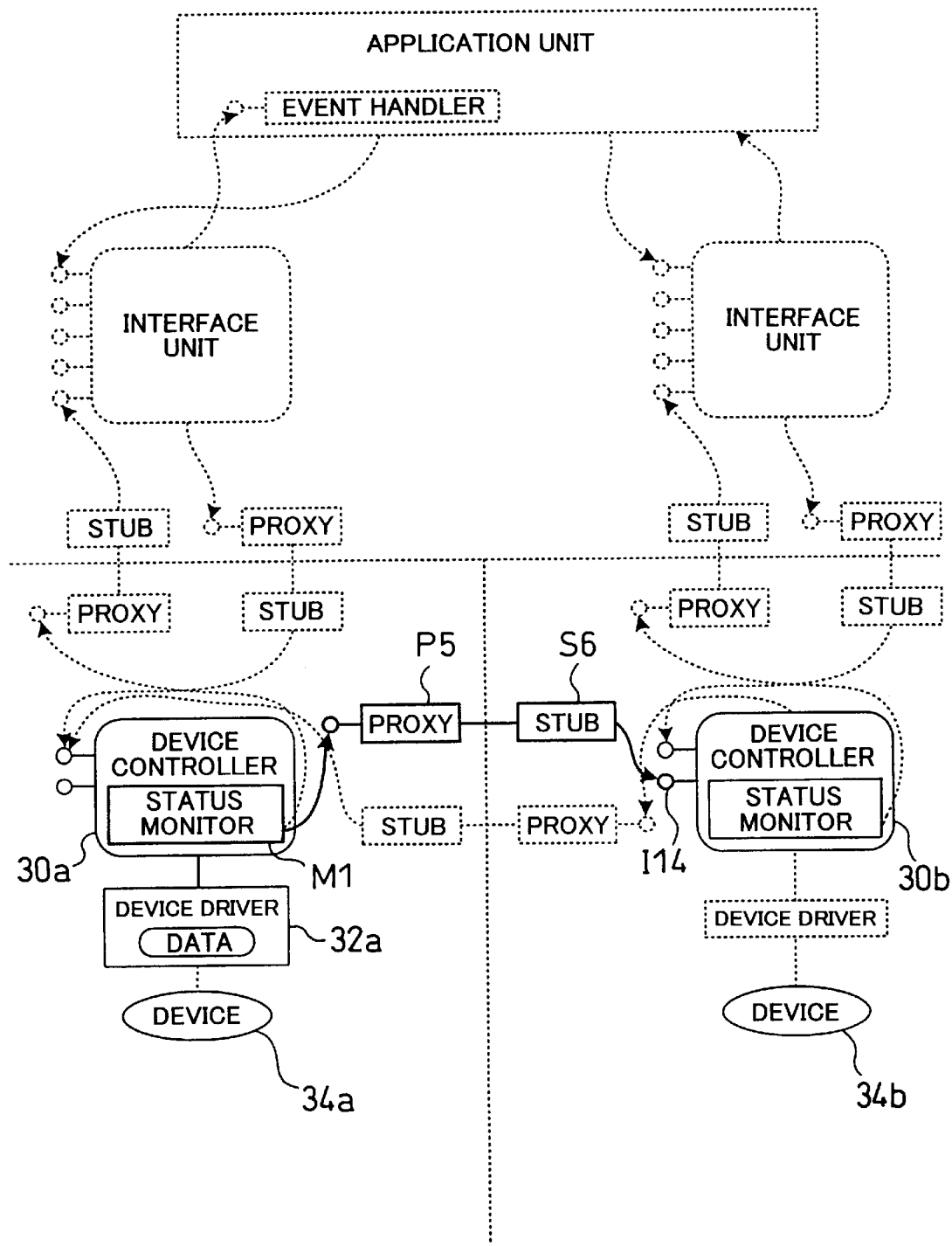
FIG. 15 shows the process of direct data transfer between the device controllers 30a and 30b shown in FIG. 13.
Figure 16:
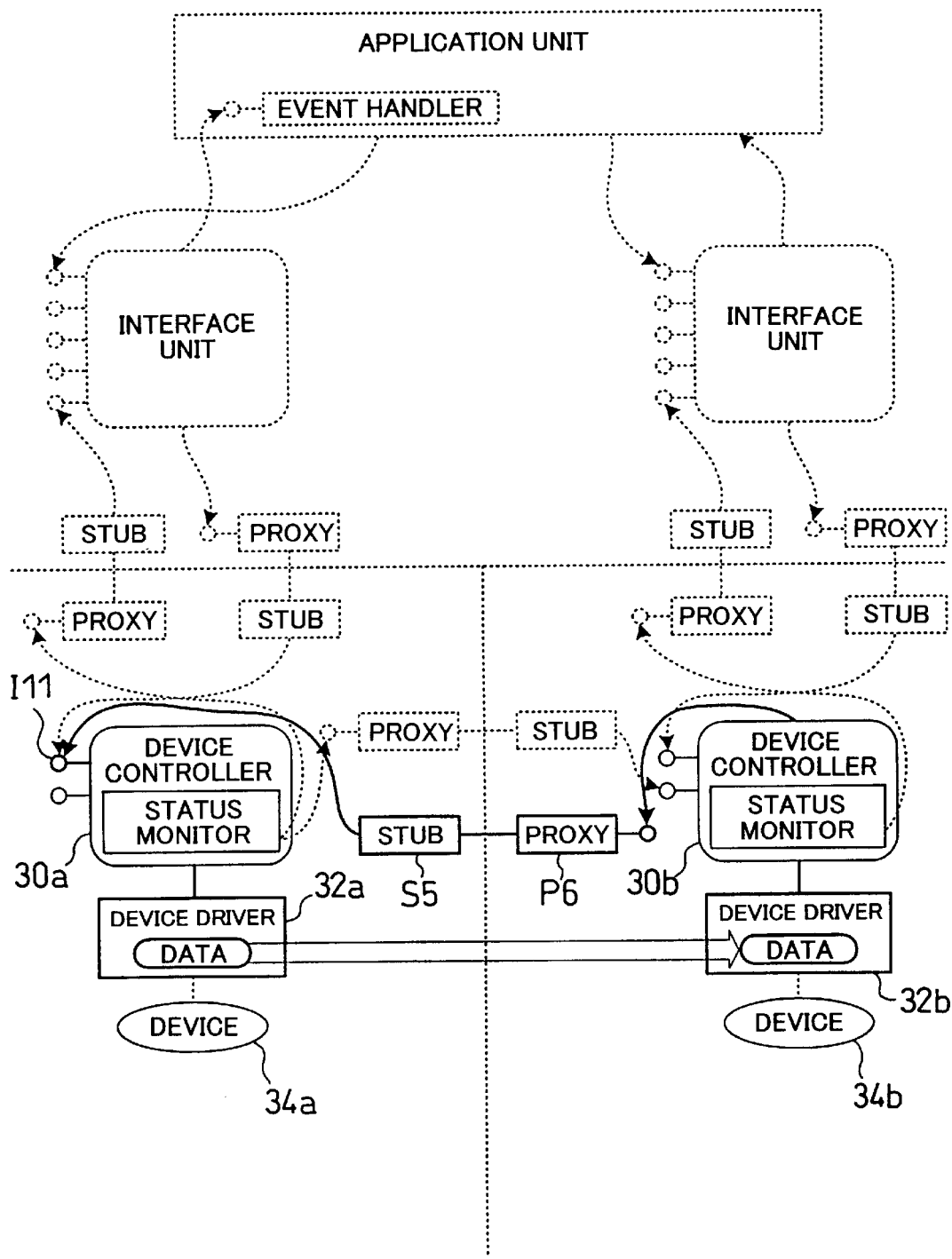
FIG. 16 shows the process of direct data transfer between the device controllers 30a and 30b shown in FIG. 13.
Figure 17:
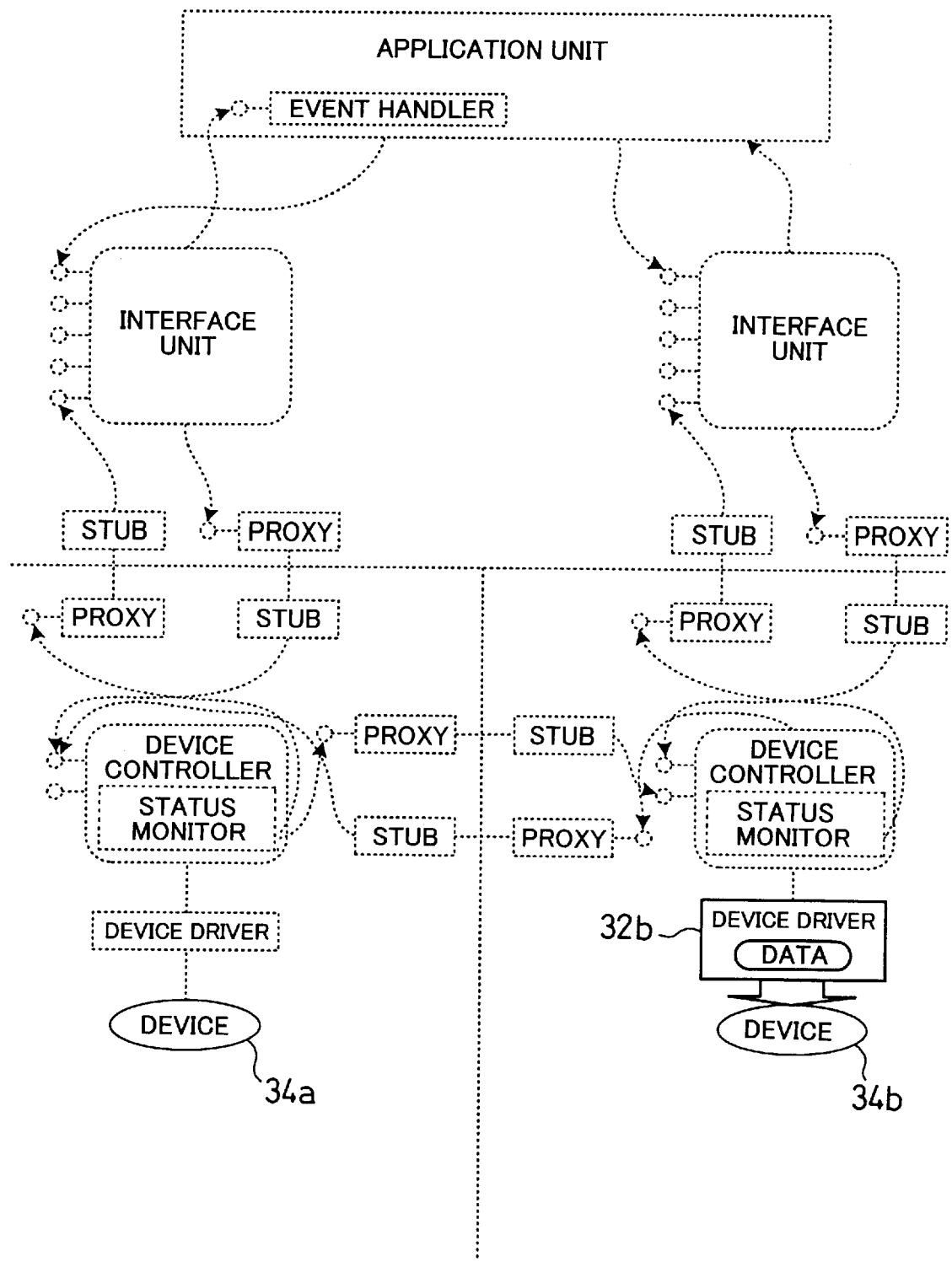
FIG. 17 shows the process of direct data transfer between the device controllers 30a and 30b shown in FIG. 13.

When the data transfer is carried out directly between the device controllers 30a and 30b as shown in FIG. 5, the following procedure is implemented. FIG. 13 is a block diagram illustrating a concrete example where the method of data transfer shown in FIG. 5 is realized by the COM technology.

As described previously, in the interface unit 22b, the IDropTarget I9 transmits the ICyberPlug I1 supported by the interface unit 22a to the method of starting data transfer included in the ICyberPlug I6 and entrusts the actual processing to the ICyberPlug I6. The method of starting data transfer included in the ICyberPlug I6 implements the direct data transfer between the device controllers 30a and 30b according to the following procedure.

The ICyberPlug I6 of the interface unit 22b gives an instruction to the device controller 30b to start the direct data transfer between the device controllers 30a and 30b, and transmits required pieces of information (at least the class ID of the device controller 30a) for generation of the mated device controller 30a to the device controller 30b.

The device controller 30b generates its own clone as well as a clone of the mated device controller 30a based on the transmitted information. The newly generated device controller 30b establishes a connection with the newly generated device controller 30a and makes an optimum communications path. At this moment, the proxies P5 and P6 and the stubs S5 and S6 are also generated as the communications path abstraction unit 36 shown in FIG. 5.

The device controller 30b then starts the data transfer to and from the mated device controller 30a according to the specified settings of communication. When preset termination conditions are fulfilled, the data transfer is concluded and the device controller 30b cuts of the connection with the device controller 30a.

FIGS. 14 through 17 show a process of direct data transfer between the device controllers 30a and 30b shown in FIG. 13 in time series. In these drawings, the parts that are mainly involved in a currently executed step are shown by the solid lines, whereas the parts that are hardly involved in the currently executed step are shown by the broken lines.

In the case of the direct data transfer between the device controllers 30a and 30b, since neither the application unit 20 nor the interface units 22a and 22b are involved in the data transfer, the device controllers 30a and 30b directly perform call of a method, transmission of an event, and data transfer. The operations of the device controllers 30a and 30b, the device drivers 32a and 32b, and the devices 34a and 34b are, however, similar to those executed in the case of the data transfer via the application unit 20 and other elements, and are not specifically described here.

As described above, in this embodiment, the application unit 20 controls the devices 34a and 34b via the interface units 22a and 22b, the communications path abstraction units 24a and 24b, and the device abstraction units 28a and 28b, so as to specify the settings of the devices 34a and 34b and implement the data transfer between the devices 34a and 34b without taking into account the types of the devices 34a and 34b and the types of the interposed communications paths 26a and 26b.

The following describes a concrete example where the device control system shown in FIG. 1 is applied to implement a virtual copying machine, which is one of the composite devices discussed previously.

Figure 18:
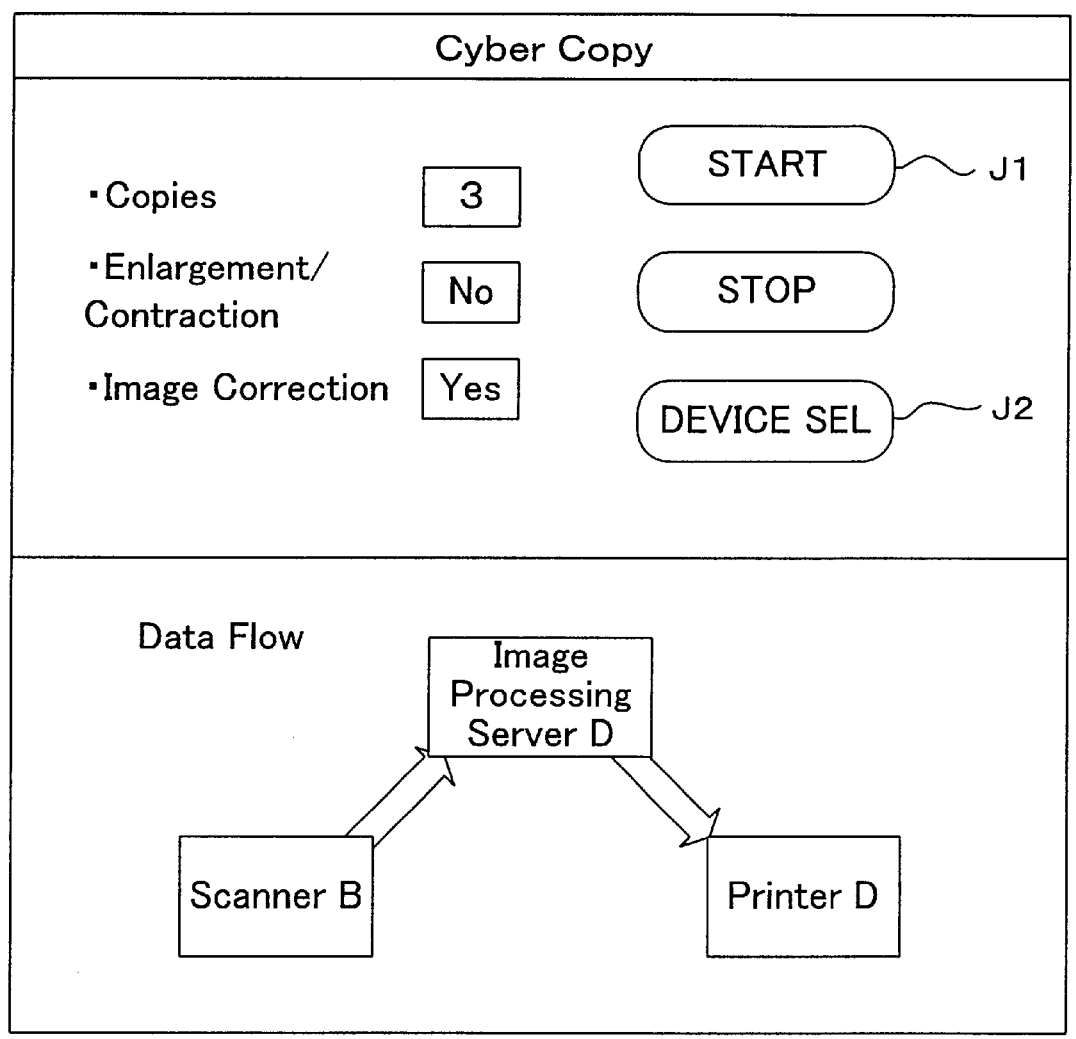
FIG. 18 shows an example of a user interface displayed in a window when a virtual copying machine is realized by the device control system shown in FIG. 1.

It is assumed that the applications programs constructing the application unit 20 shown in FIG. 1 are programs for implementing a virtual copying machine (these programs are hereinafter referred to as Cyber Copy). When the applications programs Cyber Copy are executed on a computer (not shown), a scanner, which has been registered in advance as a default of a source device, and a printer, which has been registered in advance as a default of a destination device, are automatically selected among possible options. A user interface like that of the copying machine is displayed in a window on display means (not shown) as shown in FIG. 18. The user clicks a START button J1 after specifying the number of copies and other required settings in the displayed window with the keyboard or the mouse. This establishes a connection via a communications path and implements transfer of image data from the scanner or source device to the printer or destination device, so as to enable operations of the virtual copying machine.

In this specification, a device that enables at least transmission of data is defined as the source device, and a device that enables at least receipt of data is defined as the destination device. If a device for the intermediate processing enables at least transmission of data, the device can be regarded as the source device. If the device for the intermediate processing enables at least receipt of data, the same device can be regarded as the destination device. Namely any of such devices can be regarded as either the source device or the destination device.

The applications programs Cyber Copy provide options to allow a change of the device, enlargement or contraction of the image, and the image correction (color correction in this case). For example, when the user selects the execution of the enlargement/contraction of the image or the image correction in the displayed window of FIG. 18, an image processing server, which has been registered in advance as a default, is incorporated into the connection. The transfer of image data is implemented via the image processing server, and the image to be copied is subjected to the desired processing, such as the enlargement/contraction or the color correction, in the image processing server.

Figure 19:
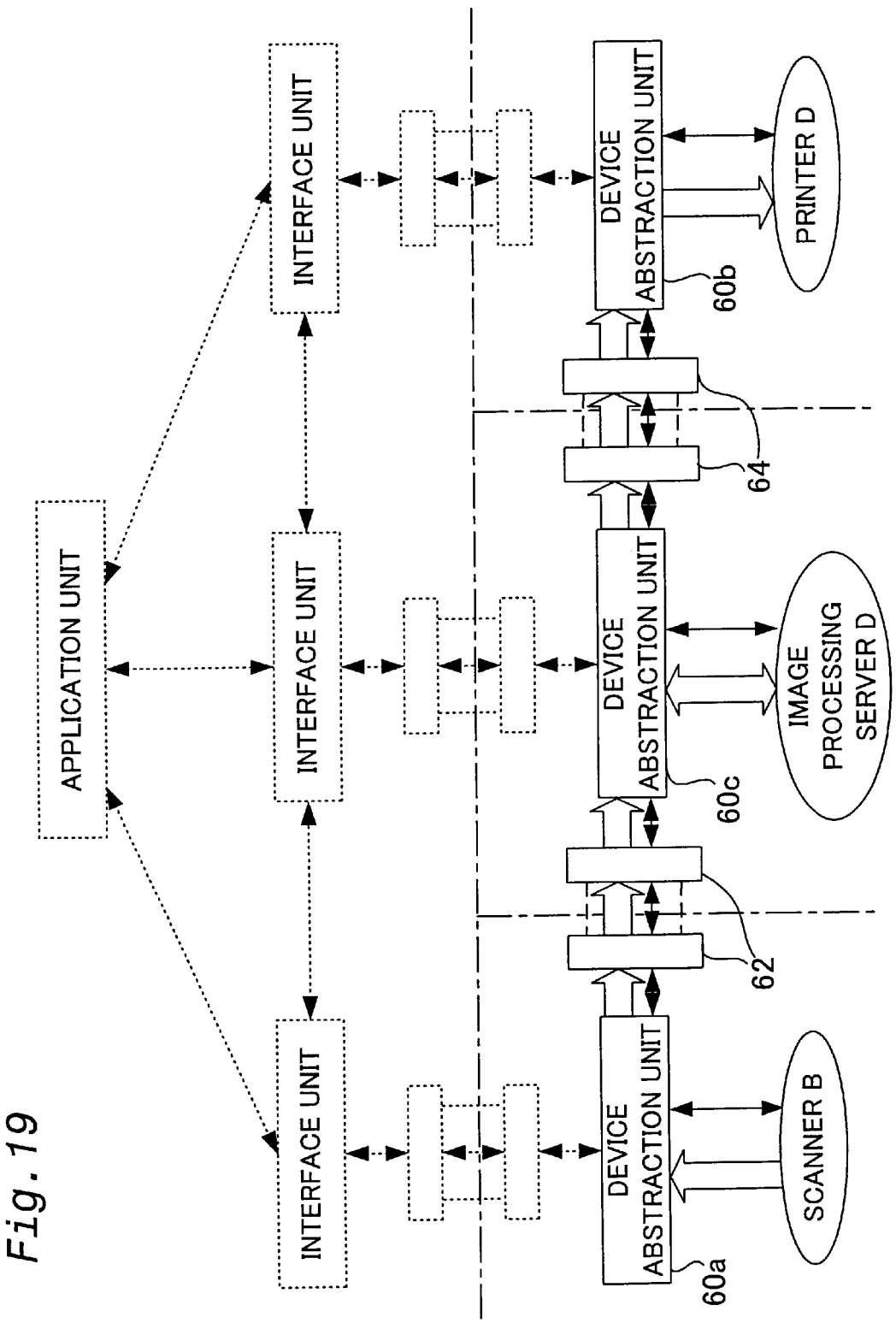
FIG. 19 shows a flow of data when the virtual copying machine is realized by the device control system shown in FIG. 1.

FIG. 19 shows a flow of image data. In the example of FIG. 19, a scanner B is selected as the source device, a printer D as the destination device, and an image processing server D as the image processing server. Image data are input from the scanner B into the image processing server D via a device abstraction unit 60a, a communications path abstraction unit 62, and a device abstraction unit 60c, and are subjected to the desired processing in the image processing server D. The processed image data are transferred to the printer D via the device abstraction unit 60c, a communications path abstraction unit 64, and a device abstraction unit 60b. Although the source device, the destination device, and the image processing server are shown as separate elements for the clarity of explanation, the image processing server is also a device as described previously. Strictly speaking, the image processing server functions as the destination device relative to the scanner and as the source device relative to the printer.

Figure 20:
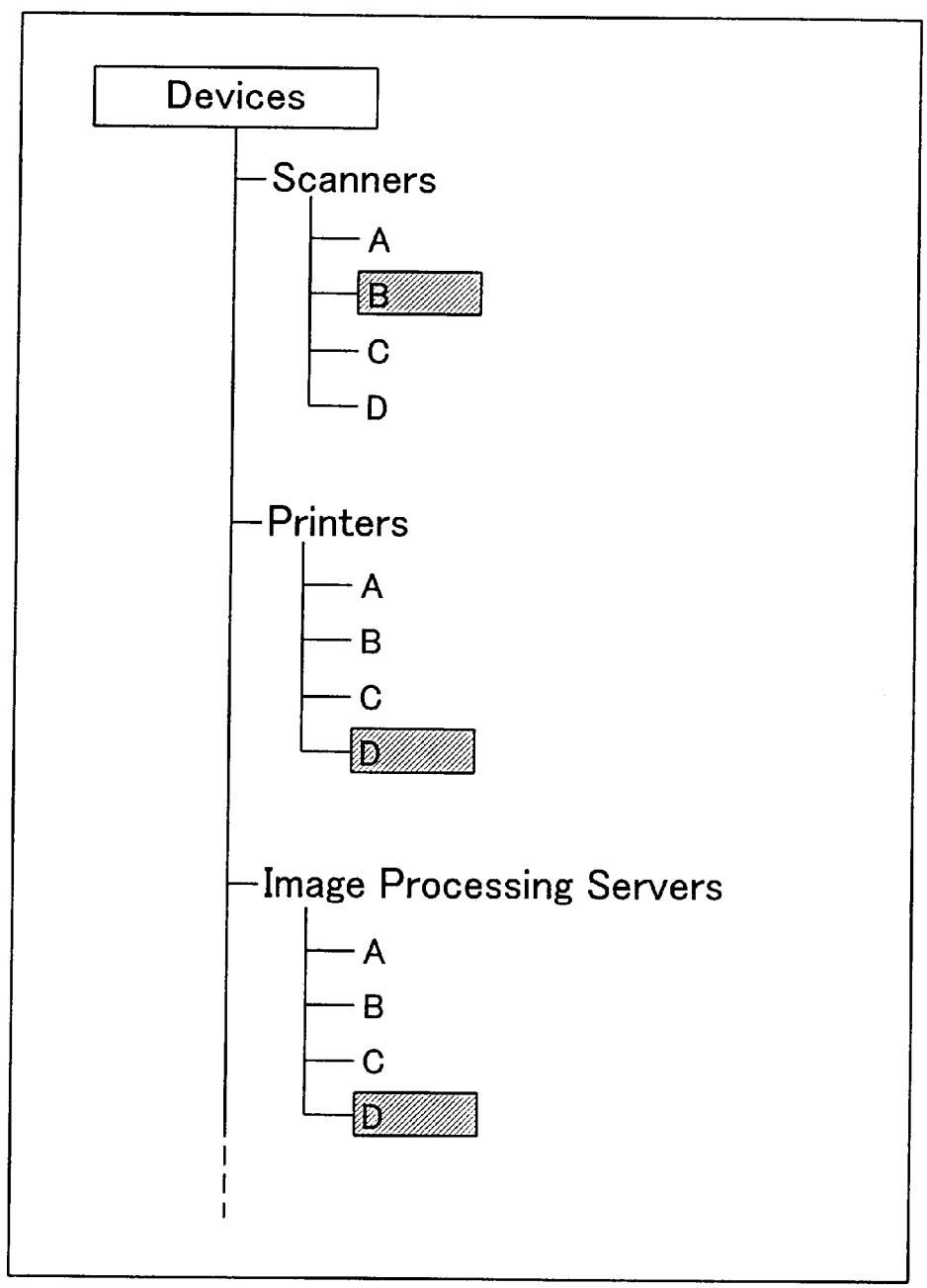
FIG. 20 shows an example of a device selection tree displayed in a window.

The state of communication between the devices is displayed in a window on the display means as shown in FIG. 18. The user can arbitrarily select the source device, the destination device, and the image processing server. When the user clicks a DEVICE SEL button J2 in the displayed window of FIG. 18, a device selection tree as shown in FIG. 20 is displayed in a window on the display means. The user then freely selects desired devices among the options included in the tree.

As described above, the device control system of this embodiment readily realizes a virtual copying machine as one of the composite devices.

Figure 21:
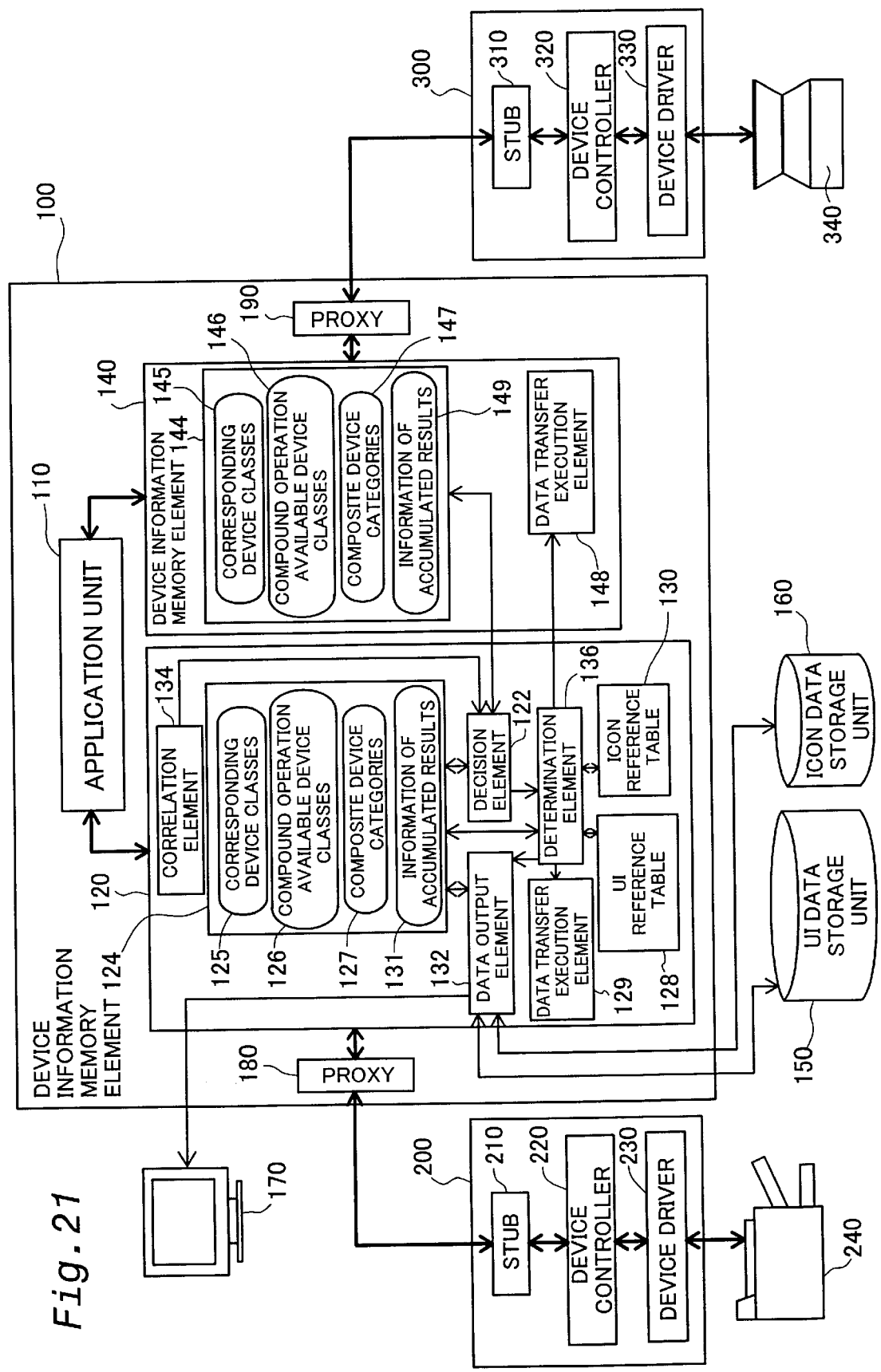
FIG. 21 is a block diagram illustrating a device control system in the state of connection shown in FIG. 2C.

The device control system of the embodiment is further described in a concrete manner. FIG. 21 is a block diagram illustrating a device control system in the state of connection of FIG. 2C. The respective constituents shown in FIG. 21 are expressed by different numerals from those allocated to the same constituents shown in FIGS. 1 and 2C.

Referring to FIG. 21, a computer 100 is connected with a computer 200, to which a printer 240 as a destination device is connected, and with a computer 300, to which a scanner 340 as a source device is connected, via a network (not shown). The computer 100 is also directly connected with a monitor 170, which may be a CRT or a liquid-crystal display and displays a variety of images including a user interface.

The computer 100 includes an application unit 110, interface units 120 and 140, a user interface (UI) data storage unit 150, an icon data storage unit 160, and proxies 180 and 190. The computers 200 and 300 respectively include stubs 210 and 310, device controllers 220 and 320, and device drivers 230 and 330.

The application unit 110 is constructed by specific applications programs. The applications programs include part of the operating system (OS), such as a shell displaying a Windows user interface. The interface unit 120, the proxy 180, the stub 210, the device controller 220, and the device driver 230 are generated corresponding to the printer 240 or the destination device. The interface unit 140, the proxy 190, the stub 310, the device controller 320, and the device driver 330 are generated corresponding to the scanner 340 or the source device.

The interface unit 120 includes a decision element 122, a device information memory element 124, a user interface (UI) reference table 128, a data transfer execution element 129, an icon reference table 130, a data output element 132, a correlation element 134, and a determination element 136. The interface unit 140 at least includes a device information memory element 144 and a data transfer execution element 148. These elements are generated by computer programs. Information pieces 125 and 145 of corresponding device classes, information pieces 126 and 146 of compound operation available device classes, and information pieces 127 and 147 of composite device categories are stored in advance into the device information memory elements 124 and 144, respectively. Information pieces of accumulated results 131 and 149 are also accumulated in the device information memory elements 124 and 144. Such information pieces will be described later in detail.

Figure 22:
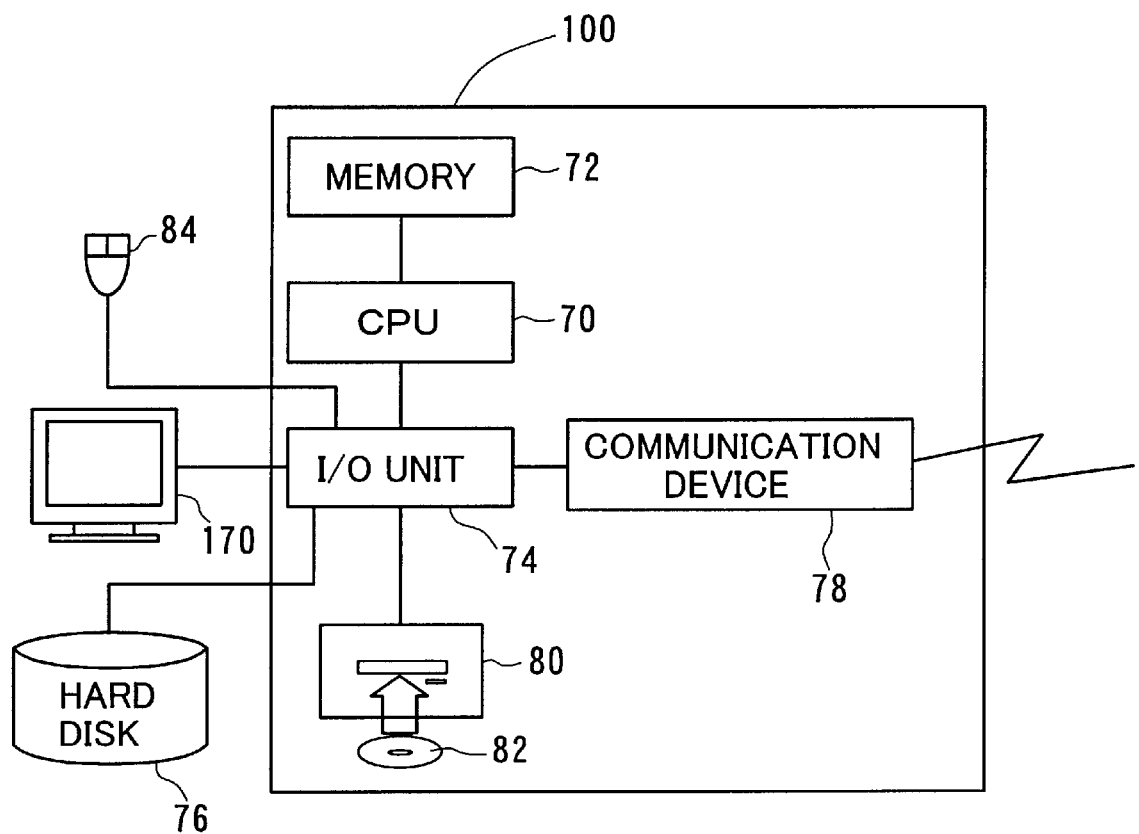
FIG. 22 is a block diagram showing a hardware configuration of the computer 100 shown in FIG. 21.

FIG. 22 is a block diagram illustrating a hardware configuration of the computer 100 shown in FIG. 21.

Referring to FIG. 22, the computer 100 has, as the hardware constituents inside or outside thereof, a CPU 70 that executes various processes and controls according to computer programs, a memory 72 that stores the computer programs and temporarily registers data obtained during the processing, an I/O unit 74 that transmits data to and from a variety of peripheral equipment, a hard disk 76 that stores a variety of data, a communication unit 78 that may include a modem, a terminal adapter, and a network card and communicates with another device via a network, a CD-ROM drive 80, a mouse 84 that is used for inputting, for example, user's instructions, and the monitor 170 mentioned above.

As described previously, the respective constituents included in the application unit 110 and the interface units 120 and 140 are implemented by the computer programs. More concretely, the CPU 70 in the computer 100 reads and executes desired computer programs stored in the memory 72, so as to function as the respective constituents.

In this embodiment, the computer programs stored in the memory 72 are provided in a form recorded in the recording medium or the CD-ROM 82 as discussed previously. The computer programs are read by the CD-ROM drive 80 and taken into the computer 100. The input computer programs are transferred to the hard disk 76 and further transferred to the memory 72, for example, on the activation of the computer 100. Alternatively the input computer programs may be transferred to the memory 72 not via the hard disk 76 but directly.

Although the respective constituents included in the interface units 120 and 140 are realized by the software in this embodiment, they may be realized by the hardware.

The UI data storage unit 150 and the icon data storage unit 160 are stored in the hard disk 76.

The following describes the operations of the device control system shown in FIG. 21. It is here assumed that the user of the computer 100 desires to read an image with the scanner 340 connected to the computer 300 and print the input image with the printer 240 connected to the computer 200.

Figure 23:
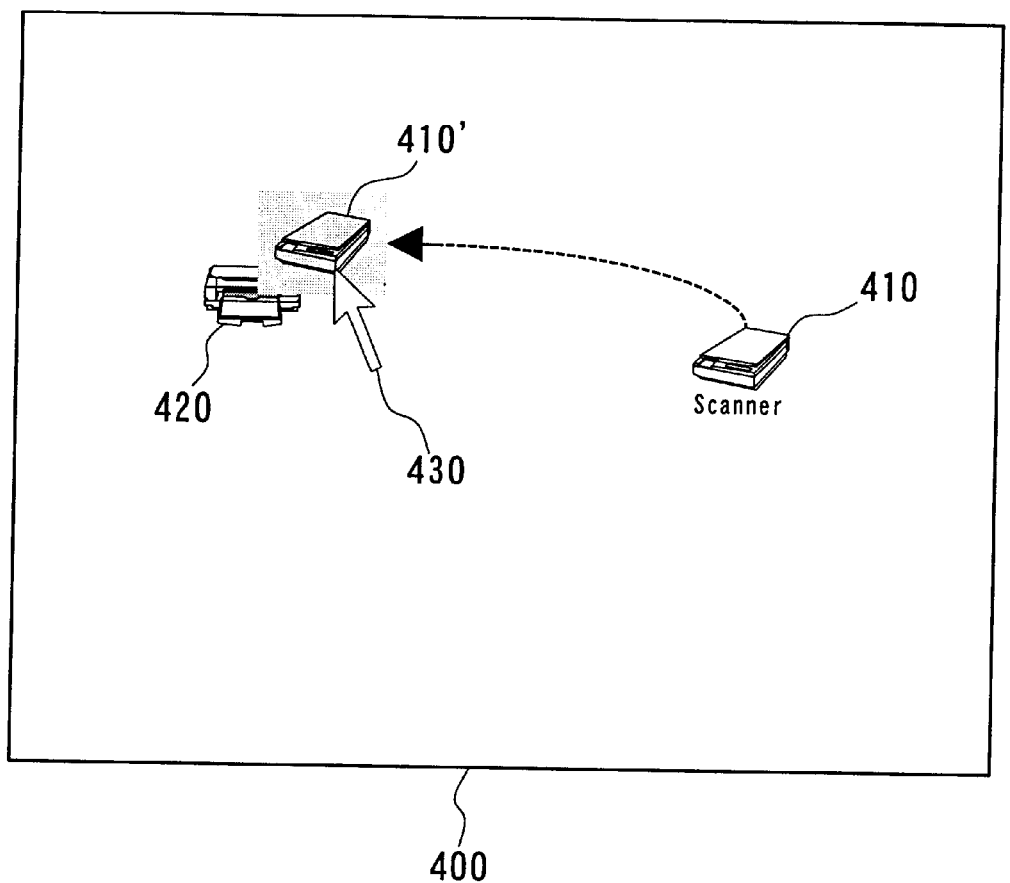
FIG. 23 shows a scanner icon and a printer icon displayed in the window on the monitor 170 of FIG. 21.

A scanner icon 410, which visually represents the scanner 340 as the source device, and a printer icon 420, which visually represents the printer 240 as the destination device, are displayed in a window 400 of the monitor 170 connected to the computer 100 as shown in FIG. 23. The scanner icon 410 is displayed by the interface unit 140 corresponding to the scanner 340, whereas the printer icon 420 is displayed by the interface unit 120 corresponding to the printer 240.

The user of the computer 100 first operates the mouse 84 connected to the computer 100 and selects and drags the scanner icon 410 as the source device with a mouse cursor 430 displayed in the window 400. The application unit 110 calls the interface unit 140 corresponding to the scanner 340 in response to the mouse operation. The user then operates the mouse 84 and lays the dragged scanner icon 410' upon the printer icon 420 as the destination device. The application unit 110 calls the interface unit 120 corresponding to the printer 240 in response to the mouse operation. The interface unit 120 corresponding to the printer 240 as the destination device is accordingly in charge of a data transfer starting process shown in the flowchart of FIG. 24.

Although the interface unit corresponding to the destination device is in charge of the processing in this embodiment, the principle of the present invention is not restricted to this arrangement. The interface unit corresponding to the source device may alternatively be in charge of the processing.

Figure 24:
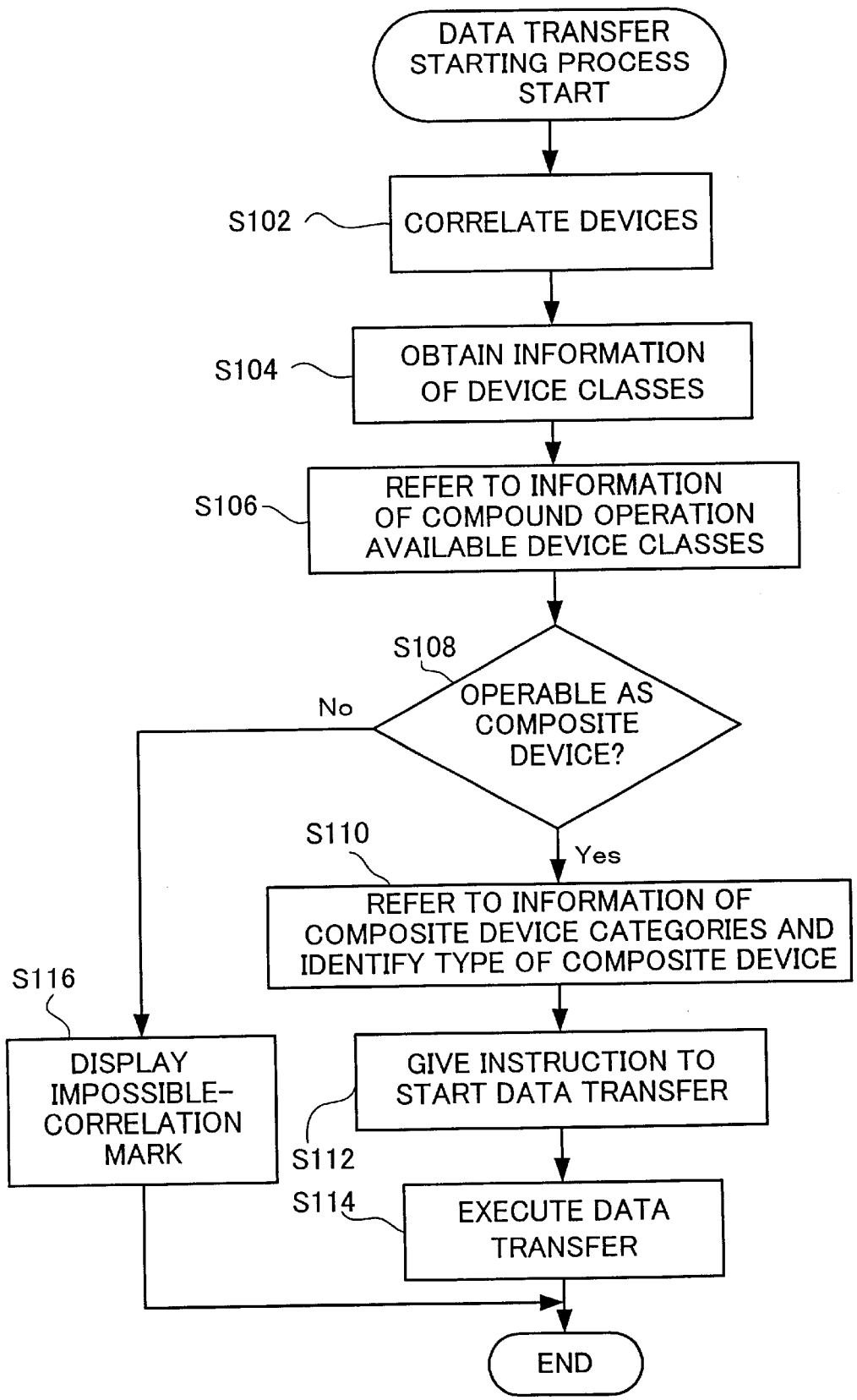
FIG. 24 is a flowchart showing a data transfer starting routine executed by the interface unit 120 shown in FIG. 21.

FIG. 24 is a flowchart showing a data transfer starting routine executed by the interface unit 120 shown in FIG. 21.

The operation of the mouse 84 by the user has been transmitted to the interface unit 120 via the application unit 110. When the program enters the data transfer starting routine shown in FIG. 24, the correlation element 134 included in the interface unit 120 first correlates the printer 240, which is the corresponding device of the interface unit 120, with a mated device based on the transmitted mouse operation at step S102. The correlation element 134 recognizes that the printer 240, which is the corresponding device of the interface unit 120, is a subject of correlation, since the application unit 110 has called the interface unit 120. The correlation element 134, on the other hand, grasps that the mated device to be correlated is the scanner 340, based on the operation of the mouse 84 transmitted from the application unit 110. The correlation element 134 accordingly correlates the printer 240 as the corresponding device with the scanner 340 as the mated device and sends the result of correlation to the decision element 122.

At subsequent step S104, the decision element 122 obtains information regarding the device classes (that is, the device types) of the printer 240 as the corresponding device and the scanner 340 as the mated device from the device information memory element 124 and the device information memory element 144 of the interface unit 140 corresponding to the scanner 340, based on the input result of correlation.

As mentioned previously, the information pieces 125 and 145 regarding the corresponding device classes are respectively stored in the device information memory element 124 and the device information memory element 144. The information pieces 125 and 145 regarding the corresponding device classes represent the device classes of the corresponding devices, which are the devices respectively corresponding to the interface units 120 and 140. In a concrete example, the information piece 125 represents 'printer' as the device class of the printer 240, whereas the information piece 145 represents 'scanner' as the device class of the scanner 340.

The decision element 122 accordingly accesses to the device information memory element 124 to obtain the information piece 125 regarding the corresponding device class (that is, the device class of the printer 240) stored in the device information memory element 124. The decision element 122 also accesses to the device information memory element 144 to obtain the information piece 145 regarding the corresponding device class (that is the device class of the scanner 340) stored in the device information memory element 144.

After grasping that the device class of the printer 240 as the corresponding device is 'printer' and that the device class of the scanner 340 as the mated device is 'scanner, based on the information pieces 125 and 145 thus obtained, the decision element 122 refers to the information 126 regarding the compound operation available device classes stored in the device information memory element 124 at step S106. The decision element 122 then determines whether or not the combination of the device classes (the combination of 'printer' and 'scanner' in this case) is operable as the composite device at step S108.

As described previously, the composite device represents a virtual device that has at least part of the functions of the source device and at least part of the functions of the destination device. The devices of interest are the scanner 340 and the printer 240 in this case, so that the composite device is a virtual device having at least part of the functions of the scanner 340 and at least part of the functions of the printer 240.

The virtual composite device specified by a certain combination of devices may, however, be inoperable in the actual state. The decision unit 122 accordingly determines whether or not the virtual composite device is actually operable by the processing of steps S106 and S108 described above.

As described previously, in some combinations of arbitrary devices, one arbitrary device may not be able to receive and process the data transmitted from the other arbitrary device. In such cases, the virtual composite device is inoperable in the actual state. In this embodiment, the decision element 122 determines whether or not the combination of arbitrary devices is operable as the composite device by the processing of steps S106 and S108, in order to determine whether or not one arbitrary device can receive and process the data transmitted from the other arbitrary device.

Instead of determining whether or not the combination of arbitrary devices is operable as the composite device, another technique may be applied to determine whether or not one arbitrary device can receive and process the data transmitted from the other arbitrary device.

As discussed previously, the information pieces 126 and 146 regarding the compound operation available device classes are respectively stored in the device information memory elements 124 and 144. The information pieces 126 and 146 of the compound operation available device classes respectively show the device classes of the other devices that are combined with the device classes of the devices corresponding to the interface units 120 and 140 (the corresponding devices) and make the virtual composite devices operable. In a concrete example, the information 126 includes 'scanner', 'digital camera', 'facsimile', and 'electronic mail' as the device classes of the other devices that are combined with the device class 'printer' and make the virtual composite devices operable. The information 146, on the other hand, includes 'printer', 'facsimile', and 'electronic mail' as the device classes of the other devices that are combined with the device class 'scanner' and make the virtual composite devices operable.

The device classes of the other devices that are combined with the device class of a specific destination device are all the device classes of source devices. On the contrary, the device classes of the other devices that are combined with the device class of a specific source device are all the device classes of destination devices. In the above case, the device classes 'scanner', 'digital camera', 'facsimile', and 'electronic mail' that are combined with the device class 'printer' of the destination device are all the device classes of source devices. The device classes 'printer', 'facsimile', and 'electronic mail' that are combined with the device class 'scanner' of the source device are all the device classes of destination devices. The facsimile and the electronic mail function as both the source devices and the destination devices, so that the device classes 'facsimile' and 'electronic mail' belong to the device classes of both the source devices and destination devices.

The decision element 122 refers to the information 126 of the compound operation available device classes stored in the device information memory element 124, with respect to the case in which the device class 'printer' of the printer 240 as the corresponding device is combined with the device class 'scanner' of the scanner 340 as the mated device. As mentioned above, the device classes 'scanner', 'digital camera', 'facsimile', and 'electronic mail' are given in the information 126 as the possible options that may be combined with the device class 'printer' to implement the operable composite devices. The decision element 122 accordingly determines that the combination of the device class 'printer' with the device class 'scanner' is operable as the composite device. After the determination of whether the combination is operable as the composite device, the decision element 122 transmits the result of the determination to the determination element 136. The decision element 122 transfers the other pieces of information regarding the mated device or scanner 340, that is, the name and the device class, together with the result of the determination.

In the case where the decision element 122 determines that the combination is operable as the composite device, the determination element 136 refers to the information 127 of composite device categories stored in the device information memory element 124 and identifies the type of the virtual composite device at step S110. The result of the determination by the decision element 122 and the result of the identification by the determination element 136 are accumulated as the information pieces of accumulated results 131 and 149 into the device information memory elements 124 and 144.

As described previously, the information pieces 127 and 147 of composite device categories are stored respectively in the device information memory elements 124 and 144. The information pieces 127 and 147 of composite device categories represent the types of the composite devices (composite device categories) with respect to the possible combinations of the device classes that are operable as composite devices. In a concrete example, the information 127 includes:

'Printer'+'Scanner'='Copying Machine'
'Scanner'+'Facsimile'='Facsimile (transmitter)'
'Printer'+'Facsimile'='Facsimile (receiver)'

For example, with respect to a specific combination of the device class 'printer' with the device class 'scanner', a copying machine is regarded as the device having the functions of both the printer and the scanner. The 'copying machine' is accordingly given as the type of the composite device corresponding to the specific combination. In another example, with respect to a specific combination of the device class 'scanner' with the device class 'facsimile', a transmitter facsimile is regarded as the device having the functions of both the scanner and the transmitter portion of the facsimile. The 'facsimile (transmitter)' is accordingly given as the type of the composite device corresponding to the specific combination. In still another example, with respect to a specific combination of the device class 'printer' with the device class 'facsimile', a receiver facsimile is regarded as the device having the functions of both the printer and the receiver portion of the facsimile. The 'facsimile (receiver)' is accordingly given as the type of the composite device corresponding to the specific combination.

The following option is also possible as the composite device category:

'Digital camera'+'Electronic mail'='Direct mail transmission'

With respect to a specific combination of the device class 'digital camera' with the device class 'electronic mail', direct mail transmission, which enables images shot with a digital camera to be directly transmitted to preset addresses by electronic mail, is regarded as the virtual device having the functions of both the digital camera and the transmitter portion of the electronic mail. The 'direct mail transmission' is accordingly given as the type of the composite device corresponding to the specific combination.

The determination element 136 refers to the information 127 of composite device categories stored in the device information memory element 124, with respect to the combination of the device class 'printer' of the printer 240 as the corresponding device with the device class 'scanner' of the scanner 340 as the mated device. As discussed above, with respect to the combination of the device class 'printer' with the device class 'scanner', the 'copying machine' is given as the type of the composite device. The determination element 136 accordingly determines the device class category 'copying machine' as the type of the composite device corresponding to the combination of the device class 'printer' with the device class 'scanner'.

The type of the composite device identified by the determination element 136 is accumulated as the information pieces of accumulated results 131 and 149, together with the result of the determination by the decision element 122. More concretely, the name of the scanner 340 as the mated device, the result of the determination that the combination is operable as the composite device, and the type of the composite device 'copying machine' are stored in the information of accumulated results 131. The name of the printer 240, which is the mated device of the scanner 340, the result of the determination that the combination is operable as the composite device, and the type of the composite device 'copying machine' are stored in the information of accumulated results 149.

Referring back to FIG. 23, when the user of the computer 100 operates the mouse 84 and drops the dragged scanner icon 410' upon the printer icon 420, the program proceeds to the processing of step S112 shown in the flowchart of FIG. 24.

The determination element 136 gives an instruction to start data transfer to the data transfer execution element 129 and the data transfer execution element 148 included in the interface unit 140 at step S112. The data transfer execution elements 129 and 148 then start the actual process of data transfer at step S114. In accordance with a concrete procedure, the data transfer execution element 148 transmits the instruction of starting data transfer to the stub 310 included in the separate computer 300 via the proxy 190 across the network. The stub 310 further transmits the instruction to the device driver 330 via the device controller 320. The device driver 330 accordingly reads data from the scanner 340 and transmits the input data to the data transfer execution element 148 included in the interface unit 140 via the device controller 320, the stub 310, and the proxy 190. The data transfer execution element 148 further sends the data to the data transfer execution element 129 included in the interface unit 120 via the application unit 110. The data transfer execution element 129 sends the data to the stub 210 included in the separate computer 200 via the proxy 180 across the network. The stub 210 transmits the data to the device driver 230 via the device controller 220. The device driver 230 then outputs the data to the printer 240. This procedure accordingly implements the data transfer from the scanner 340 to the printer 240.

As discussed previously, the proxies 180 and 190 and the stubs 210 and 310 carry out abstraction of the communications paths for connecting the computers with each other, with respect to the upper constituents, that is, the application unit 110 and the interface units 120 and 140, in the course of transmission of various pieces of control information and data between the computers 100 and 200 and between the computers 100 and 300 across the network. Namely the proxies 180 and 190 and the stubs 210 and 310 apparently remove a difference in control procedure, which is ascribed to the different types of the interposed communication paths, and enable the application unit 110 and the interface units 120 and 140 to carry out transmission of control information and data without taking into account whether the interposed communication path connects different computers across the network boundary or connects different processes across the process boundary in an identical computer.

The device controllers 220 and 320 apparently remove a difference in control procedure, which is ascribed to the different device classes or device types of the corresponding devices (that is, the printer 240 in the case of the device controller 220 and the scanner 340 in the case of the device controller 320), and carry out abstraction of the devices (abstraction of the hardware) with respect to the upper constituents, that is, the application unit 110 and the interface units 120 and 140.

The processing path via the proxies 180 and 190 and the stubs 210 and 310 enables the application unit 110 and the interface units 120 and 140 to set, control, and operate the device in a substantially fixed control environment irrespective of the location of the device, without considering the type of the interposed communications path. The processing path via the device controllers 220 and 320 also enables the application unit 110 and the interface units 120 and 140 to set, control, and operate the device in a substantially fixed control environment, without considering the device class (device type).

When the user of the computer 100 operates the mouse 84 and drops the dragged scanner icon 410' upon the printer icon 420, the data transfer from the scanner 340 to the printer 240 is implemented in the above manner.

In the event that the decision element 122 determines that the combination is inoperable as the composite device at step S108 in the flowchart of FIG. 24, on the other hand, the program executes the following process. In accordance with a concrete procedure, in the case of the negative answer at step S108, the determination element 136 gives an instruction to display an impossible-correlation mark to the data output element 132 at step S116. The data output element 132 accordingly displays a predetermined mark representing an impossible correlation at a specific position in the window on the monitor 170, where the icon corresponding to the source device is laid upon the icon corresponding to the destination device. This informs the user that the combination of the source device of interest with the destination device of interest is inoperable as the composite device and the correlation is eventually unfulfilled.

As described above, when the user of the computer 100 drags the scanner icon 410 onto the printer icon 420, in order to read an image with the scanner 340 connected to the computer 300 and print the input image with the printer 240 connected to the computer 200, the procedure of the embodiment automatically determines whether the combination of the scanner 340 with the printer 240 is operable as the composite device. In the case of the affirmative answer at step S108, that is, when it is determined that the combination is operable as the composite device, it is guaranteed that the printer 240 can receive and process the image data transmitted from the scanner 340. When the user subsequently drops the dragged scanner icon 410' upon the printer icon 420 to start the actual transfer of the image data from the scanner 340 to the printer 240, this arrangement of the embodiment ensures the effective data transfer between the scanner 340 and the printer 240.

In the above example, when the dragged scanner icon 410' is dropped upon the printer icon 420, the data transfer from the scanner 340 to the printer 240 starts immediately. In another example discussed below, the data transfer does not start immediately, but a user interface is displayed in a window on the monitor 170 at the moment of dropping the dragged scanner icon 410' upon the printer icon 420.

Figure 25:
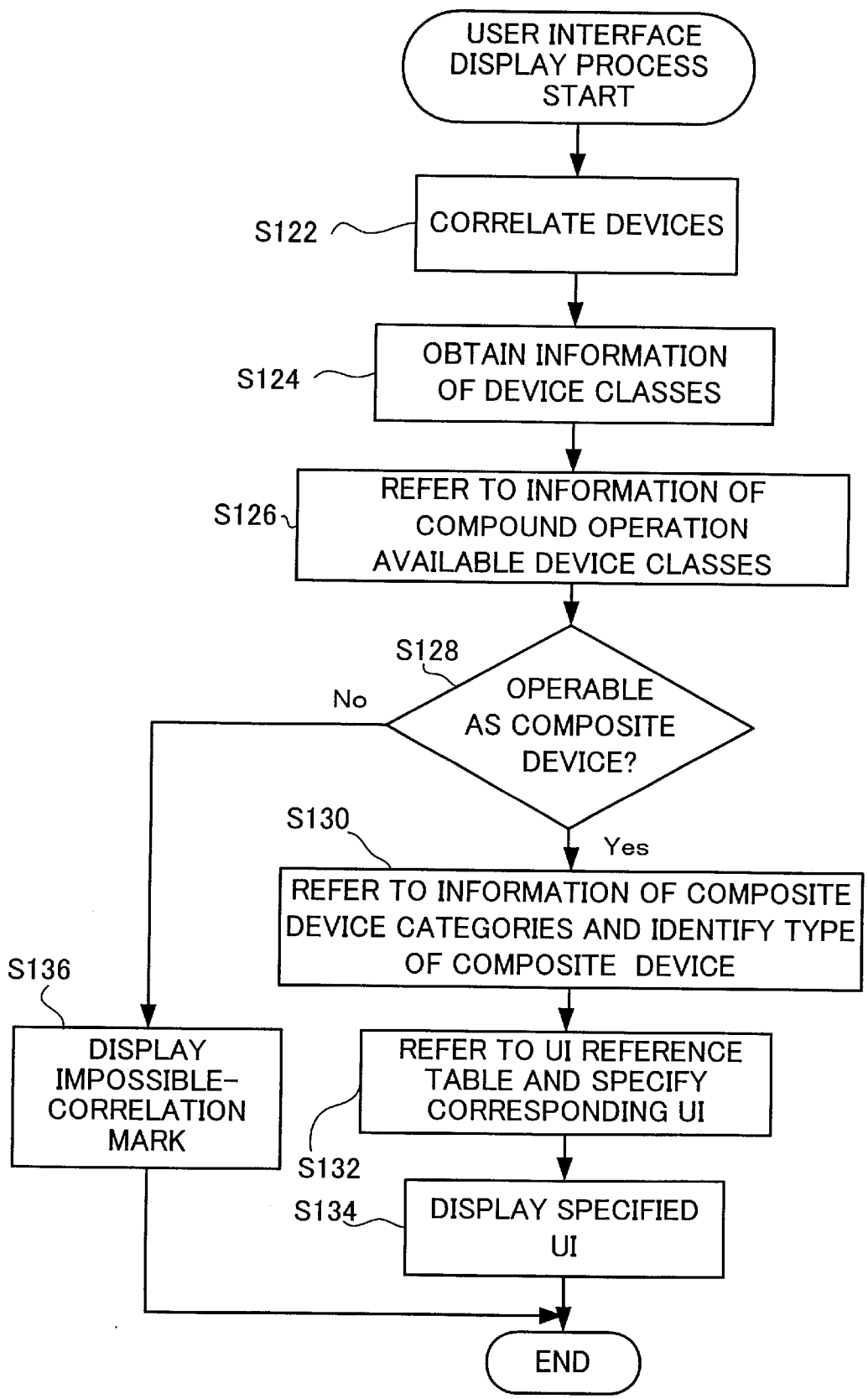
FIG. 25 is a flowchart showing a user interface display routine executed by the interface unit 120 shown in FIG. 21.

FIG. 25 is a flowchart showing a user interface display routine executed by the interface unit 120 shown in FIG. 21.

The processing of steps S122 through S130 and the processing of step S136 in the flowchart of FIG. 25 are identical with the processing of steps S102 through S110 and the processing of step S116 shown in the flowchart of FIG. 24 and are thus not specifically described here.

After identifying the type of the composite device (that is, determining that the type of the composite device is the 'copying machine' in this example) at step S130, the determination element 136 refers to the UI reference table 128 and specifies a user interface corresponding to the type of the composite device thus-determined at step S132. The UI reference table 128 includes, for example, identification numbers of user interfaces corresponding to the respective types of the operable composite devices. In accordance with a concrete procedure of step S132, the determination element 136 reads the identification number of the user interface corresponding to the type of the composite device identified at step S130 from the UI reference table 128 and transmits the identification number to the data output element 132.

Referring back to FIG. 23, when the user of the computer 100 operates the mouse 84 and drops the dragged scanner icon 410' upon the printer icon 420, the program proceeds to the processing of step S134 shown in the flowchart of FIG. 25.

The data output element 132 downloads data of the corresponding user interface, that is, data required to display the corresponding user interface in a window on the monitor 170, from the UI data storage unit 150, based on the transmitted identification number of the corresponding user interface. The UI data storage unit 150 stores data of the user interfaces corresponding to the respective types of the operable composite devices. The user interface corresponding to the type of the composite device implies the user interface suitable for setting, controlling and operating (in a narrow sense) the composite device.

Since the type of the composite device identified by the determination element 136 is the 'copying machine' in this example, the data output element 132 selects data of the user interface for operating the copying machine among the data of the user interfaces stored in the UI data storage unit 150 and downloads the data of the selected user interface.

The data output element 132 subsequently outputs the downloaded data of the user interface to the monitor 170 connected to the computer 100 and displays the user interface suitable for operating the copying machine as the composite device in a window on the monitor 170 at step S134.

Figure 26:
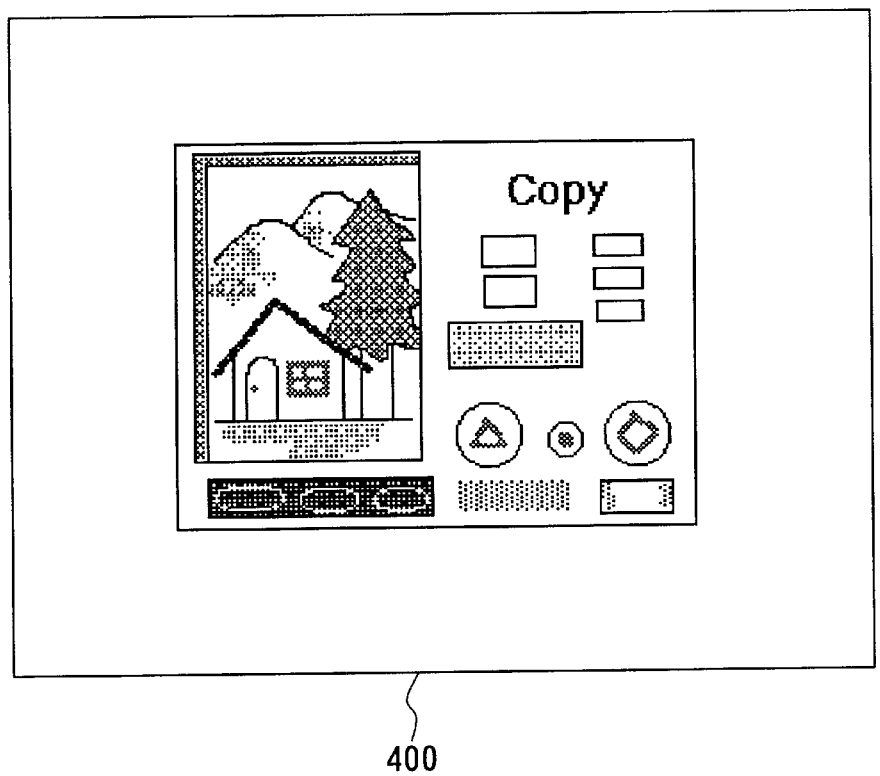
FIG. 26 shows a user interface for operating a copying machine as a composite device displayed in the window on the monitor 170 of FIG. 21.

In accordance with the above procedure, at the moment when the user of the computer 100 operates the mouse 84 and drops the dragged scanner icon 410' upon the printer icon 420, a user interface for operating a copying machine as the composite device as shown in FIG. 26 is displayed in a window on the monitor 170 as the user interface for operating both the scanner 340 and the printer 240.

Figure 27:
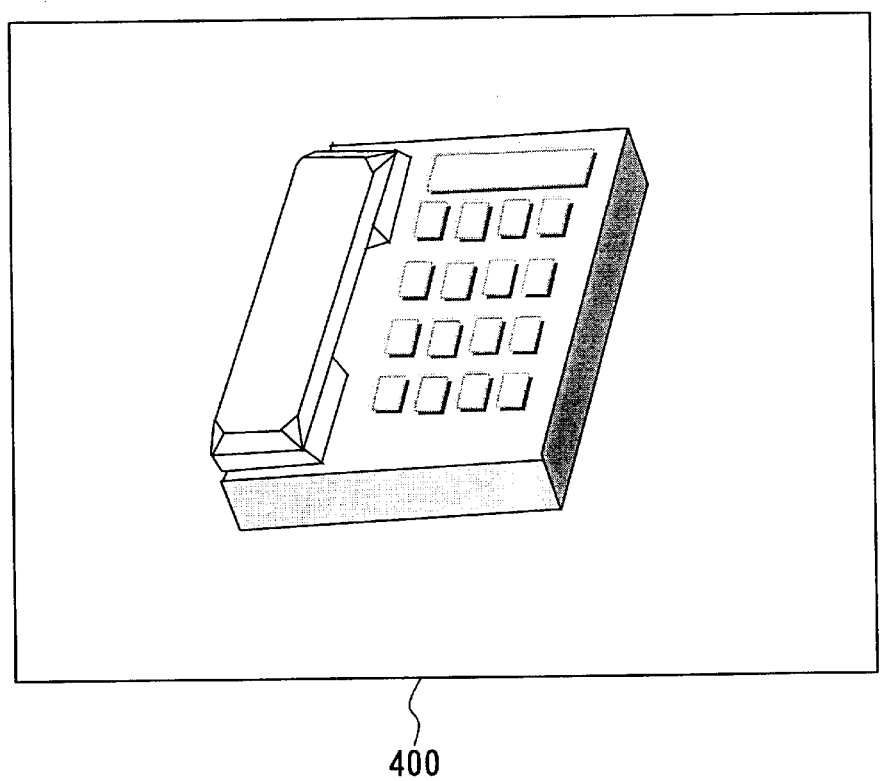
FIG. 27 shows another user interface for operating a receiver facsimile as a composite device displayed in the window on the monitor 170 of FIG. 21.

In the above example, the type of the composite device is the 'copying machine' specified by the combination of the device class 'printer' with the device class 'scanner'. The user interface for operating the copying machine as shown in FIG. 26 is thus displayed in a window on the monitor 170. In the case of another combination of the device class 'printer' with the device class 'facsimile', the type of the composite device is the 'facsimile' (receiver)', so that another user interface for operating a receiver facsimile is displayed in a window on the monitor 170 as shown in FIG. 27.

As described above, when the user of the computer 100 desires to read an image with the scanner 340 connected to the computer 300 and print the input image with the printer 240 connected to the computer 200, a user interface for operating a copying machine having the functions of both a printer and a scanner is displayed as the user interface for operating both the scanner 340 and the printer 240. This arrangement does not require different user interfaces for the scanner 340 and the printer 240 and enables the user to specify the required settings simultaneously in a united user interface. This accordingly provides the user with the optimized operatability. The user regards the combination of the scanner 340 and the printer 240 as one composite device, that is, a copying machine, and integrally operates the scanner 340 and the printer 240. This further optimizes the operatability.

In the above example, the user interface is displayed in the window on the monitor 170 at the moment when the dragged scanner icon 410' is dropped upon the printer icon 420. As discussed below, however, an icon corresponding to the composite device may be displayed prior to the display of the user interface for operating the composite device. In this case, in order to enable the user to select display or non-display of the icon, a typical procedure may detect an operation or non-operation of a specific key at the moment of the drag and drop operation or may display a menu for selecting creation or non-creation of an icon.

Figure 28:
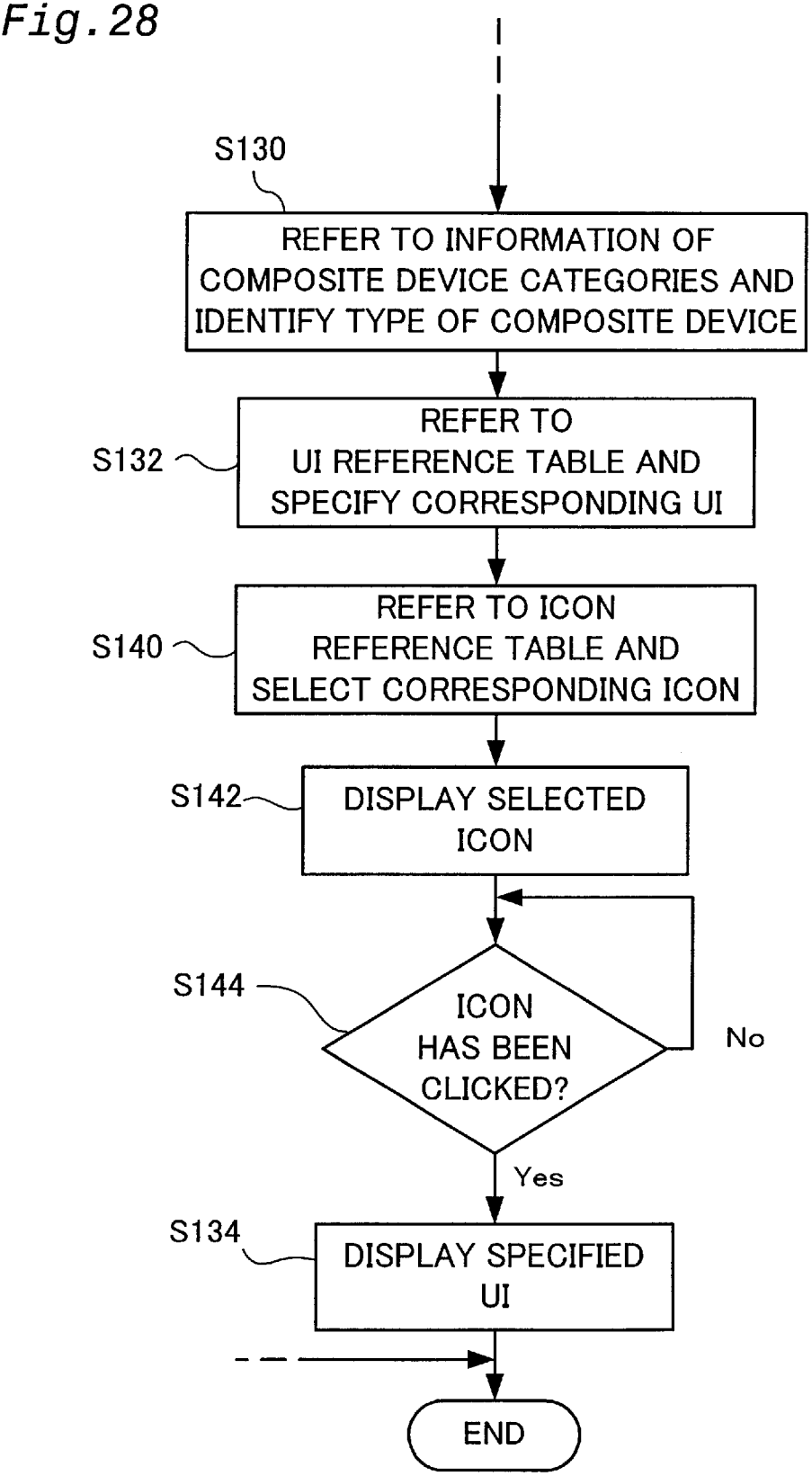
FIG. 28 is a flowchart showing a modification of the user interface display routine of FIG. 25.

FIG. 28 is a flowchart showing a modification of the user interface display routine of FIG. 25.

In this modified procedure, at step S132, the determination element 136 refers to the UI reference table 128 and specifies a user interface corresponding to the type of the composite device identified at step S130. At subsequent step S140, the determination element 136 refers to the icon reference table 130 and selects an icon corresponding to the type of the composite device identified at step S130. The icon reference table 130 stores the identification numbers of icons corresponding to the respective types of the operable composite devices. The determination element 136 reads the identification number of the icon corresponding to the predetermined type of the composite device from the icon reference table 130 and transmits the identification number of the icon to the data output element 132.

When the user of the computer 100 operates the mouse 84 and drops the dragged scanner icon 410' upon the printer icon 420, the program proceeds to the processing of and after step S142 shown in the flowchart of FIG. 28.

The data output element 132 downloads data for displaying the corresponding icon in the window on the monitor 170 from the icon data storage unit 160, based on the identification number of the icon transmitted from the determination element 136. The icon data storage unit 160 stores the data of icons that visually represent the respective types of the operable composite devices.

In the case where the type of the composite device identified by the determination element 136 is the 'copying machine', the data output element 132 selects the data of the icon corresponding to the copying machine among the data of icons stored in the icon data storage unit 160 and downloads the data of the selected icon.

The data output element 132 subsequently outputs the downloaded data of the selected icon to the monitor 170 connected to the computer 100 and displays the icon corresponding to the copying machine as the composite device in the window on the monitor 170 at step S142.

Figure 29:
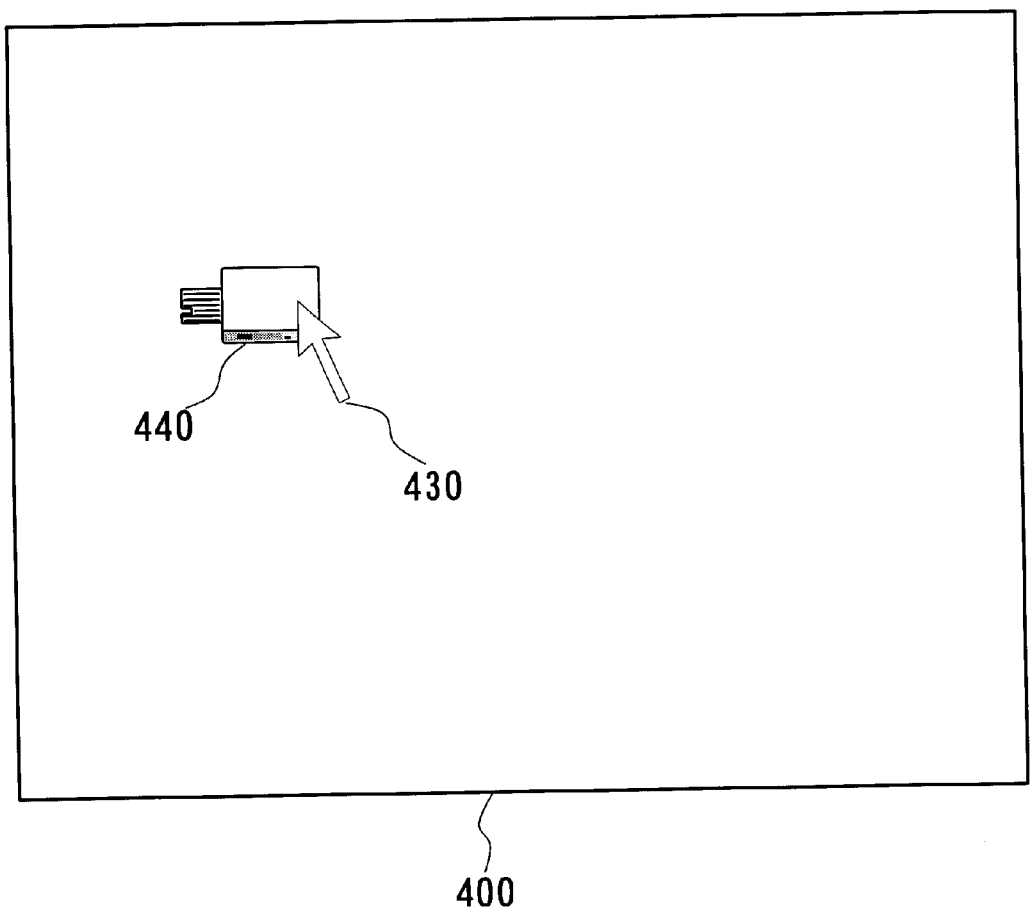
FIG. 29 shows a copying machine icon displayed in the window on the monitor 170 of FIG. 21.

At the moment when the user of the computer 100 operates the mouse 84 and drops the dragged scanner icon 410' upon the printer icon, a copying machine icon 440 that visually represents the copying machine as the composite device is displayed in the window on the monitor 170 as shown in FIG. 29. The copying machine icon 440 may be displayed at the position of the drag and drop operation or at a separate position like a composite device folder. The scanner icon 410 and the printer icon 420 may be eliminated temporarily from the window on the monitor 170 as shown in FIG. 29 or may alternatively be kept in the window.

The determination element 136 stores a piece of information regarding which devices actually constitute the composite device represented by the displayed copying machine icon 440 (that is, a piece of information showing that the copying machine as the composite device consists of the scanner 340 as the source device and the printer 240 as the destination device) into the device information memory elements 122 and 144 as the information pieces of accumulated results 131 and 149. The determination element 136 then monitors whether or not the user of the computer 100 places the mouse cursor 430 on the copying machine icon 440 as shown in FIG. 29 and clicks a button on the mouse 84 at step S144. In response to the detection of a click of the mouse 84, the determination element 136 carries out the processing of step S134, which has been described previously with the flowchart of FIG. 25.

At the moment when the user of the computer 100 clicks a button on the mouse 84 while the mouse cursor 430 is placed on the copying machine icon 440, the processing of steps S144 and S134 causes the user interface for operating the copying machine to be displayed in the window on the monitor 170 as shown in FIG. 26.

This modified procedure displays the icon corresponding to the composite device, that is, the copying machine, as the icon corresponding to the combination of the scanner 340 and the printer 240, which are the objects of correlation. This enables the user of the computer 100 to visually recognize the combination of the scanner 340 with the printer 240 as one new device, the copying machine, and facilitates the subsequent processing. While the icon corresponding to the composite device or the copying machine is displayed, the user interface for operating the composite device or the copying machine is displayed in response to a specified instruction of the user. This arrangement enables the user to input the required instructions, for example, the settings of the copying machine, via the user interface.

While the user interface for operating the composite device, for example, the copying machine, is displayed in the window on the monitor 170, when the user of the computer 100 inputs the required instructions, for example, the settings of the composite device, to the computer 100 via the user interface, the instructions are transmitted to the printer 240 connected with the computer 200 and to the scanner 340 connected with the computer 300 according to the process discussed below.

When the user of the computer 100 operates the keyboard (not shown) or the mouse 84 and inputs the instructions regarding the desired settings of the composite device via the user interface displayed in the window on the monitor 170, the application unit 110 transmits the instructions regarding the settings of the printer 240 to the interface unit 120 and the instructions regarding the settings of the scanner 340 to the interface unit 140. The interface units 120 and 140 respectively transmit the input instructions from the proxies 180 and 190 to the stubs 210 and 310 in the separate computers 200 and 300 across the network. The stubs 210 and 310 further transmit the instructions to the device drivers 230 and 330 via the device controllers 220 and 320. The device driver 230 implements the settings of the printer 240 in response to the instructions, whereas the device driver 330 implements the settings of the scanner 340 in response to the instructions.

As described previously, the result of the determination by the decision element 122 and the result of the identification by the determination element 136 are accumulated as the information of accumulated results 131 into the device information memory element 124 at step S110 in the data transfer starting process shown in FIG. 24 or at step S130 in the user interface display process shown in FIG. 25. In the above example, the printer 240 as the corresponding device is correlated with the scanner 340 as the mated device, and the subsequent processing is performed as discussed above. Every time another device is correlated with the printer 240 as the corresponding device, the above processing is carried out to accumulate the result of the determination and the result of the identification as the information of accumulated results 131. The information of accumulated results 131 accordingly includes the names of all the devices that have been correlated with the printer 240 as the corresponding device in the past, the results of the determination of whether or not the respective combinations of the devices with the printer 240 are operable as the composite devices, and the types of the operable composite devices.

The use of the information of accumulated results 131 enables the following operation. The pieces of information relating to a specific device that has been correlated with the printer 240 as the corresponding device are stored in the information of accumulated results 131. In the data transfer starting process shown in FIG. 24 or in the user interface display process shown in FIG. 25, the decision element 122 accesses to the information of accumulated results 131, in order to retrieve the pieces of information regarding the mated device, at the time when the name of the mated device to be correlated is transmitted from the correlation element 134. In the case where the pieces of information regarding the mated device are included in the information of accumulated results 131, the decision element 122 reads the pieces of information regarding the mated device. When it has been determined previously that the combination with the specific mated device is operable as the composite device according to the pieces of information, the program skips to step S112 in the data transfer starting process or to step S132 in the user interface display process. The subsequent processing is based on these pieces of information. When it has been determined previously that the combination with the specific mated device is inoperable as the composite device, on the other hand, the program skips to step S116 in the data transfer starting process or to step S136 in the user interface display process.

This arrangement omits the processes of reference, determination, and identification (the processing of steps S104 through S110 or the processing of steps S124 through S130), thereby favorably shortening the processing time.

In the case where the information of accumulated results 131 includes correlation frequency information, which represents the frequency of correlation of a specific mated device with the printer 240, after the series of the processing in the data transfer starting process or in the user interface display process is concluded, the decision element 122 accesses to the information of accumulated results 131 again and updates the correlation frequency information regarding the specific mated device. A concrete procedure increments the frequency of correlation by one with respect to the specific mated device.

Figures 30, 31:
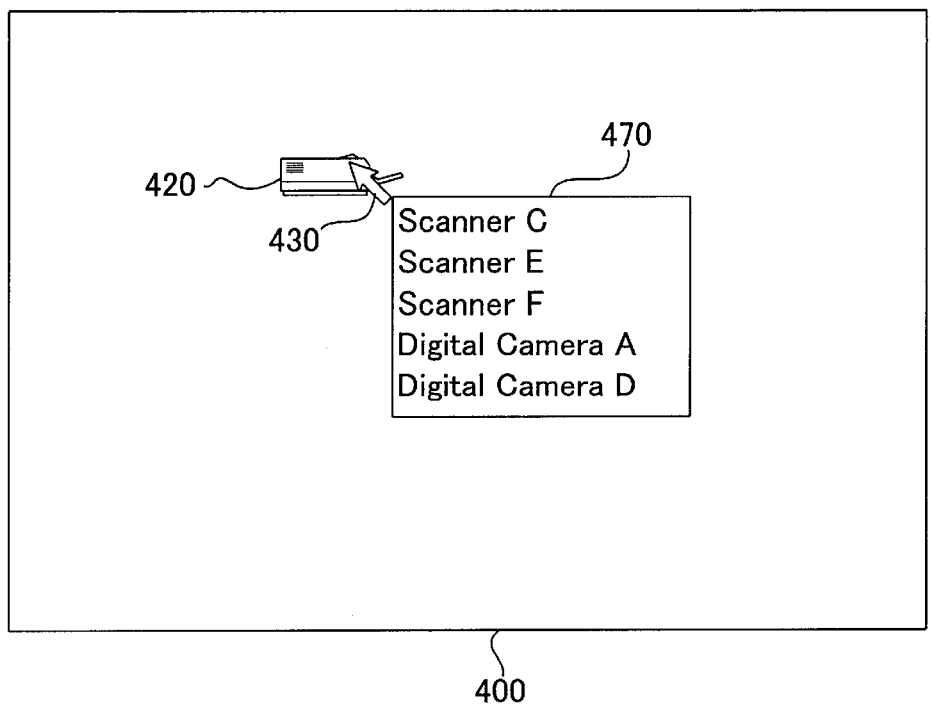
FIG. 30 shows a pop-up menu displayed in the vicinity of the printer icon in the window on the monitor 170 by utilizing the information of accumulated results 131 shown in FIG. 21.
FIG. 31 shows possible combinations of the source device and the destination device displayed in a window on the monitor 170 by utilizing the information of accumulated results 131 shown in FIG. 21.

The use of the information of accumulated results 131 also enables the following operation. FIG. 30 shows a pop-up menu displayed in the vicinity of the printer icon 420 in the window on the monitor 170 by utilizing the information of accumulated results 131 shown in FIG. 21. As shown in FIG. 30, while the printer icon 420 is displayed in the window 400 on the monitor 170, when the user operates the mouse 84 to select the printer icon 420 with the mouse cursor 430 displayed in the window 400 and click the right button on the mouse 84, the data output element 132 refers to the information of accumulated results 131 and causes a pop-up menu 470 to be displayed in the vicinity of the printer icon 420. The pop-up menu 470 includes the names of the devices, which have been correlated with the printer 240 as the corresponding device in the past and determined that their respective combinations with the printer 240 are operable as composite devices. The names of the devices displayed in the pop-up menu 470 are arranged in the descending sequence of the frequency of correlation with the printer 240, based on the correlation frequency information stored in the information of accumulated results 131.

When the user selects a desired device to be correlated with the printer 240 as the corresponding device among the displayed device options with the mouse cursor 430, the correlation element 134 correlates the printer 240 as the corresponding device with the selected mated device.

The display of the pop-up menu enables the user to readily grasp the possible device options that have been determined to be operable as the composite devices with the printer 240 (corresponding device), as well as to obtain the frequency of correlation of the respective device options with the printer 240. Since the devices having the higher frequencies of correlation with the printer 240 are located at the upper positions, the user can immediately select the device that has been correlated with the printer 240 most frequently.

FIG. 31 shows possible combinations of the source device and the destination device displayed in a window on the monitor 170 by utilizing the information of accumulated results 131 shown in FIG. 21. When the user instructs the computer 100 to display possible combinations of the source device and the destination device through the operation of the mouse 84, a specific interface unit refers to the information of accumulated results stored therein and the information of accumulated results stored in another interface unit, and retrieves the combinations of devices that have been correlated with each other in the past by means of the computer 100 and determined to be operable as the composite devices. A combination display window 480 is open upon the window 400 on the monitor 170 to display the results of the retrieval as shown in FIG. 31.

The combination display window 480 shows the names of the source device and the destination device with respect to each combination of the devices that have been correlated with each other in the past by means of the computer 100 and determined to be operable as the composite device, together with the latest date and time of the correlation.

The user can thus readily grasp which combinations of devices have been correlated to each other by means of the computer 100 and determined to be operable as composite devices.

Figure 32:
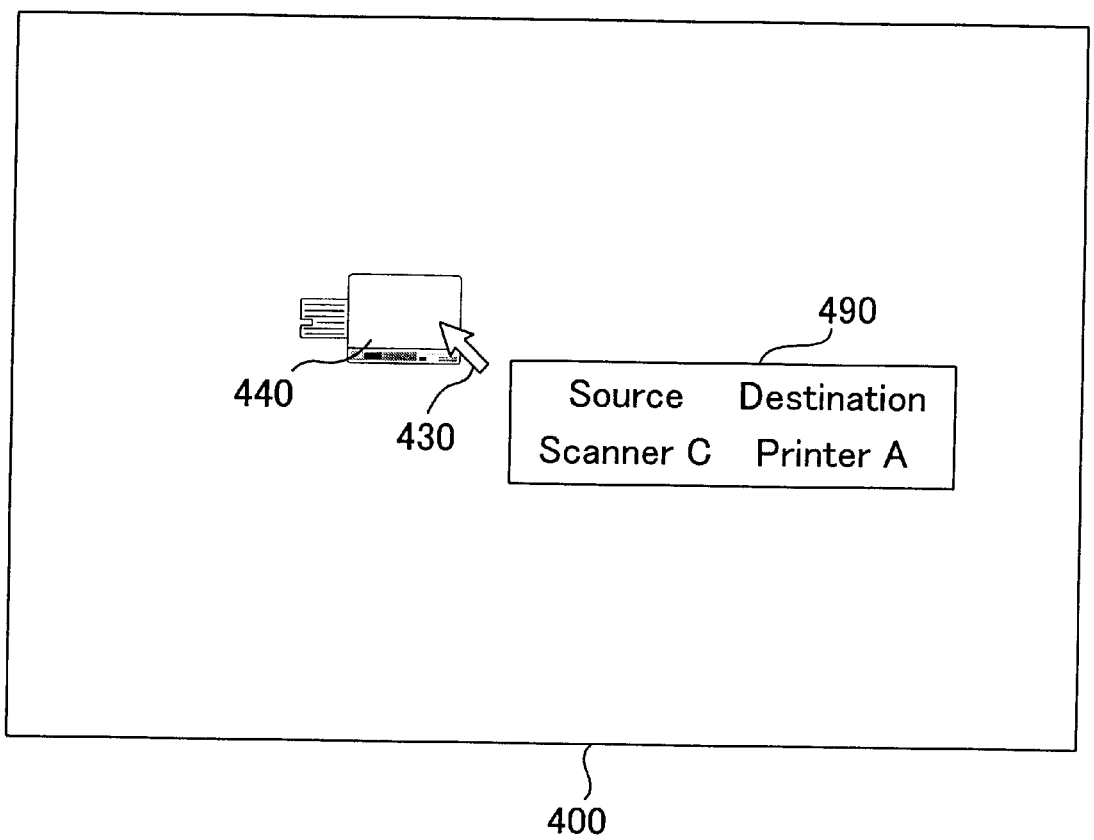
FIG. 32 shows a pop-up menu displayed in the vicinity of the copying machine icon in the window on the monitor 170 by utilizing the information of accumulated results 131 shown in FIG. 21.

FIG. 32 shows a pop-up menu displayed in the vicinity of the copying machine icon 440 in the window on the monitor 170 by utilizing the information of accumulated results 131 shown in FIG. 21. As shown in FIG. 32, while the copying machine icon 440 that visually represents the copying machine as the composite device is displayed in the window 400 on the monitor 170, when the user operates the mouse 84 to select the copying machine icon 440 with the mouse cursor 430 displayed in the window 400 and click the right button of the mouse 84, the data output element 132 refers to the information of accumulated results 131 and causes a pop-up menu 490 to be displayed in the vicinity of the copying machine icon 440. The pop-up menu 490 shows the names of the devices constituting the composite device (that is, the copying machine) represented by the copying machine icon 440. In a concrete example, the name of the scanner 340 (for example, scanner C) as the source device and the name of the printer 240 (for example, printer A) as the destination device are displayed in the pop-up menu 490 as the devices constituting the composite device.

While an icon representing a specific composite device is displayed, even if the user forgets which combination of the devices constructs the specific composite device, the display of the pop-up menu 490 readily informs the user of the combination of the devices.

In the embodiment discussed above, the data transfer starting process shown in FIG. 24 or the user interface display process shown in FIG. 25 is carried out by dragging the scanner icon 410 corresponding to the scanner 340 as the source device onto the printer icon 420 corresponding to the printer 240 as the destination by the operation of the mouse 84 as shown in FIG. 23. In accordance with one possible modification, the data transfer starting process or the user interface display process may be implemented in the following case, as well as in the case where the icon corresponding to the source device is dragged onto the icon corresponding to the destination device.

Figure 33:
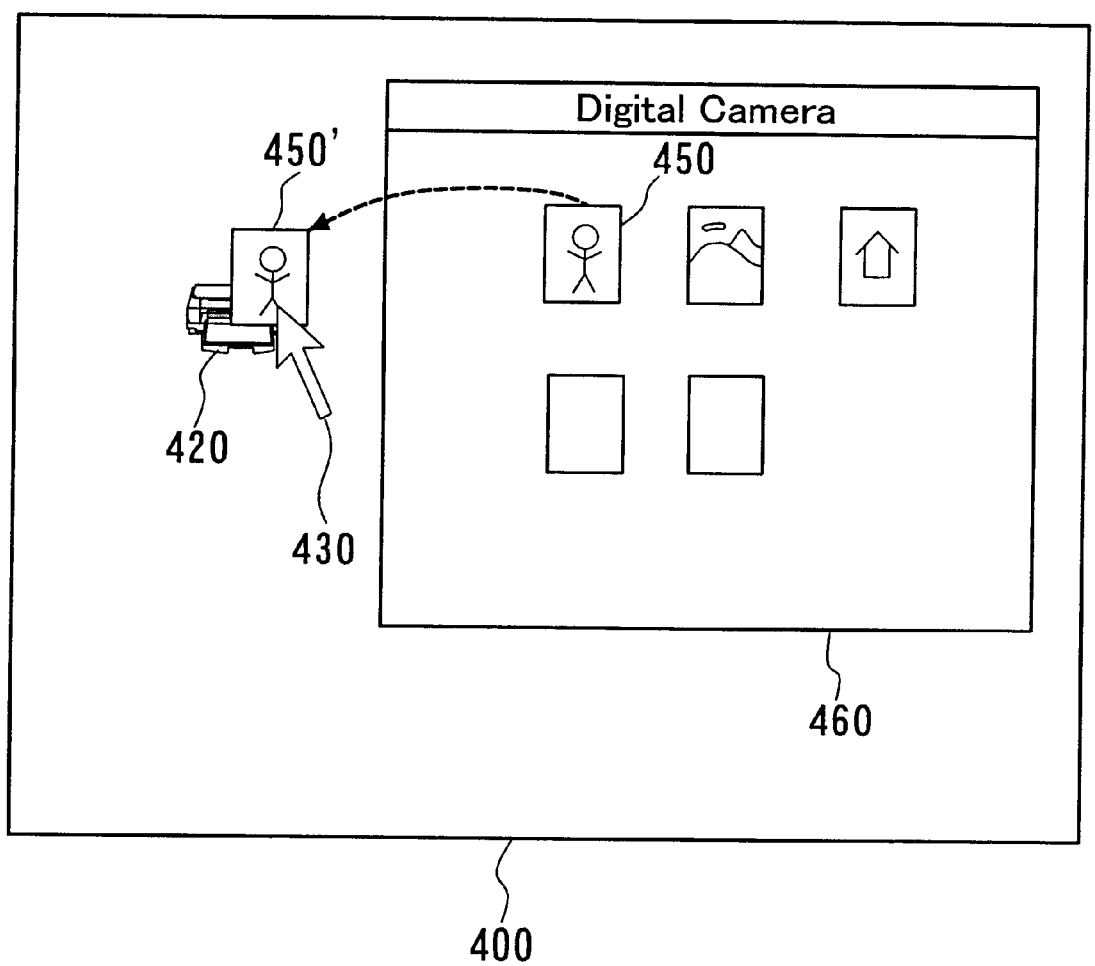
FIG. 33 shows image icons and the printer icon displayed in the window on the monitor 170 shown in FIG. 21.

It is here assumed that a digital camera is used, instead of the scanner 340, as the source device and that a digital camera icon corresponding to the source device and the printer icon 420 corresponding to the destination device are displayed in the window 400 on the monitor 170. When the user operates the mouse 84 to lay the mouse cursor 430 upon the digital camera icon and double clicks the button on the mouse 84, a window 460 is open as shown in FIG. 33 to display image icons corresponding to respective image files taken into the digital camera. When the user selects a desired image file to be printed with the printer 240 among a plurality of image files taken into the digital camera and drags an image icon 450 corresponding to the selected image file onto the printer icon 420, the data transfer starting process shown in FIG. 24 or the user interface display process shown in FIG. 25 is implemented.

At step S102 in the flowchart of FIG. 24 or at step S122 in the flowchart of FIG. 25, the correlation element 134 included in the interface unit 120 analyzes the operation of the mouse 84 transmitted from the application unit 110. The analysis shows that the device camera is the source device that has input the image file of interest and thereby the mated device to be correlated with the printer 240, which is the device corresponding to the interface unit 120. The correlation element 134 accordingly correlates the printer 240 with the digital camera.

In this manner, the data transfer starting process or the user interface display process may be carried out by dragging the icon corresponding to a specific piece of information input into the source device onto the icon corresponding to the destination device.

In the above description, the icon corresponding to the source device (or the icon corresponding to a specific piece of information input into the source device) is dragged onto the icon corresponding to the destination device. The data transfer starting process or the user interface display process may, however, be carried out alternatively by dragging the icon corresponding to the destination device onto the icon corresponding to the source device (or the icon corresponding to a specific piece of information input into the source device).

Instead of dragging the icon, another possible procedure selects both the icon corresponding to the source device (or the icon corresponding to a specific piece of information input into the source device) and the icon corresponding to the destination device through the mouse operation and subsequently selects an execution command of the data transfer starting process or the user interface display process among the options included in a displayed pop-up menu, so as to implement the selected process.

In the configuration of FIG. 21, the user gives a variety of instructions to the application unit 110 in the computer 100 by operating the mouse 84 connected to the computer 100. The principle of the present invention is, however, not restricted to this configuration. For example, a variety of instructions may be given to the application unit 110 in the computer 100 via a network with an information terminal, such as a PDA (personal digital assistant) module, a cellular phone, and a mobile computer.

Figure 34:
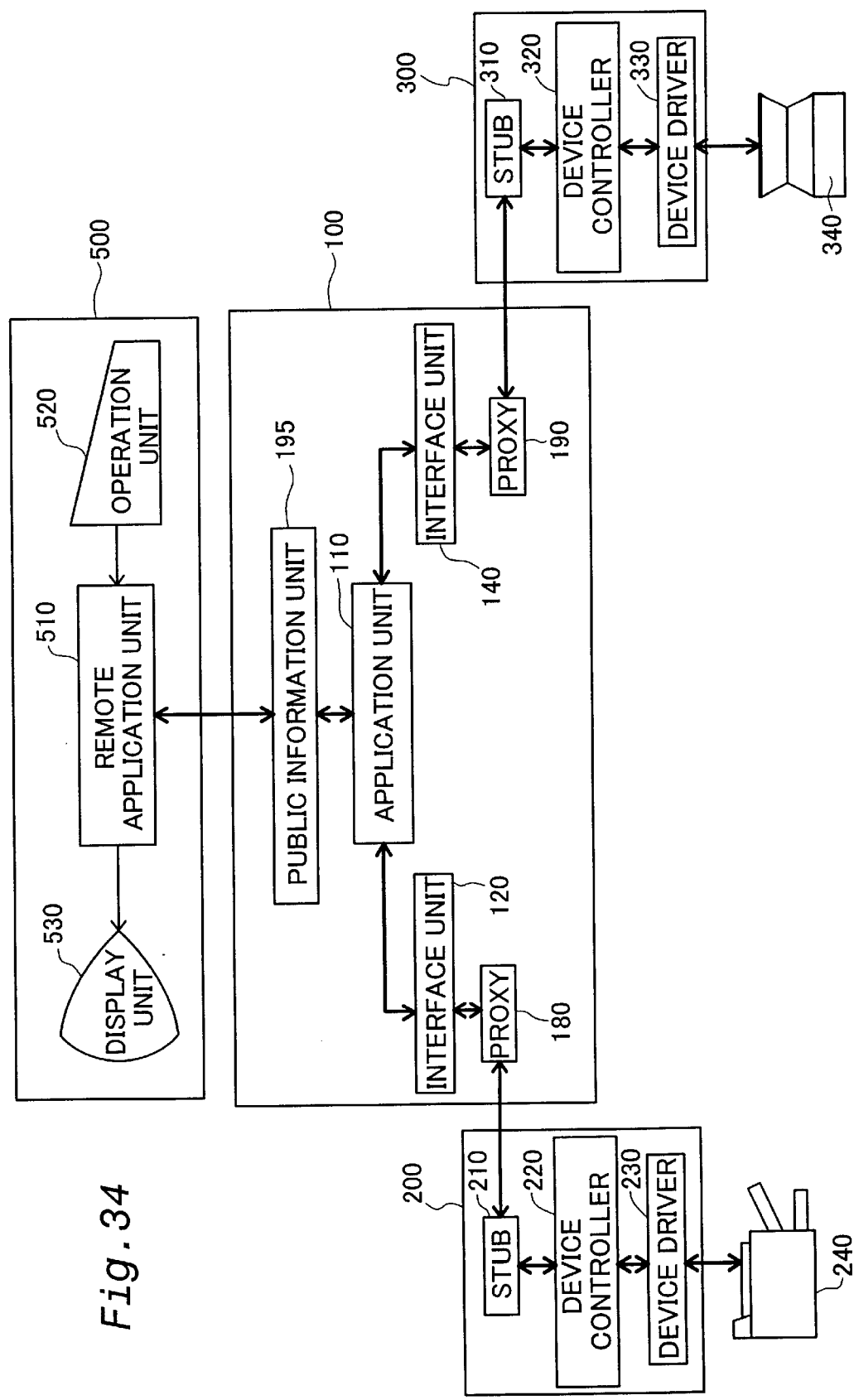
FIG. 34 is a block diagram showing a configuration in the case that an instruction is given to the application unit 110 of the computer 100 by utilizing an information terminal 500.

FIG. 34 is a block diagram showing a configuration in the case that an instruction is given to the application unit 110 of the computer 100 by utilizing an information terminal 500. The constituents in the structure of FIG. 34 that are identical with those in the structure of FIG. 21 are expressed by the same numerals.

Referring to FIG. 34, the computer 100 is connected with the information terminal 500 via a network (not shown), as well as with the computers 200 and 300. The computer 100 includes a public information unit 195, in addition to the application unit 110, the interface units 120 and 140, and the proxies 180 and 190. The information terminal 500 includes a remote application unit 510, an operation unit 520, and a display unit 530.

The public information unit 195 in the computer 100 is constructed, for example, by a Web server software, whereas the remote application unit 510 in the information terminal 500 is constructed, for example, by a Web browser software.

The public information unit 195 opens the information possessed by the application unit 110 to the network by the Web. When the user of the information terminal 500 operates the operation unit 520 and inputs an URL (Uniform Resource Locator) of the computer 100, for example, 'http://123.45.67.89/resource', the remote application unit 510 accesses to the computer 100 based on the input URL, obtains information opened to the network by the public information unit 195, and causes the obtained information to be displayed in the display unit 530. As is known to those skilled in the art, HTTP, which is the Web standard protocol, is applied for transmission of information between the computer 100 that is a Web server and the information terminal 500 that is a Web client.

Figure 35:
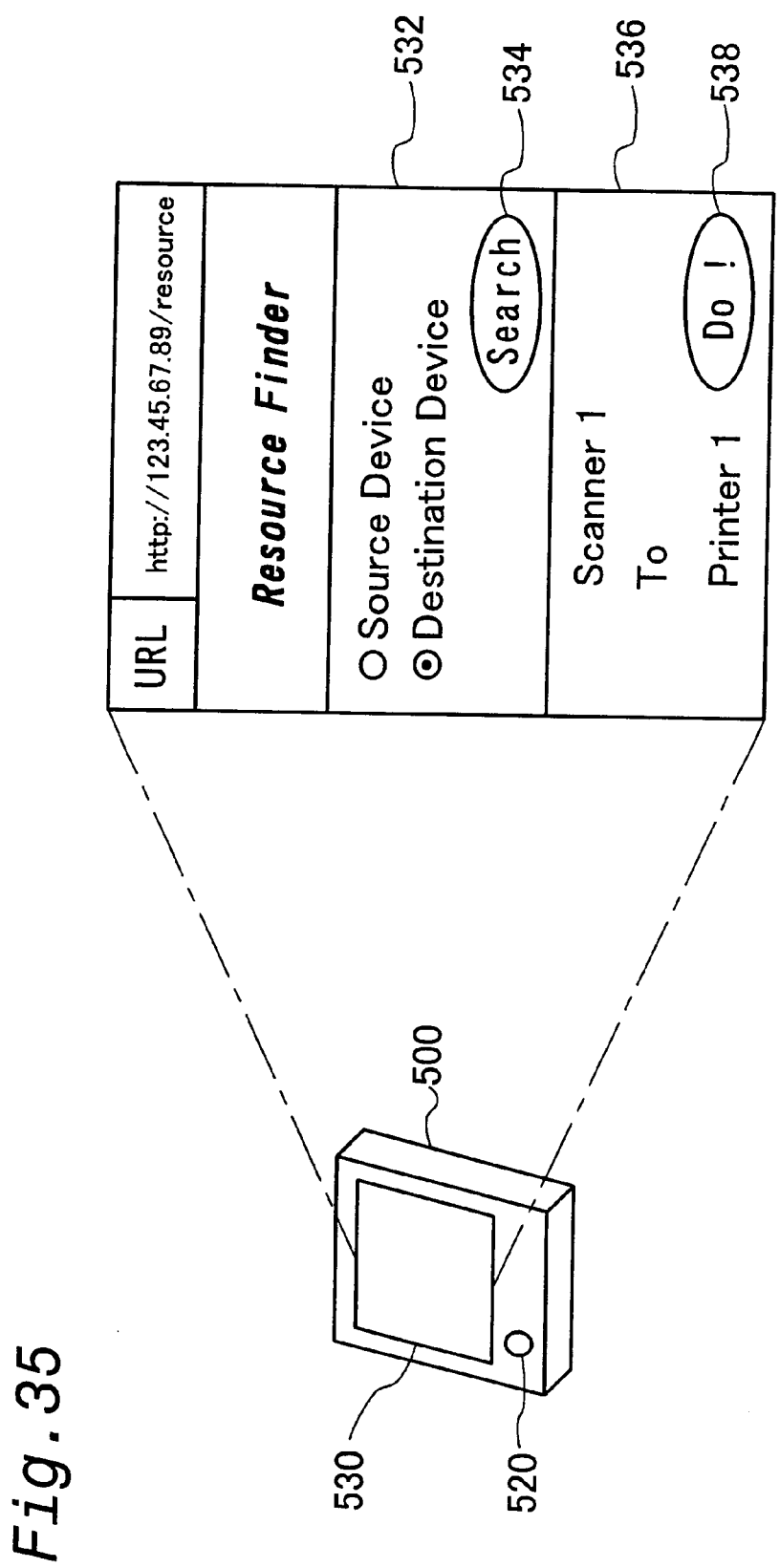
FIG. 35 shows the appearance of the information terminal 500 shown in FIG. 34 and an exemplified window displayed in a display unit 530 of the information terminal 500.

FIG. 35 shows the appearance of the information terminal 500 shown in FIG. 34 and an exemplified window displayed in the display unit 530 of the information terminal 500. The information opened to the network by the public information unit 195 of the computer 100 is displayed in the form of a home page in the display unit 530 of the information terminal 500 as shown in FIG. 35.

In the example of FIG. 35, the user of the information terminal 500 operates the operation unit 520, selects either one of the options displayed in a first display area 532, that is, 'Source Device' and 'Destination Device', and presses a Search button 534. The possible candidates of the selected device are then displayed in a second display area 536.

In the event that the user of the information terminal 500 operates the operation unit 520 and respectively selects 'Scanner 1' and 'Printer 1' as the desired source device and destination devices among the displayed options, the result of the selection is displayed in the second display area 536 as shown in FIG. 35. When the user further presses an execution button 'Do' 538, the remote application unit 510 gives an instruction of starting data transfer from the Scanner 1 to the Printer 1 to the application unit 110 via the network and the public information unit 195. The application unit 110 further transfers the instruction to the interface unit 120, which accordingly starts the data transfer starting process shown in FIG. 24.

This configuration allows instructions to be given from the information terminal to the application unit via the network, thereby enabling the information terminal with poor resource to control a variety of devices on the network.

In the configuration of FIG. 21, the information on the devices like the printer 240 and the scanner 340, that is, the information pieces 125 and 145 regarding the corresponding device classes, the information pieces 126 and 146 regarding the compound operation available device classes, the information pieces 127 and 147 regarding the composite device categories, and the information pieces of accumulated results 131 and 149 are stored in the device information memory elements 124 and 144 included in the interface units 120 and 140. The pieces of information on the devices like the printer 240 and the scanner 340 are also stored in the device controllers 220 and 320 corresponding to the respective devices 240 and 340. It is, however, required to store the information pieces of accumulated results 131 and 149 as independent operations. Another possible configuration accordingly does not incorporate the information on the devices like the printer 240 and the scanner 340 in the interface units 120 and 140, but accesses to the device controllers 220 and 320 via the network according to the requirements, so as to obtain the information regarding the devices like the printer 240 and the scanner 340. Still another possible configuration stores the information regarding the devices like the printer 240 and the scanner 340 into a separate computer, for example, a server, on the network other than the computers 100 through 300, and accesses to the separate computer via the network to obtain the information according to the requirements.

In the configuration of FIG. 21, the data of the user interfaces and the data of the icons are stored in the UI data storage unit 150 and the icon data storage unit 160, which are separate from the interface unit 120, and downloaded from the corresponding storage units to be displayed in the window on the monitor 170. The principle of the present invention is, however, not restricted to this configuration. For example, the data of the user interfaces and the data of the icons may be incorporated in the interface unit 120 that is constructed as the COM object. Alternatively the data of the user interfaces and the data of the icons may be stored in the computer 200 or 300 or a separate computer, for example, a server, on the network other than the computers 100 through 300.

The device control system shown in FIG. 21 has the state of connection shown in FIG. 2C. Namely the devices like the printer 240 and the scanner 340 are connected to the computers 200 and 300, which are separate from the computer 100 including the application unit 110 and the ainterface units 120 and 140. In a different state of connection as shown in FIG. 2B, one of the devices like the printer 240 and the scanner 340 may be connected to the computer 100 including the application unit 110, whereas the other device is connected to a separate computer, for example, the computer 200. In the latter state, the constituents of the separate computer, for example, the computer 300, that is, the stub, the device controller, and the device driver, are also generated in the computer 100 including the application unit 110. In the configuration of FIG. 21, the devices like the printer 240 and the scanner 340 are externally connected to the computers 200 and 300. As shown in FIGS. 3A through 3C, the device and the computer may be integrated with each other.

The present invention is not restricted to the above embodiment or its modifications, but there may be many other modifications, changes, and alterations without departing from the scope or spirit of the main characteristics of the present invention.

In the embodiment discussed above, the processing routine refers to the pieces of information with regard to the types of the devices included in the attribute information of the devices of interest, such as the pieces of information 125 and 145 regarding the corresponding device classes and the pieces of information 126 and 146 regarding the compound operation available device classes shown in FIG. 21, and determines whether or not the combination of the devices of the interest is operable as a composite device (see steps S108 in the flowchart of FIG. 24 or step S128 in the flowchart of FIG. 25). As mentioned previously, however, the attribute information referred to by the interface units 22a and 22b includes various pieces of information other than the type of the device, for example, a piece of information for specifying either a source device or a destination device, a piece of information for specifying either a push type or a pull type (that is, either the source side or the destination side is mainly responsible for the data transfer), the processible data formats, the state of the device (for example, operable or not), the performance of the device (for example, the processing speed), the location of the device (for example, the section and the floor), the processing cost (for example, the communication cost and the printing cost) of the device, and the presence or non-presence of a support for a special data transfer method.

In accordance with one modified application, after the determination of whether or not the combination of the devices of interest is operable as the composite device, the procedure may comprehensively estimate the degree of effectiveness with respect to the combination of the devices of interest, which has been determined to be operable as the composite device, based on the attribute information and obtain an evaluation value representing the degree of effectiveness. By way of example, the procedure may previously allocate weighted points to the respective pieces of the attribute information and calculate the total point with respect to the combination of the devices of interest, so as to obtain the evaluation value.

The evaluation value may be displayed in the vicinity of the icon representing the device of interest in the window 400 on the monitor 170.

In the case where a plurality of mated devices are selected for a certain corresponding device to make plural combinations of devices of interest, the procedure may obtain evaluation values with regard to the respective combinations and display a list of the mated devices in the descending sequence of the evaluation value.

Figure 36:
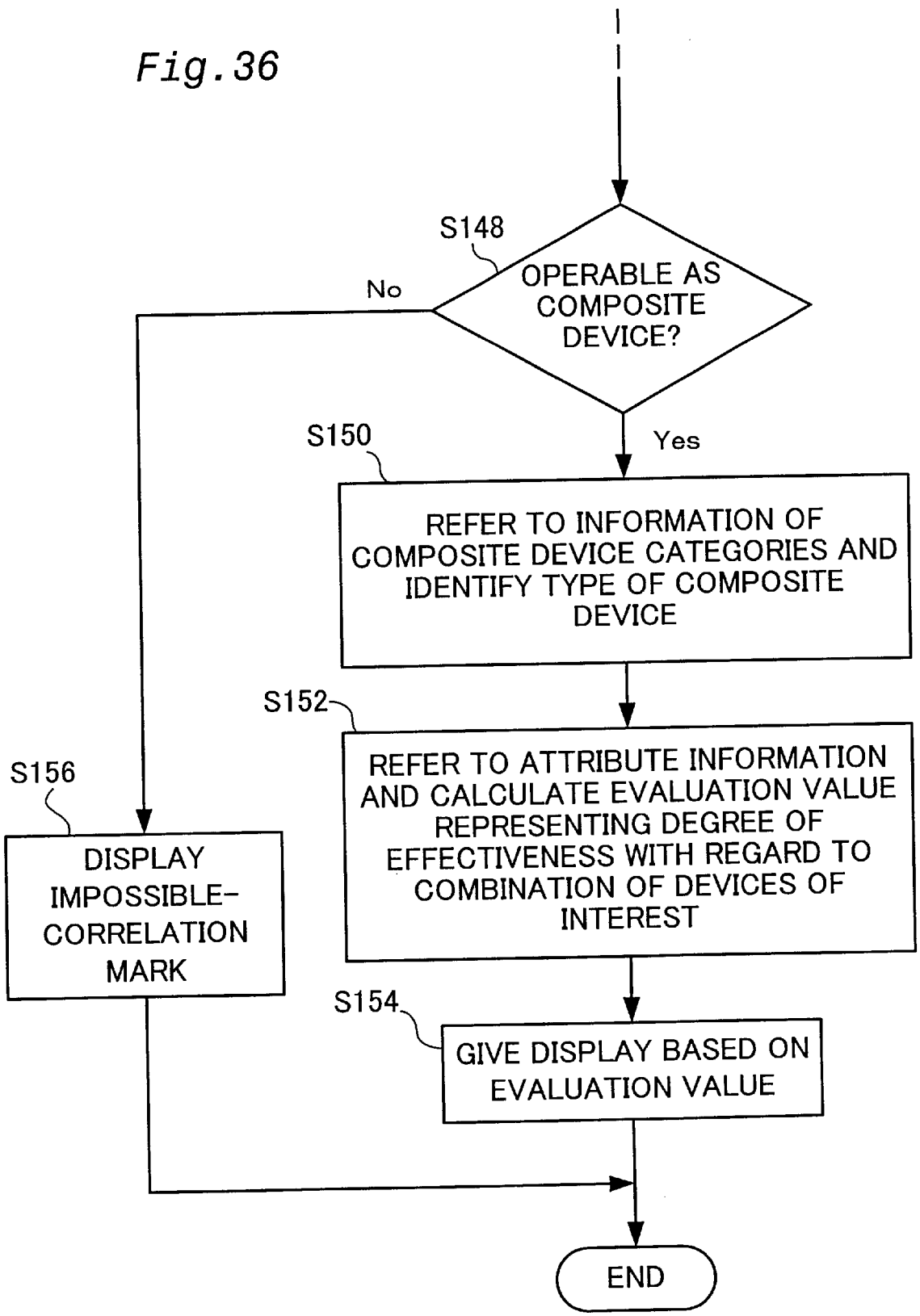
FIG. 36 is a flowchart showing another user interface display routine executed by the interface unit 120 shown in FIG. 21

FIG. 36 is a flowchart showing another user interface display routine executed by the interface unit 120 shown in FIG. 21.

Referring to FIG. 36, when the decision element 122 determines that the combination of the devices of interest is operable as the composite device at step S148, the determination element 136 identifies the type of the composite device at step S150 and subsequently refers to the attribute information stored in the device information memory element 122 or 144 to calculate the evaluation value representing the degree of effectiveness with respect to the combination of the devices of interest at step S152. The data output element 132 then gives the display as described above in the window 400 on the monitor 170, based on the calculated evaluation value at step In the above embodiment, either two devices or three devices are the objects to be controlled. The principle of the present invention is, however, not restricted to such arrangements, but four or more devices may be set as the objects to be controlled.

The scope and spirit of the present invention are limited only by the terms of the appended claims.

What is claimed is:

1. A device control apparatus that enables control of a source device, which is a transmitter of data, and a destination device, which is a receiver of data, said device control apparatus comprising:
 a device specification unit that specifies a source device and a destination device;
 a decision unit that determines whether or not the specified destination device can receive and process data transmitted from the specified source device, based on attribute information of the specified source device and the specified destination device;
 a user interface specification unit that, when said decision unit determines that the specified destination device can receive and process data transmitted from the specified source device, specifies a user interface for operating a composite device, which has both at least part of functions of the specified source device and at least part of functions of the specified destination device, as a user interface for operating both the specified source device and the specified destination device; and
 a display control unit that causes the user interface specified by said user interface specification unit to be displayed on a display unit.

2. A device control apparatus in accordance with claim 1, wherein said display control unit comprises:
 a data storage unit that stores data required to cause user interfaces for respectively operating a plurality of the composite devices to be displayed on said display unit; and
 a data output unit that reads specific data regarding the user interface specified by said user interface specification unit from said data storage unit and outputs the specific data to said display unit.

3. A device control apparatus in accordance with claim 1, wherein said decision unit determines whether or not a combination of a type of the specified source device with a type of the specified destination device is operable as the composite device, so as to determine whether or not the specified destination device can receive and process the data transmitted from the specified source device.

4. A device control apparatus in accordance with claim 1, said device control apparatus further comprising:
 a data transfer execution unit that, when said decision unit determines that the specified destination device can receive and process data transmitted from the specified source device, controls the specified source device and the specified destination device, in order to enable data to be transferred from the specified source device to the specified destination device via said device control apparatus.

5. A device control apparatus in accordance with claim 1, said device control apparatus further comprising:
 a data transfer execution unit that, when said decision unit determines that the specified destination device can receive and process data transmitted from the specified source device, controls the specified source device and the specified destination device, in order to enable data to be transferred from the specified source device to the specified destination device not via said device control apparatus.

6. A device control apparatus in accordance with claim 1, wherein the attribute information is stored in at least one of said device control apparatus, an apparatus including each of the devices, an apparatus connected to each of the devices, and an apparatus connected to said device control apparatus and each of the devices via a network.

7. A device control apparatus in accordance with claim 1, wherein the attribute information includes a piece of information regarding a type of each device.

8. A device control apparatus in accordance with claim 1, wherein the attribute information includes a piece of information regarding a data format processible by each device.

9. A device control apparatus in accordance with claim 1, wherein said decision unit specifies a degree of effectiveness with regard to a combination of the specified source device with the specified destination device, based on the attribute information of the specified source device and the specified destination device, when determining that the specified destination device can receive and process the data transmitted from the specified source device.

10. A device control apparatus in accordance with claim 1, wherein at least one of the source device and the destination device is connected to said device control apparatus via a network.

11. A device control apparatus in accordance with claim 1, wherein at least one of the source device and the destination device is constructed integrally with at least either one of said device control apparatus and an apparatus connected to said device control apparatus via a network.

12. A device control apparatus in accordance with claim 1, wherein said device specification unit specifies at least three devices that, as combined, make up the source device and the destination device.

13. A device control apparatus in accordance with claim 1, wherein said device specification unit specifies the source device and the destination device, when a predetermined operation is performed with respect to both a symbol corresponding to the source device and a symbol corresponding to the destination device while both the symbols are displayed on a display unit.

14. A device control apparatus in accordance with claim 1, wherein said device specification unit specifies the source device and the destination device, when a predetermined operation is performed with respect to both a symbol corresponding to data transmissible from the source device and a symbol corresponding to the destination device while both the symbols are displayed on a display unit.

15. A device control apparatus in accordance with claim 1, said device control apparatus further comprising:
   a memory unit that stores a result of the determination carried out by said decision unit with respect to the specified source device and the specified destination device.

16. A device control apparatus in accordance with claim 15, said device control apparatus further comprising:
   a display control unit that causes a symbol corresponding to either one of the source device and the destination device to be displayed on a display unit,
   wherein said display control unit refers to the result of the determination stored in said memory unit and causes a list of mated devices, which may be combined with the device expressed by the symbol and have been determined affirmatively in the past by said decision unit, to be displayed on said display unit, when a predetermined operation is performed with respect to the symbol that is being displayed.

17. A device control apparatus in accordance with claim 15, said device control apparatus further comprising:
   a display control unit that refers to the result of the determination stored in said memory unit and causes a list of combinations of the source device and the destination device, which have been determined affirmatively in the past by said decision unit, to be displayed on a display unit.

18. A device control apparatus in accordance with claim 1, wherein said device specification unit specifies the source device and the destination device in response to a specific instruction transmitted via a network from a certain apparatus, which is connected with said device control apparatus via the network.

19. A device control apparatus in accordance with claim 18, said device control apparatus further comprising a public information unit that opens information, which is utilized for obtaining the specific instruction, via the network to said certain apparatus that is connected with said device control apparatus via the network.

20. A device control system comprising a source device, which is a transmitter of data, a destination device, which is a receiver of data, and a device control apparatus that enables control of the source device and the destination device,
   wherein said device control apparatus comprises:
      a device specification unit that specifies a source device and a destination device;
      a decision unit that determines whether or not the specified destination device can receive and process data transmitted from the specified source device, based on attribute information of the specified source device and the specified destination device;
      a user interface specification unit that, when said decision unit determines that the specified destination device can receive and process data transmitted from the specified source device, specifies a user interface for operating a composite device, which has both at least part of functions of the specified source device and at least part of functions of the specified destination device, as a user interface for operating both the specified source device and the specified destination device; and
      a display control unit that causes the user interface specified by said user interface specification unit to be displayed on a display unit.

21. A method of determining a combination of a source device, which is a transmitter of data, with a destination device, which is a receiver of data, said method comprising the steps of:
   (a) specifying a source device and a destination n device;
   (b) determining whether or not the specified destination device can receive and process data transmitted from the specified source device, based on attribute information of the specified source device and the specified destination device;
   (c) when it is determined in said step (b) that the specified destination device can receive and process data transmitted from the specified source device, specifying a user interface for operating a composite device, which has both at least part of functions of the specified source device and at least part of functions of the specified destination device, as a user interface for operating both the specified source device and the specified destination device; and
   (d) causing the user interface specified in said step (c) to be displayed.

22. A method in accordance with claim 21, said method further comprising the step of:
   (e) when it is determined in said step (b) that the specified destination device can receive and process data transmitted from the specified source device, controlling the specified source device and the specified destination device, in order to enable data to be transferred from the specified source device to the specified destination device via a device control apparatus that enables control of the source device and the destination device.

23. A method in accordance with claim 21, said method further comprising the step of:
   (e) when it is determined in said step (b) that the specified destination device can receive and process data transmitted from the specified source device, controlling the specified source device and the specified destination device, in order to enable data to be transferred from the specified source device to the specified destination device not via a device control apparatus that enables control of the source device and the destination device.

24. A method in accordance with claim 21, wherein said step (a) comprises the steps of:
   (a-1) causing a symbol corresponding to the source device and a symbol corresponding to the destination device to be displayed; and
   (a-2) when a predetermined operation is performed with respect to both the symbols, specifying the source device and the destination device.

25. A computer program product for determining a combination of a source device, which is a transmitter of data, with a destination device, which is a receiver of data, said computer program product comprising:
   a computer readable recording medium;
   a first program code segment that causes a computer to specify a source device and a destination device;

a second program code segment that causes the computer to determine whether or not the specified destination device can receive and process data transmitted from the specified source device, based on attribute information of the specified source device and the specified destination device;

a third program code segment that causes the computer to, when it is determined by said second program code segment that the specified destination device can receive and process data transmitted from the specified source device, specify a user interface for operating a composite device, which has both at least part of functions of the specified source device and at least part of functions of the specified destination device, as a user interface for operating both the specified source device and the specified destination device; and a fourth program code segment that causes the computer to display the user interface specified by said third program code segment, wherein the respective program code segments are recorded in said computer readable recording medium.

26. A computer program product in accordance with claim 25, said computer program product further comprising:

a fifth program code segment that causes the computer to, when it is determined by said second program code that the specified destination device can receive and process data transmitted from the specified source device, controlling the specified source device and the specified destination device, in order to enable data to be transferred from the specified source device to the specified destination device via the computer.

27. A computer program product in accordance with claim 25, said computer program product further comprising:

a fifth program code segment that causes the computer to, when it is determined by said second program code that the specified destination device can receive and process data transmitted from the specified source device, control the specified source device and the specified destination device, in order to enable data to be transferred from the specified source device to the specified destination device not via the computer.

28. A computer program product in accordance with claim 25, wherein said first program code segment comprises:

a program code segment that causes the computer to display a symbol corresponding to the source device and a symbol corresponding to the destination device; and a program code segment that causes the computer to, when a predetermined operation is performed with respect to both the symbols, specify the source device and the destination device.

29. A data signal that is embodied in a carrier wave and represents a computer program for determining a combination of a source device, which is a transmitter of data, with a destination device, which is a receiver of data, said data signal comprising:

a first program code segment that causes a computer to specify a source device and a destination device;

a second program code segment that causes the computer to determine whether or not the specified destination device can receive and process data transmitted from the specified source device, based on attribute information of the specified source device and the specified destination device;

a third program code segment that causes the computer to, when it is determined by said second program code segment that the specified destination device can receive and process data transmitted from the specified source device, specify a user interface for operating a composite device, which has both at least part of functions of the specified source device and at least part of functions of the specified destination device, as a user interface for operating both the specified source device and the specified destination device; and a fourth program code segment that causes the computer to display the user interface specified by said third program code segment.

30. A device control apparatus that enables control of a source device, which is a transmitter of data, and a destination device, which is a receiver of data, said device control apparatus comprising:

a device specification unit that specifies a source device and a destination device;

a decision unit that determines whether or not the specified destination device can receive and process data transmitted from the specified source device, based on attribute information of the specified source device and the specified destination device;

a symbol specification unit that, when said decision unit determines that the specified destination device can receive and process data transmitted from the specified source device, specifies a symbol corresponding to a composite device, which has both at least part of functions of the specified source device and at least part of functions of the specified destination device, as a symbol corresponding to a combination of the specified source device with the specified destination device; and a display control unit that causes the symbol specified by said symbol specification unit to be displayed on a display unit.

31. A device control apparatus in accordance with claim 30, said device control apparatus further comprising:

a user interface specification unit that, when said decision unit determines that the specified destination device can receive and process data transmitted from the specified source device, specifies a user interface for operating the composite device as a user interface for operating both the specified source device and the specified destination device, wherein said display control unit causes the user interface specified by said user interface specification unit to be displayed on said display unit, when a predetermined operation is performed with respect to the specified symbol that is being displayed on said display it.

32. A device control apparatus in accordance with claim 30, said device control apparatus further comprising:

a memory unit that stores data representing the combination of the specified source device with the specified destination device, with regard to the symbol specified by said symbol specification unit, wherein said display control unit refers to the data stored in said memory unit and causes the combination of the specified source device with the specified destination device corresponding to the specified symbol to be displayed on said display unit, when a predetermined operation is performed with respect to the specified symbol that is being displayed on said display unit.

33. A device control apparatus in accordance with claim 30, wherein said decision unit determines whether or not a combination of a type of the specified source device with a type of the specified destination device is operable as the composite device, so as to determine whether or not the specified destination device can receive and process the data transmitted from the specified source device.

34. A method of determining a combination of a source device, which is a transmitter of data, with a destination device, which is a receiver of data, said method comprising the steps of:

(a) specifying a source device and a destination device;

(b) determining whether or not the specified destination device can receive and process data transmitted from the specified source device, based on attribute information of the specified source device and the specified destination device;

(c) when it is determined in said step (b) that the specified destination device can receive and process data transmitted from the specified source device, specifying a symbol corresponding to a composite device, which has both at least part of functions of the specified source device and at least part of functions of the specified destination device, as a symbol corresponding to a combination of the specified source device with the specified destination device; and (d) causing the symbol specified in said step (c) to be displayed.

35. A computer program product for determining a combination of a source device, which is a transmitter of data, with a destination device, which is a receiver of data, said computer program product comprising:

a computer readable recording medium;

a first program code segment that causes a computer to specify a source device and a destination device;

a second program code segment that causes the computer to determine whether or not the specified destination device can receive and process data transmitted from the specified source device, based on attribute information of the specified source device and the specified destination device;

a third program code segment that causes the computer to, when it is determined by said second program code segment that the specified destination device can receive and process data transmitted from the specified source device, specify a symbol corresponding to a composite device, which has both at least part of functions of the specified source device and at least part of functions of the specified destination device, as a symbol corresponding to a combination of the specified source device with the specified destination device; and a fourth program code segment that causes the computer to display the symbol specified by said third program code segment, wherein the respective program code segments are recorded in said computer readable recording medium.

36. A device control apparatus that enables control of a source device, which is a transmitter of data, and a destination device, which is a receiver of data, said device control apparatus comprising:

a device specification unit that specifies a source device and a destination device;

a decision unit that determines whether or not the specified destination device can receive and process data transmitted from the specified source device, based on attribute information of the specified source device and the specified destination device;

a data transfer execution unit that, when said decision unit determines that the specified destination device can receive and process data transmitted from the specified source device, controls the specified source device and the specified destination device, in order to enable data to be transferred from the specified source device to the specified destination device via said device control apparatus.

37. A method of determining a combination of a source device, which is a transmitter of data, with a destination device, which is a receiver of data, said method comprising the steps of:

(a) specifying a source device and a destination device;

(b) determining whether or not the specified destination device can receive and process data transmitted from the specified source device, based on attribute information of the specified source device and the specified destination device; and (c) when it is determined in said step (b) that the specified destination device can receive and process data transmitted from the specified source device, controlling the specified source device and the specified destination device, in order to enable data to be transferred from the specified source device to the specified destination device via a device control apparatus that enables control of the source device and the destination device.

38. A computer program product for determining a combination of a source device, which is a transmitter of data, with a destination device, which is a receiver of data, said computer program product comprising:

a computer readable recording medium;

a first program code segment that causes a computer to specify a source device and a destination device;

a second program code segment that causes the computer to determine whether or not the specified destination device can receive and process data transmitted from the specified source device, based on attribute information of the specified source device and the specified destination device; and a third program code segment that causes the computer to, when it is determined by said second program code that the specified destination device can receive and process data transmitted from the specified source device, control the specified source device and the specified destination device, in order to enable data to be transferred from the specified source device to the specified destination device via the computer.

39. A device control apparatus that enables control of a source device, which is a transmitter of data, and a destination device, which is a receiver of data, said device control apparatus comprising:

a device specification unit that specifies a source device and a destination device;

a decision unit that determines whether or not the specified destination device can receive and process data transmitted from the specified source device, based on attribute information of the specified source device and the specified destination device;

a data transfer execution unit that, when said decision unit determines that the specified destination device can receive and process data transmitted from the specified source device, controls the specified source device and the specified destination device, in order to enable data to be transferred from the specified source device to the specified destination device not via said device control apparatus.

40. A method of determining a combination of a source device, which is a transmitter of data, with a destination device, which is a receiver of data, said method comprising the steps of:

(a) specifying a source device and a destination device;

(b) determining whether or not the specified destination device can receive and process data transmitted from the specified source device, based on attribute information of the specified source device and the specified destination device; and (c) when it is determined in said step (b) that the specified destination device can receive and process data transmitted from the specified source device, controlling the specified source device and the specified destination device, in order to enable data to be transferred from the specified source device to the specified destination device not via a device control apparatus that enables control of the source device and the destination device.

41. A computer program product for determining a combination of a source device, which is a transmitter of data, with a destination device, which is a receiver of data, said computer program product comprising:

a computer readable recording medium;

a first program code segment that causes a computer to specify a source device and a destination device;

a second program code segment that causes the computer to determine whether or not the specified destination device can receive and process data transmitted from the specified source device, based on attribute information of the specified source device and the specified destination device; and a third program code segment that causes the computer to, when it is determined by said second program code that the specified destination device can receive and process data transmitted from the specified source device, control the specified source device and the specified destination device, in order to enable data to be transferred from the specified source device to the specified destination device not via the computer.

42. A remote instruction apparatus connected to a device control apparatus that enables control of a source device, which is a transmitter of data, and a destination device, which is a receiver of data, via a network, said device control apparatus comprising:

a device specification unit that specifies a source device and a destination device; and a decision unit that determines whether or not the specified destination device can receive and process data transmitted from the specified source device, based on attribute information of the specified source device and the specified destination device, said remote instruction apparatus transmitting a specific instruction, which causes said device specification unit to specify the source device and the destination device, via the network.

* * * * *